US009818247B2

(12) United States Patent
Johnson

(10) Patent No.: US 9,818,247 B2
(45) Date of Patent: Nov. 14, 2017

(54) INTELLIGENT DOOR LOCK SYSTEM WITH KEYPAD

(71) Applicant: August Home, Inc., San Francisco, CA (US)

(72) Inventor: Jason Johnson, San Francisco, CA (US)

(73) Assignee: August Home, Inc., San Francisco, CA (US)

(*) Notice: Subject to any disclaimer, the term of this patent is extended or adjusted under 35 U.S.C. 154(b) by 75 days.

(21) Appl. No.: 14/732,290

(22) Filed: Jun. 5, 2015

(65) Prior Publication Data

US 2017/0109952 A1 Apr. 20, 2017

(51) Int. Cl.
*G06F 7/04* (2006.01)
*G07C 9/00* (2006.01)

(52) U.S. Cl.
CPC ..... *G07C 9/00309* (2013.01); *G07C 9/00039* (2013.01); *G07C 2009/00769* (2013.01)

(58) Field of Classification Search
CPC ........... G07C 9/00571; G07C 9/00174; H04W 4/008; H04W 12/04; H04W 12/06; H04W 12/08; H04L 9/3226
USPC ........................................................ 340/5.54
See application file for complete search history.

(56) References Cited

U.S. PATENT DOCUMENTS 2,680,177 A 6/1954 Rosenthal
5,306,407 A 4/1994 Hauzer et al.
5,407,035 A 4/1995 Cole et al.
5,594,430 A 1/1997 Swindler et al.
5,695,048 A 12/1997 Tseng
6,196,936 B1 3/2001 Meckel
6,323,846 B1 11/2001 Westerman et al.
6,570,557 B1 5/2003 Westerman et al.
6,612,415 B2 9/2003 Yamane
6,677,932 B1 1/2004 Westerman
6,967,562 B2 11/2005 Menard et al.
7,614,008 B2 11/2009 Ording
7,633,076 B2 12/2009 Huppi et al.
7,653,883 B2 1/2010 Hotelling et al.
7,657,849 B2 2/2010 Chaudhri et al.
7,663,607 B2 2/2010 Hotelling et al.
7,844,914 B2 11/2010 Andre et al.
8,006,002 B2 8/2011 Kalayjian et al.
(Continued)

FOREIGN PATENT DOCUMENTS

CA 2676196 A1 7/2008
CA 2834964 8/2012
(Continued)

*Primary Examiner* — Don N Vo
(74) *Attorney, Agent, or Firm* — Paul Davis

(57) ABSTRACT

An intelligent door lock system is provided. One or more wireless bridges each including a computing device, an internet-facing radio, and a second radio, a first radio within communication range of the second radio of the wireless bridge, and a third internet-facing radio responsible for transmitting video. One or more cameras are provided. One or more Bluetooth devices or Bluetooth peripheral devices, collectively, Bluetooth devices are in communication with the one or more bridges. An intelligent door lock system in communication with the one or more bridges and the one or more Bluetooth devices. A keypad is in communication with the intelligent door lock system.

26 Claims, 54 Drawing Sheets

(56) References Cited

U.S. PATENT DOCUMENTS 8,239,784 B2 8/2012 Hotelling et al.
8,279,180 B2 10/2012 Hotelling et al.
8,347,720 B2 1/2013 De Los Santos et al.
8,351,789 B2 1/2013 Wagener et al.
8,405,387 B2 3/2013 Novak et al.
8,476,577 B2 7/2013 Nagahama et al.
8,479,122 B2 7/2013 Hotelling et al.
8,522,596 B2 9/2013 Avery
8,525,102 B2 9/2013 Augustyniak et al.
8,542,189 B2 9/2013 Milne et al.
8,544,326 B2 10/2013 Je
8,600,430 B2 12/2013 Herz et al.
8,653,982 B2 2/2014 Yulkowski
8,826,708 B2 9/2014 Lopes
9,057,210 B2 6/2015 Dumas
2002/0015024 A1 2/2002 Westerman et al.
2002/0117868 A1 8/2002 Bates
2002/0196771 A1 12/2002 Vij et al.
2004/0237609 A1* 12/2004 Hosselet ............. E05B 47/0603 70/277
2005/0252739 A1 11/2005 Callahan et al.
2006/0026536 A1 2/2006 Hotelling et al.
2006/0033724 A1 2/2006 Chaudhri et al.
2006/0197753 A1 9/2006 Hotelling
2007/0150842 A1 6/2007 Chaudhri et al.
2009/0273438 A1 11/2009 Sultan
2012/0280789 A1 11/2012 Dumas
2012/0280790 A1 11/2012 Gerhardt et al.
2012/0319827 A1 12/2012 Pance et al.
2013/0063138 A1 3/2013 Takahashi et al.
2013/0064378 A1 3/2013 Chuang
2013/0138826 A1 5/2013 Ling et al.
2013/0154823 A1 6/2013 Ostrer et al.
2013/0166202 A1 6/2013 Bandyopadhyay
2013/0237193 A1 9/2013 Dumas
2014/0051355 A1 2/2014 Ahearn
2014/0365773 A1 12/2014 Gerhardt et al.
2014/0375422 A1* 12/2014 Huber ................ G07C 9/00174 340/5.61
2015/0211259 A1 7/2015 Dumas
2015/0213658 A1 7/2015 Dumas
2015/0213663 A1 7/2015 Dumas
2016/0116510 A1* 4/2016 Kalous ............... G07C 9/00571 340/636.1
2016/0133071 A1* 5/2016 Henderson .......... E05B 47/0001 70/277
2016/0180618 A1* 6/2016 Ho ..................... G07C 9/00571 340/5.52

FOREIGN PATENT DOCUMENTS

EP 0486657 A1 5/1992
EP 0907068 A1 4/1999
EP 1404021 A2 3/2004
EP 2428774 A1 3/2012
EP 2454558 A1 5/2012
EP 2564165 A2 3/2013
EP 2579002 A1 4/2013
EP 244750 8/2013
EP 1529904 8/2013
EP 2631400 8/2013
EP 2642252 A1 9/2013
WO WO9119986 12/1991
WO WO2011006515 A1 1/2011
WO WO2011139682 A1 11/2011
WO WO2012151290 8/2012
WO WO2014062321 4/2014
WO WO2014107196 7/2014
WO WO2015023737 2/2015
WO PCT/US15/20180 5/2015
WO PCT/US15/20226 5/2015
WO PCT/US15/20206 6/2015

* cited by examiner

INTELLIGENT DOOR LOCK SYSTEM WITH KEYPAD

BACKGROUND

Field of the Invention

The present invention is directed to dwelling security systems, and more particularly to a dwelling security system that is in communication with a keypad.

Description of the Related Art

Existing security systems for homes and commercial properties feature multiple video camera connected to a security box. The security box contains electronics to convert analog video and optional audio inputs to digital and performs audio and video compression by a System-On-Chip (SoC) processor, which then stores the results on a hard disk. The system could be programmed for continuous recording in a loop, recording upon a trigger caused by external alarm and scene change threshold, or timed scheduled recording. The cameras are connected by cabling and video is transmitted as analog to the main system. Such cabling makes it difficult to install the multiple cameras inside and outside a residence or commercial because of routing of such long cabling between a user accessible box and cameras. Such a system provides 240 frames-per-second capture, which is divided by multiple cameras. For an 8-camera system, each camera video is captured at 240/8, or 30 fps, but capture resolution is usually low at CIF resolution (350×240). Such a security box can display captured video live from cameras or from hard disk on a monitor or TV, and user functions are controlled by front-panel buttons or an infrared remote-control unit (RCU). This means such a security box must be located near a TV and be visible for RCU operation. Such a system also provides means for remote viewing over internet, and can also send email messages with some snap shots of video when an alarm trigger occurs. However, there is much vulnerability in such a system. If internet is not working at the time of intrusion because phone or internet cables are externally cut, then no such email could be send. Thief can easily remove or damage the whole security box which removes all security data.

Another existing video security systems use networked security based where multiple camera units are connected to a PC or laptop computer over local area network or wide-area network. For example, 9 wireless camera units can connect to a PC computer using Ethernet wires or 802.11 wireless communications. Each camera unit contains video camera, video compression, and network interface in this case. Existing systems use JPEG or MPEG-2 or MPEG-4 systems, but in the future this will probably extend to advanced H.264 video compression standard as well in new designs. If there is no local computer, it is also possible to connect the cameras to a router connected to a WAN gateway, so that multiple security video channels could be streamed to a remote PC or laptop. The remote PC or laptop could perform remote viewing or recording of one or multiple channels on its hard disk storage. One of the disadvantages of such a security system is that if internet access deliberately interrupted at the time of a security event, then it is not possible to stream the data for the event to the remote PC for recording. If the PC is located locally, then it could easily be removed by the perpetrators. Furthermore, such a system requires continuous stream of multiple video streams over local and wide area networks, which places a considerably load on such networks, thus causing unreliable operations and slowing other network activity. Cabled systems using Ethernet cabling also require difficult cabling of multiple camera units. Units configured to use 802.11 g systems contend bandwidth collisions with other systems, cordless phone, wireless microwaves, and other wireless communication systems on a limited number of channels. Thus, it becomes difficult and unreliable to transfer plurality of live compressed video stream in real-time without interruptions.

Accordingly there is a need for a camera system that can be easily deployed without cumbersome wires. There is a further need for a dwelling security system that includes a camera coupled to a WiFi/BTLE a cellular/BTLE bridge that in a first step uses a motion detection to detect motion of an individual approaching a dwelling, and in a second step if the motion detector detects the approach then a camera is turned on in sufficient time to take a face picture of the individual.

SUMMARY

An object of the present invention is to provide an improved dwelling security system.

Another object of the present invention is to provide an improved dwelling security system that includes an intelligent door lock system and a keypad.

Yet another object of the present invention is to provide an improved dwelling security system that includes a WiFi bridge, a motion detection device, and wireless camera and a keypad.

A further object of the present invention is to provide an improved dwelling security system that includes a keypad that is coupled to an intelligent door lock system and a keypad as an accessory to the intelligent door lock system.

Yet another object of the present invention is to provide an intelligent door lock system with a keypad that is sold with the intelligent door lock system.

These and other objects of the present invention are achieved in, an intelligent door lock system. An intelligent door lock system is communication with a keypad.

In another embodiment an intelligent door lock system includes, one or more wireless bridges each including a computing device, an internet-facing radio, and a second radio, a first radio within communication range of the second radio of the wireless bridge, and a third internet-facing radio responsible for transmitting video. One or more cameras are provided. One or more Bluetooth devices or Bluetooth peripheral devices, collectively, Bluetooth devices are in communication with the one or more bridges. An intelligent door lock system in communication with the one or more bridges and the one or more Bluetooth devices. A keypad is in communication with the intelligent door lock system.

BRIEF DESCRIPTION OF THE DRAWINGS

FIG. 1(*b*) illustrates various embodiments of a positioning sensing device coupled to a drive shaft.

FIG. 1 (*c*) illustrates one embodiment of a door lock device that can be used for retrofitting with an embodiment of an intelligent door lock device of the present invention.

FIG. 1(*d*) illustrates coupling of a positioning sensing device with a drive shaft of a door lock device.

FIG. 1(*e*) illustrates one embodiment of an intelligent door lock system of the present invention with an off-center drive.

FIG. 1(*f*) illustrates a wireless bridge that can be used in one embodiment of the present invention.

FIG. 1(*g*) illustrates one embodiment of elements coupled to a circuit in one embodiment of the present invention, including a haptic device.

FIGS. 2(*d*)-(*f*) illustrate an embodiment of non-wire, direct connection between PCBAs in one embodiment of the present invention, with position of a PCBA in intelligent door lock device.

FIGS. 15(*c*)-(*d*) illustrate an embodiment of an accelerometer FPC service loop.

DETAILED DESCRIPTION

Figure 1A:
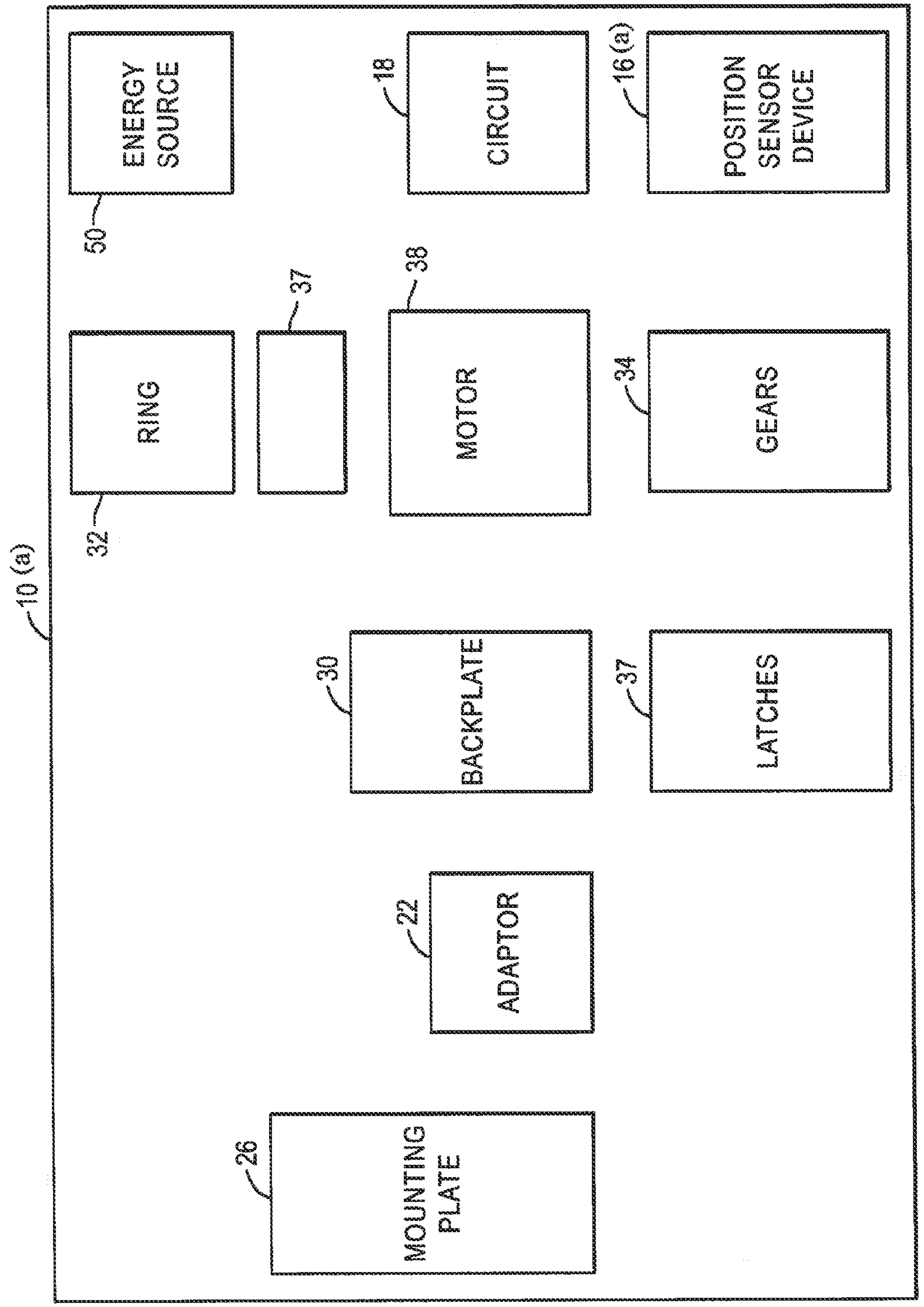
FIG. 1(*a*) is an exploded view of a mounting assembly of an intelligent door lock device that can be used with the present invention.
Figure 1B:
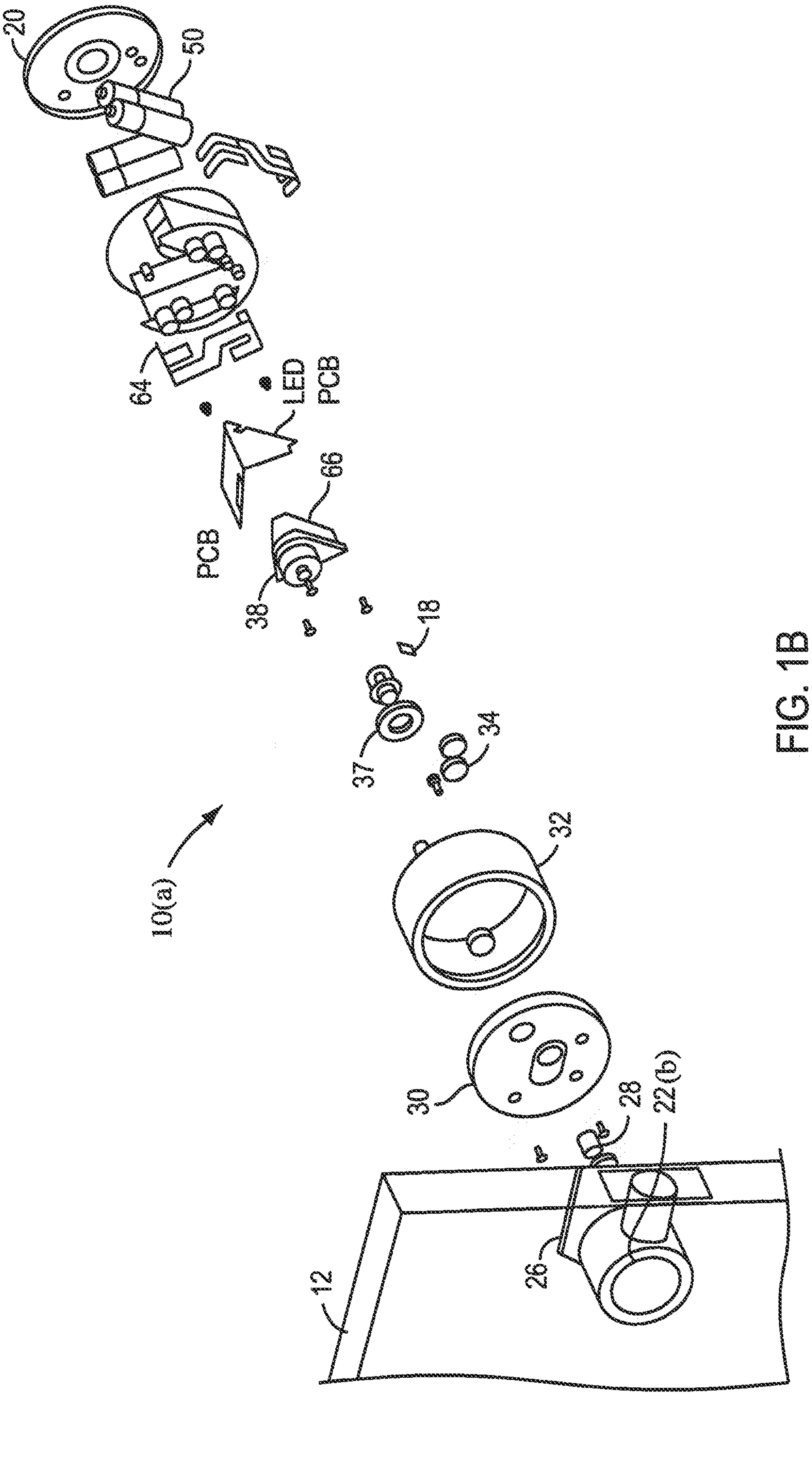
Figure 1C:
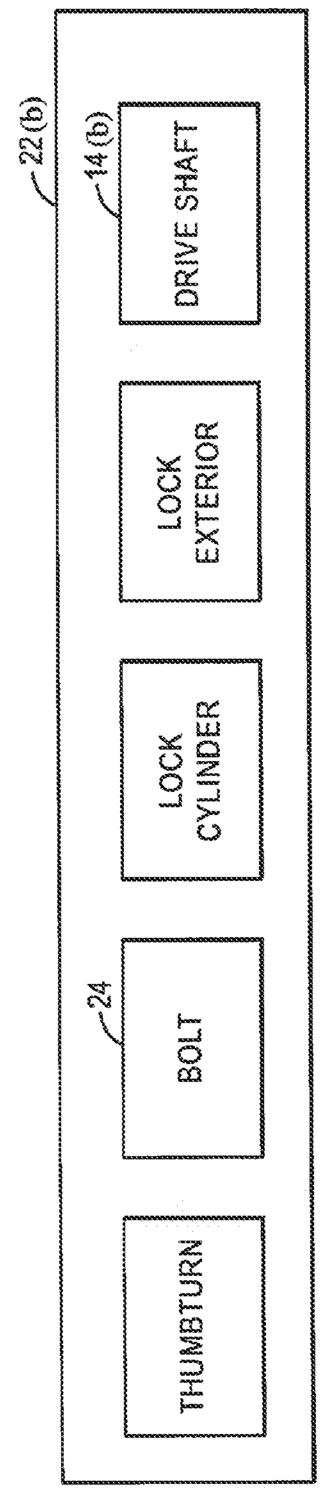
Figure 1D:
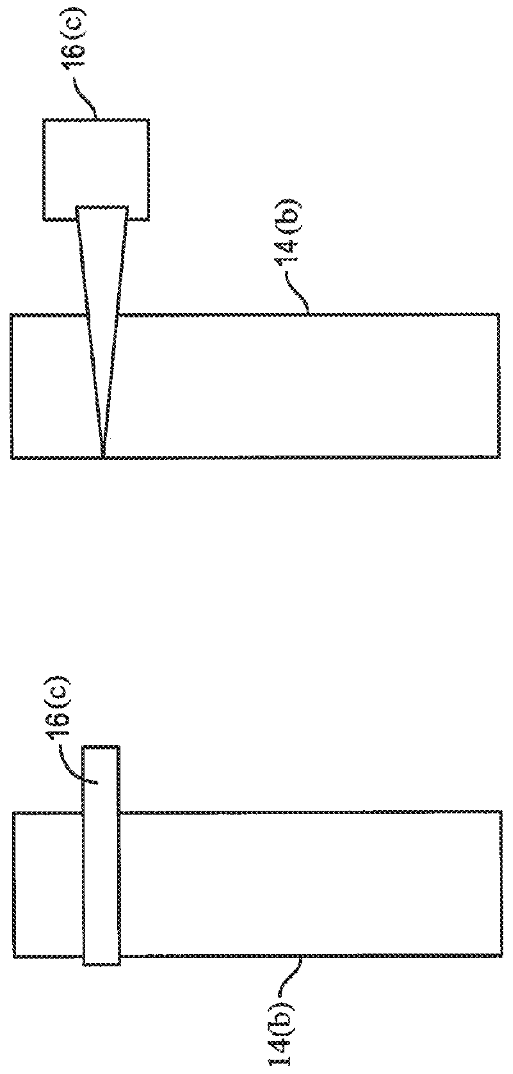
Figure 1E:
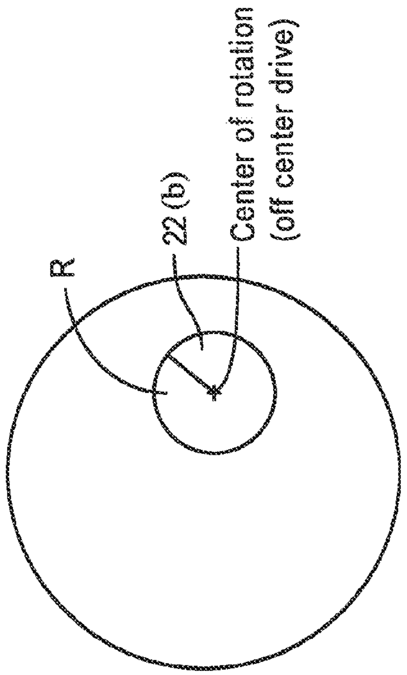
Figure 1F:
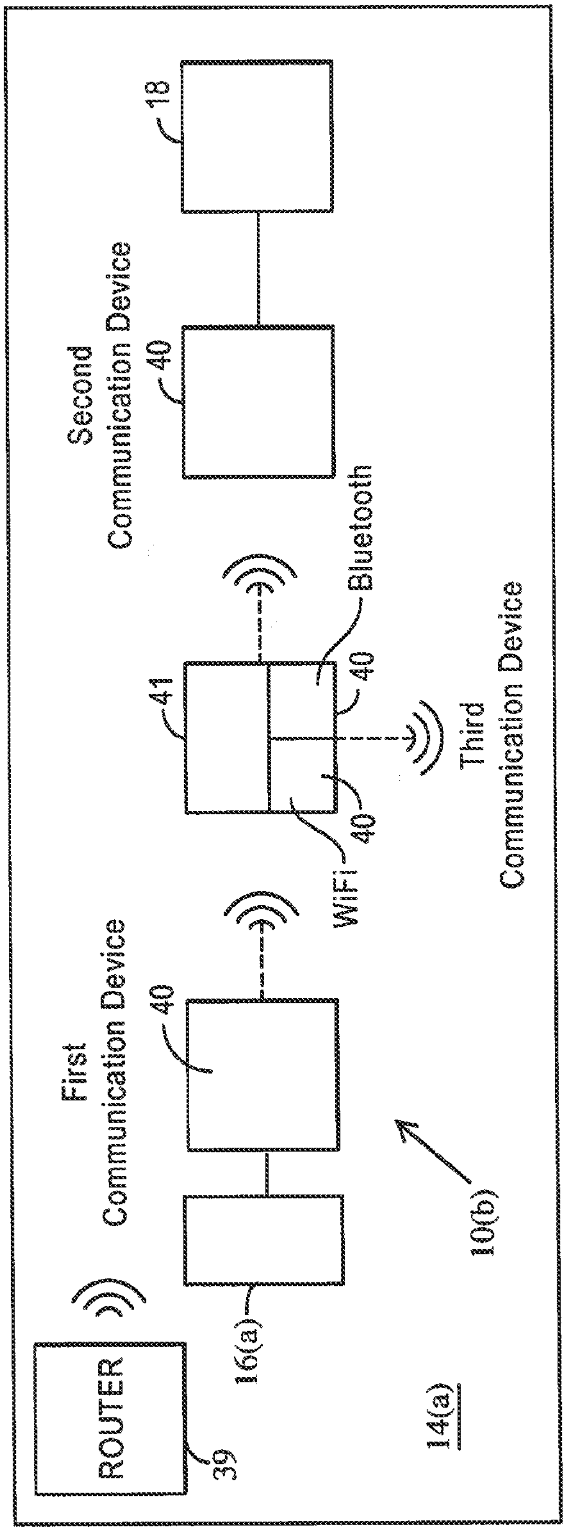
Figure 1G:
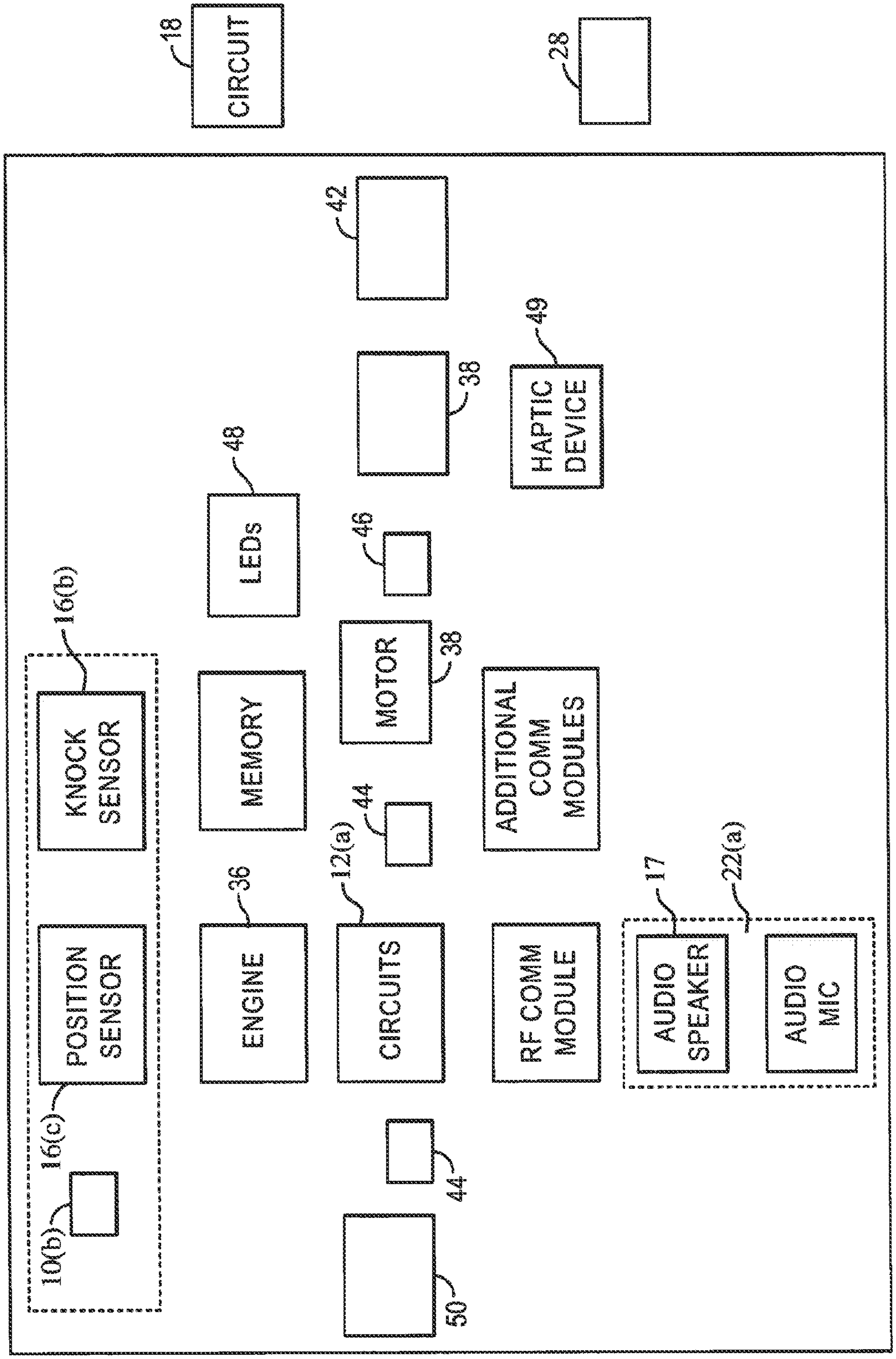
Figure 2A:
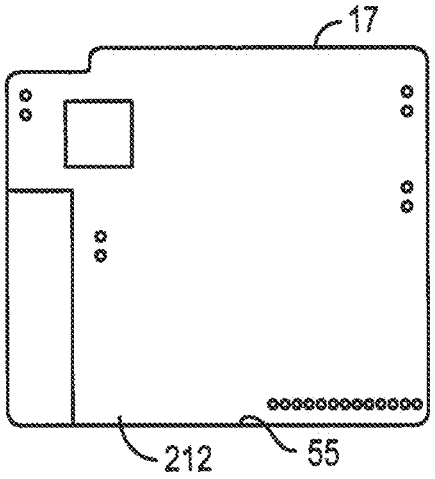
FIGS. 2(*a*)-(*c*) illustrate embodiments of front and back surfaces of a main circuit that can be used and included in the intelligent door lock device of the present invention.
Figure 2B:
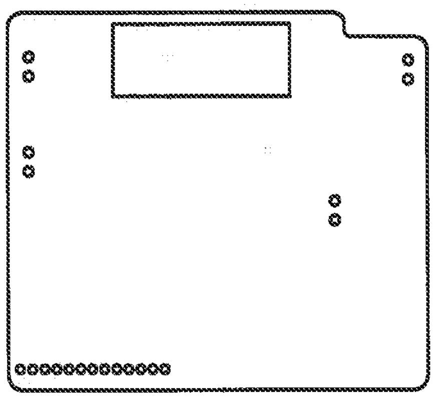
Figure 2C:
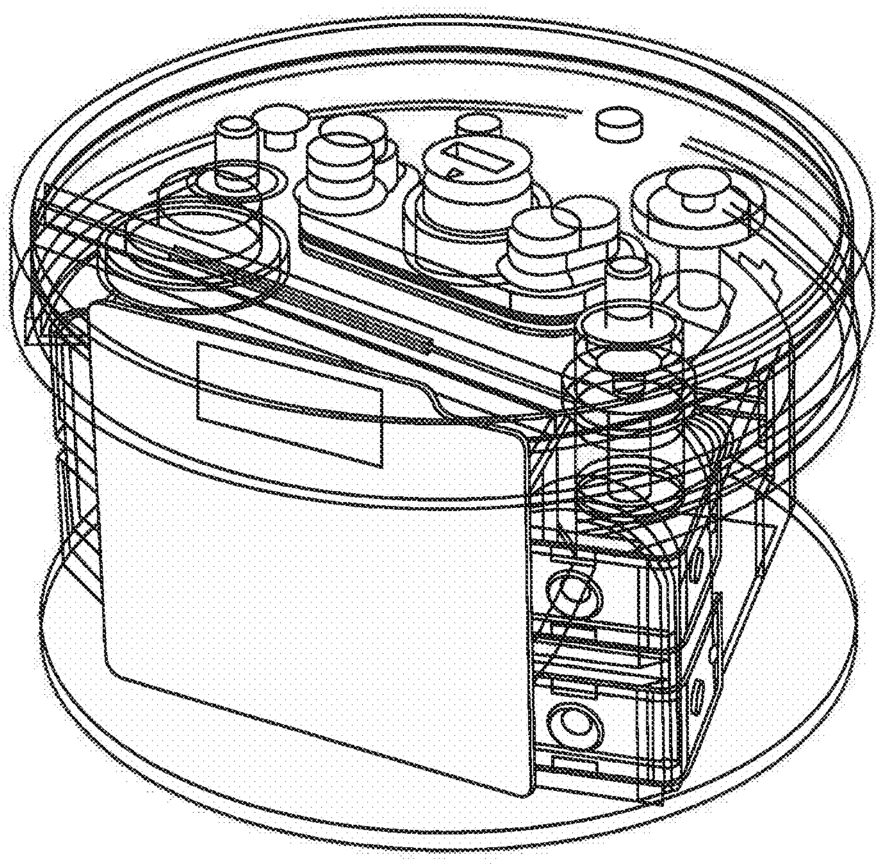
Figure 2D:
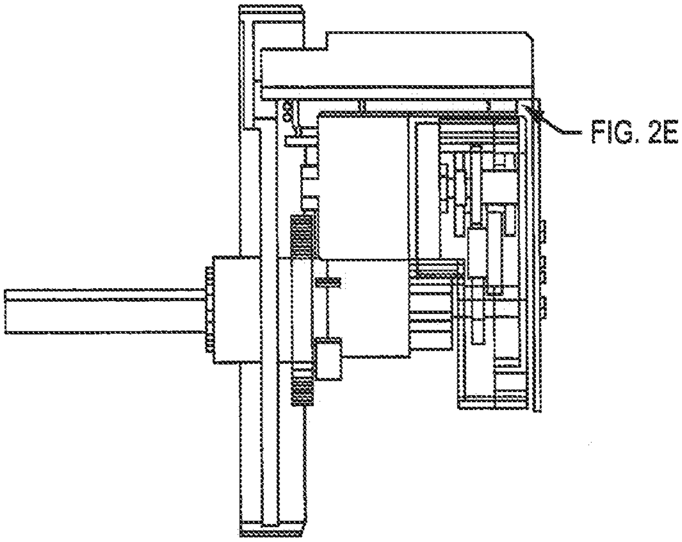
Figure 2E:
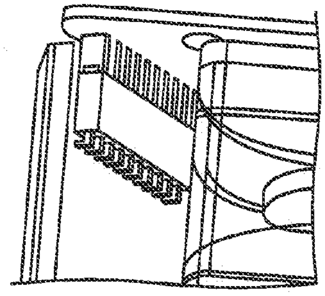
Figure 2F:
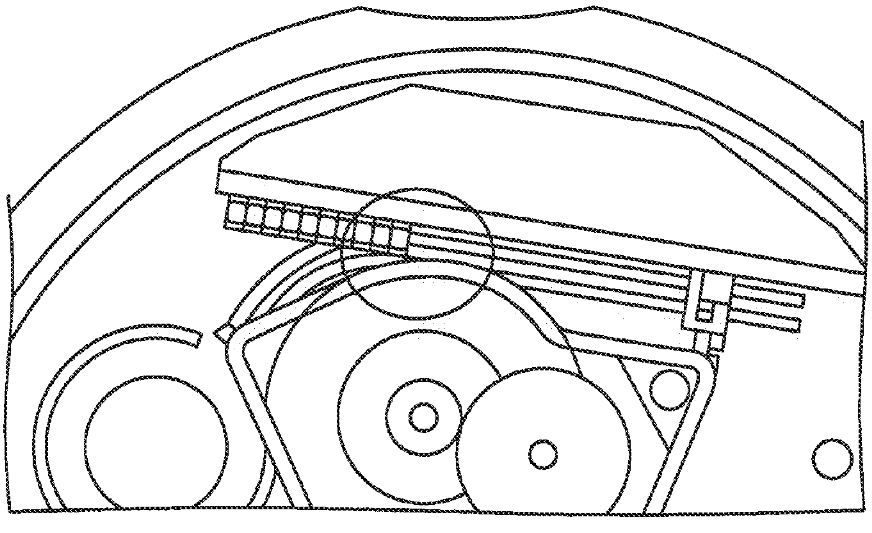
Figure 3A:
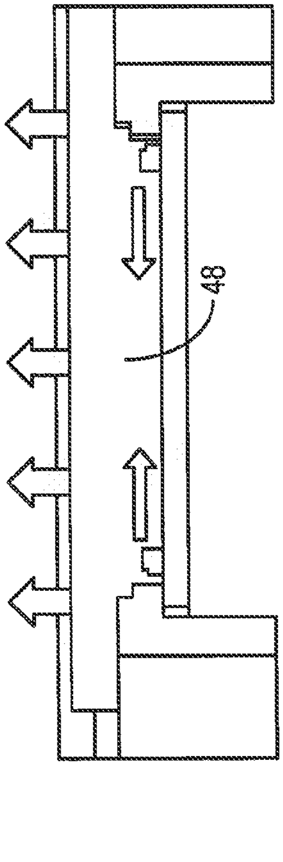
FIGS. 3(*a*)-(*d*) illustrate embodiments of LED lighting that can be used with the present invention.
Figure 3B:
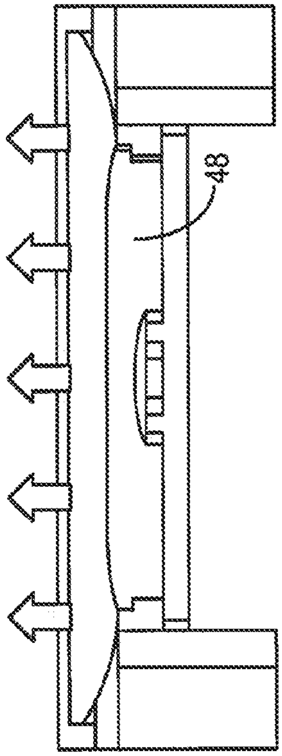
Figure 3C:
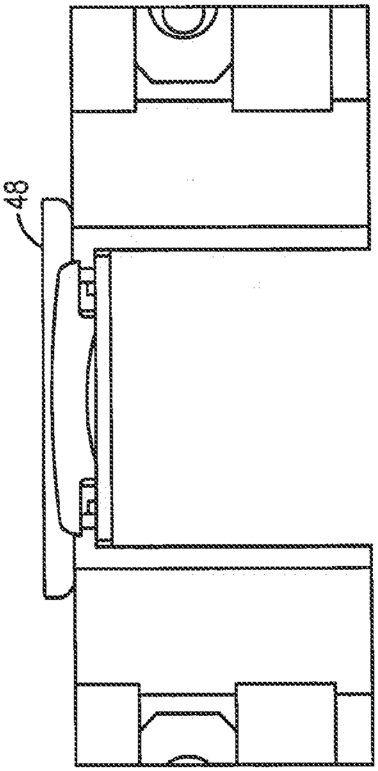
Figure 3D:
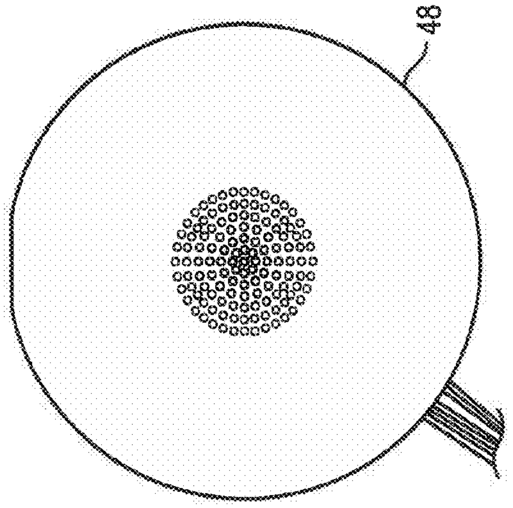
Figure 4A:
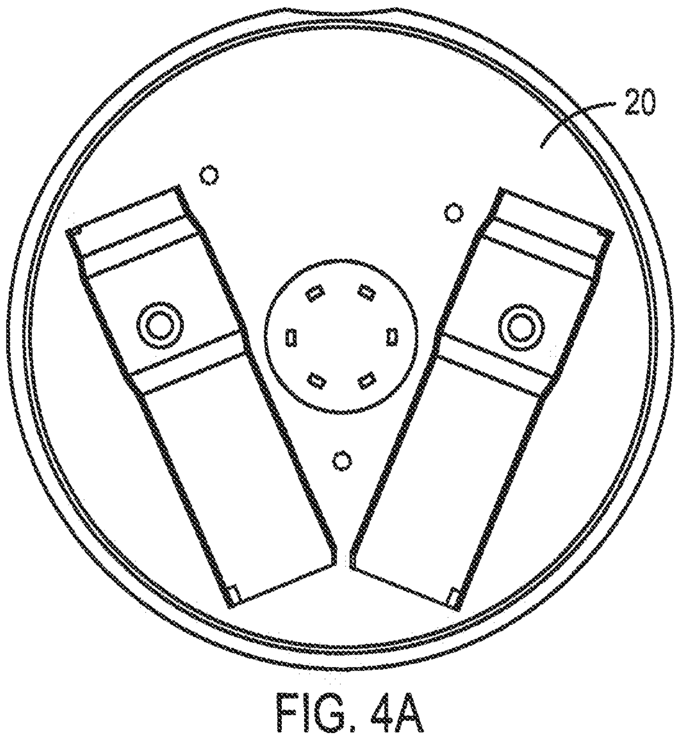
FIGS. 4(*a*)-(*d*) illustrate one embodiment of a faceplate and views of a housing that can be used with the present invention.
Figure 4B:
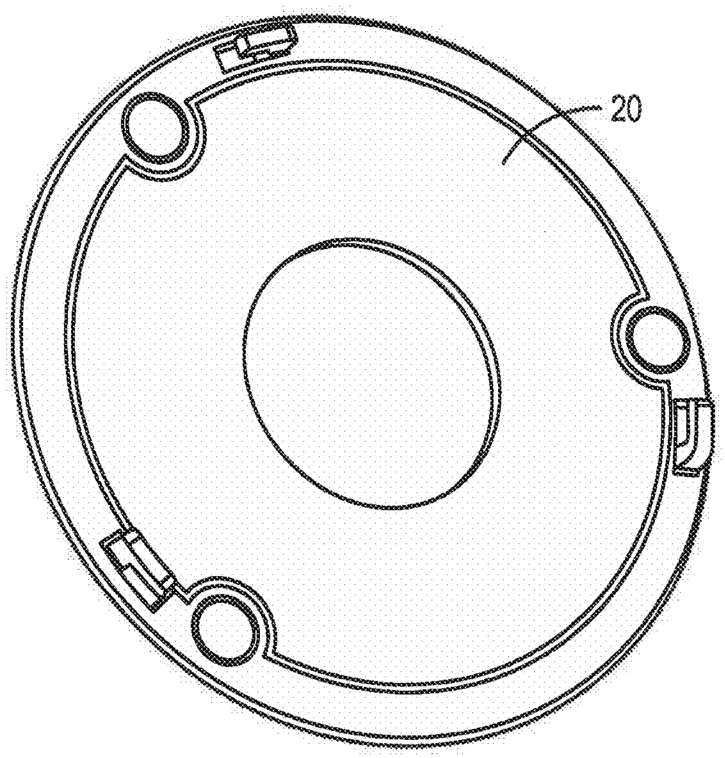
Figure 4C:
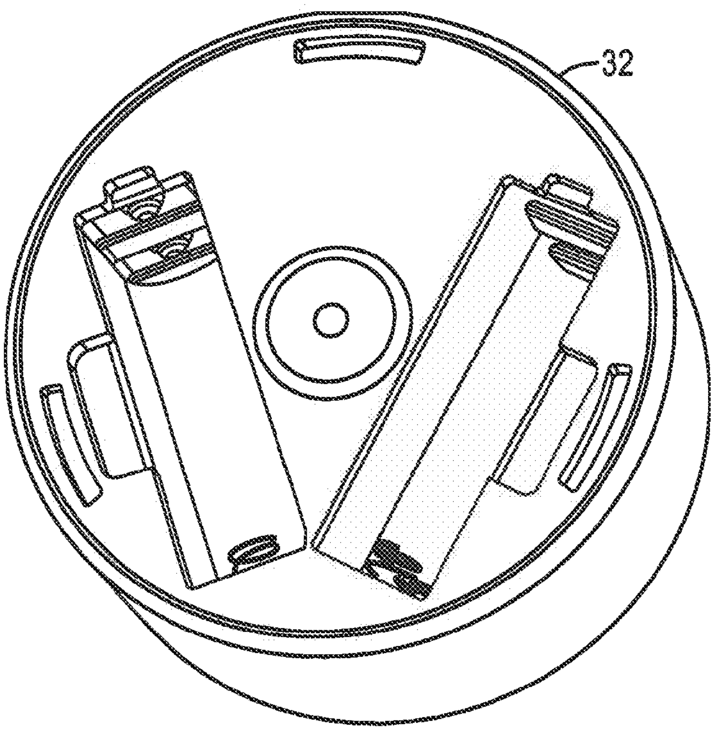
Figure 4D:
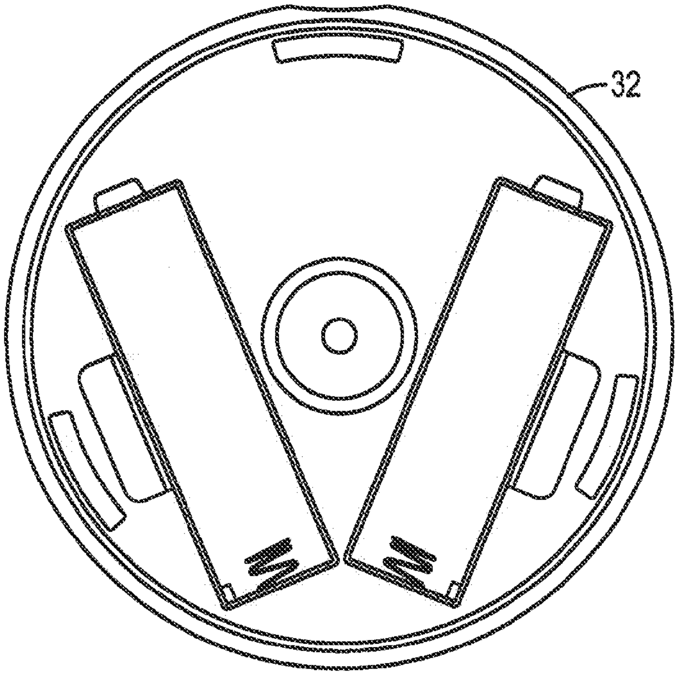

As used herein, the term engine refers to software, firmware, hardware, or other component that can be used to effectuate a purpose. The engine will typically include software instructions that are stored in non-volatile memory (also referred to as secondary memory). When the software instructions are executed, at least a subset of the software instructions can be loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

As used herein, the term database is used broadly to include any known or convenient means for storing data, whether centralized or distributed, relational or otherwise.

As used herein a mobile device includes, but is not limited to, a cell phone, such as Apple's iPhone®, other portable electronic devices, such as Apple's iPod Touches®, Apple's iPads®, and mobile devices based on Google's Android® operating system, and any other portable electronic device that includes software, firmware, hardware, or a combination thereof that is capable of at least receiving the signal, decoding if needed, exchanging information with a server to verify information. Typical components of mobile device may include but are not limited to persistent memories like flash ROM, random access memory like SRAM, a camera, a battery, LCD driver, a display, a cellular antenna, a speaker, a Bluetooth® circuit, and WIFI circuitry, where the persistent memory may contain programs, applications, and/or an operating system for the mobile device. A mobile device can be a key fob A key fob which can be a type of security token which is a small hardware device with built in authentication mechanisms. It is used to manage and secure access to network services, data, provides access, communicates with door systems to open and close doors and the like.

As used herein, the term "computer" or "mobile device or computing device" is a general purpose device that can be programmed to carry out a finite set of arithmetic or logical operations. Since a sequence of operations can be readily changed, the computer can solve more than one kind of problem. A computer can include of at least one processing element, typically a central processing unit (CPU) and some form of memory. The processing element carries out arithmetic and logic operations, and a sequencing and control unit that can change the order of operations based on stored information. Peripheral devices allow information to be retrieved from an external source, and the result of operations saved and retrieved.

As used herein, the term "Internet" is a global system of interconnected computer networks that use the standard Internet protocol suite (TCP/IP) to serve billions of users worldwide. It is a network of networks that consists of millions of private, public, academic, business, and government networks, of local to global scope, that are linked by a broad array of electronic, wireless and optical networking technologies. The Internet carries an extensive range of information resources and services, such as the inter-linked hypertext documents of the World Wide Web (WWW) and the infrastructure to support email. The communications infrastructure of the Internet consists of its hardware components and a system of software layers that control various aspects of the architecture, and can also include a mobile device network, e.g., a cellular network.

As used herein, the term "extranet" is a computer network that allows controlled access from the outside. An extranet can be an extension of an organization's intranet that is extended to users outside the organization that can be partners, vendors, and suppliers, in isolation from all other Internet users. An extranet can be an intranet mapped onto the public Internet or some other transmission system not accessible to the general public, but managed by more than one company's administrator(s). Examples of extranet-style networks include but are not limited to:

LANs or WANs belonging to multiple organizations and interconnected and accessed using remote dial-up LANs or WANs belonging to multiple organizations and interconnected and accessed using dedicated lines Virtual private network (VPN) that is comprised of LANs or WANs belonging to multiple organizations, and that extends usage to remote users using special "tunneling" software that creates a secure, usually encrypted network connection over public lines, sometimes via an ISP As used herein, the term "Intranet" is a network that is owned by a single organization that controls its security policies and network management. Examples of intranets include but are not limited to:

A LAN

A Wide-area network (WAN) that is comprised of a LAN that extends usage to remote employees with dial-up access A WAN that is comprised of interconnected LANs using dedicated communication lines A Virtual private network (VPN) that is comprised of a LAN or WAN that extends usage to remote employees or networks using special "tunneling" software that creates a secure, usually encrypted connection over public lines, sometimes via an Internet Service Provider (ISP)

For purposes of the present invention, the Internet, extranets and intranets collectively are referred to as ("Network Systems").

For purposes of the present invention, Bluetooth LE devices and peripheral devices are Bluetooth low energy devices, marketed as Bluetooth Smart.

In one embodiment of the present invention a dwelling security system 11(*a*) is provided with an intelligent door lock system, a camera and a keypad that is either an accessory or sold with the intelligent door lock system.

In one embodiment the present invention provides an improved dwelling security system.

In one embodiment the door lock system 10 includes a vibration/tapping sensing device 11 configured to be coupled intelligent lock system 10. In one embodiment the intelligent door lock system is in communication with a mobile device that includes a vibration/taping sensing device to lock or unlock a door associated with the intelligent door lock system.

In one embodiment the vibration/tapping sensing device 11 senses knocking on the door and locks or unlocks the door. In one embodiment the vibration/tapping sensing device 11 is not included as part of the actual intelligent door lock system. In one embodiment the vibration/tapping sensing device 11 is coupled to the drive shaft 14. It will be appreciated that the vibration/tapping sensing device 11 can be coupled to other elements of the intelligent door lock system 10. The vibration/tapping sensing device detects vibration or knocking applied to a door that is used to unlock or lock the intelligent door lock system 10. This occurs following programming the intelligent door lock system 10. The programming includes a user's vibration code/pattern, and the like. Additionally, a user can give a third person a knock code/pattern to unlock the intelligent door lock system of the door. The knocking is one that is recognized as having been defined by a user of the door lock system as a means to unlock the door. The knocking can have a variety of different patterns, tempos, duration, intensity and the like.

The vibration/tapping sensing device 11 detects oscillatory motion resulting from the application of oscillatory or varying forces to a structure. Oscillatory motion reverses direction. The oscillation may be continuous during some time period of interest or it may be intermittent. It may be periodic or nonperiodic, i.e., it may or may not exhibit a regular period of repetition. The nature of the oscillation depends on the nature of the force driving it and on the structure being driven.

Motion is a vector quantity, exhibiting a direction as well as a magnitude. The direction of vibration is usually described in terms of some arbitrary coordinate system (typically Cartesian or orthogonal) whose directions are called axes. The origin for the orthogonal coordinate system of axes is arbitrarily defined at some convenient location.

In one embodiment, the vibratory responses of structures can be modeled as single-degree-of-freedom spring mass systems, and many vibration sensors use a spring mass system as the mechanical part of their transduction mechanism.

In one embodiment the vibration/tapping sensing device 11 can measure displacement, velocity, acceleration, and the like.

A variety of different vibration/tapping sensing devices 11 can be utilized, including but not limited to accelerometers, optical devices, electromagnetic and capacitive sensors, contact devices, transducers, displacement transducers, piezoelectric sensors, piezoresistive devices, variable capacitance, servo devices, audio devices where transfer of the vibration can be gas, liquid or solid, including but not limited to microphones, geo-phones, and the like.

Suitable accelerometers include but are not limited to: Piezoelectric (PE); high-impedance output; Integral electronics piezoelectric (IEPE); low-impedance output Piezoresistive (PR); silicon strain gauge sensor Variable capacitance (VC); low-level, low-frequency Servo force balance; and the like.

The vibration/tapping sensing device 11 can be in communication with an intelligent door lock system back-end 68, via Network Systems, as more fully described hereafter.

In one embodiment, illustrated in FIG. 1 (*a*) the intelligent door lock system 10 is configured to be coupled to a structure door 12, including but not limited to a house, building and the like, window, locked cabinet, storage box, bike, automobile door or window, computer locks, vehicle doors or windows, vehicle storage compartments, and the like. In one embodiment, the intelligent door lock system 10 is coupled to an existing drive shaft 14 of a lock device 22 already installed and is retrofitted to all or a portion of the lock device 22, which includes a bolt/lock 24. In another embodiment, the intelligent door lock system 10 is attached to a door 12, and the like, that does not have a pre-existing lock device. FIG. 1(*b*) illustrates door lock elements that can be at an existing door, to provide for the mounting of the intelligent door lock system 10 with an existing lock device 22.

FIG. 1(*b*) illustrates door lock elements that can be at an existing door, to provide for the mounting of the intelligent door lock system 10 with an existing lock device 22.

FIG. 1(*b*) illustrates one embodiment of a lock device 22 that can be pre-existing at a door 10 with the intelligent door lock system 10 retrofitted to it. Components of the lock device 22 may be included with the intelligent door lock device 10, as more fully discussed hereafter.

In one embodiment, the intelligent door lock system 10 includes a positioning sensing device 16, a motor 38, an engine/processor 36 with a memory and one or more wireless communication devices 40 coupled to a circuit 18. The motor 38 converts any form of energy into mechanical energy. As a non-limiting example, three more four wireless communications devices 40 are in communication with circuit 18. In one embodiment the vibration sensing device can be included with the positioning sensing device.

In one embodiment, the intelligent door lock system 10 is provided with the position sensing device 16 configured to be coupled to the drive shaft 14 of the lock device 22. The position sensing device 16 senses position of the drive shaft 14 and assists in locking and unlocking the bolt/lock 24 of the lock device 22. The engine 36 is provided with a memory. The engine 36 is coupled to the positioning sensing device 16. A circuit 18 is coupled to the engine 36 and an energy source 50 is coupled to the circuit. A device 38 converts energy into mechanical energy and is coupled to the circuit 18, positioning sensing device 16 and the drive shaft 14. Device 38 is coupled to the energy source 50 to receive energy from the energy source 50, which can be via the circuit 18.

In one embodiment, the intelligent door lock system 10 includes any or all of the following, a face plate 20, ring 32, latches such as wing latches 37, adapters 28 coupled to a drive shaft 14, one or more mounting plates 26, a back plate 30, a power sensing device 46, energy sources, including but not limited to batteries 50, and the like.

In one embodiment (see FIG. 1(*c*)), the intelligent door lock system 10 retrofits to an existing lock device 22 already installed and in place at a door 12, and the like. The existing lock device 12 can include one or more of the following elements, drive shaft 14, a lock device 22 with the bolt/lock 24, a mounting plate 26, one or more adapters 28 for different lock devices 22, a back plate 30, a plurality of motion transfer devices 34, including but not limited to, gears 34, and the like.

In one embodiment, the memory of engine/processor 36 includes states of the door 12. The states are whether the door 12 is a left handed mounted door, or a right handed mounted door, e.g, opens from a left side or a right side relative to a door frame. The states are used with the position sensing device 16 to determine via the engine/processor 36 if the lock device 22 is locked or unlocked.

In one embodiment, the engine/processor 36 with the circuit 18 regulates the amount of energy that is provided from energy source 50 to the motor 38. This thermally protects the motor 38 from receiving too much energy and ensures that the motor 38 does not overheat or become taxed.

FIG. 1(*d*) illustrates various embodiments of the positioning sensing device 16 coupled to the drive shaft 14.

A variety of position sensing devices 16 can be used, including but not limited to, accelerometers, optical encoders, magnetic encoders, mechanical encoders, Hall Effect sensors, potentiometers, contacts with ticks, optical camera encoders, and the like.

As a non-limiting example, an accelerometer 16, well known to those skilled in the art, detects acceleration. The accelerometer 16 provides a voltage output that is proportional to a detected acceleration. Suitable accelerometers 16 are disclosed in, U.S. Pat. No. 8,347,720, U.S. Pat. No. 8,544,326, U.S. Pat. No. 8,542,189, U.S. Pat. No. 8,522,596. EP0486657B1, EP 2428774 A1, incorporated herein by reference.

In one embodiment, the position sensing device 16 is an accelerometer 16. Accelerometer 16 includes a flex circuit coupled to the accelerometer 16. The accelerometer reports X, Y, and X axis information to the engine/processor 36 of the drive shaft 14. The engine/processor 36 determines the orientation of the drive shaft 14, as well as door knocking, bolt/lock 24 position, door 12 close/open (action) sensing, manual key sensing, and the like, as more fully explained hereafter.

Suitable optical encoders are disclosed in U.S. Pat. No. 8,525,102, U.S. Pat. No. 8,351,789, and U.S. Pat. No. 8,476,577, incorporated herein by reference.

Suitable magnetic encoders are disclosed in U.S. Publication 20130063138, U.S. Pat. No. 8,405,387, EP2579002A1, EP2642252 A1, incorporated herein by reference.

Suitable mechanical encoders are disclosed in, U.S. Pat. No. 5,695,048, and EP2564165A2, incorporated herein by reference.

Suitable Hall Effect sensors are disclosed in, EP2454558B1 and EP0907068A1, incorporated herein by reference.

Suitable potentiometers are disclosed in, U.S. Pat. No. 2,680,177, EP1404021A3, CA2676196A1, incorporated herein by reference.

In various embodiments, the positioning sensing device 16 is coupled to the drive shaft 14 by a variety of means, including but not limited to the adapters 28. In one embodiment, the position sensing device 16 uses a single measurement, as defined herein, of drive shaft 14 position sensing which is used to determine movement in order the determine the location of the drive shaft 14 and the positioning sensing device 16. The exact position of the drive shaft 14 can be measured with another measurement without knowledge of any previous state. Single movement, which is one determination of position sensing, is the knowledge of whether the door 12 is locked, unlocked or in between. One advantage of the accelerator is that one can determine position, leave if off, come back at a later time, and the accelerometer 16 will know its current position even if it has been moved since it has been turned off. It will always know its current position.

In one embodiment, the positioning sensing device 16 is directly coupled to the drive shaft 14, as illustrated in FIG. 1(*d*). Sensing position of the positioning sensing device 16 is tied to the movement of the drive shaft 14. In one embodiment with an accelerometer 16, the accelerometer 16 can detect X, Y and Z movements. Additional information is then obtained from the X, Y, and Z movements. In the X and Y axis, the position of the drive shaft 14 is determined; this is true even if the drive shaft 14 is in motion. The Z axis is used to detect a variety of things, including but not limited to, door 12 knocking, picking of the lock, break-in and unauthorized entry, door 12 open and closing motion. If a mobile device 201 is used to open or close, the processor 36 determines the lock state.

In one embodiment, the same positioning sensing device 16 is able to detect knocks by detecting motion of the door 12 in the Z axis. As a non-limiting example, position sensing is in the range of counter and clock wise rotation of up to 180 degrees for readings. The maximum rotation limit is limited by the position sensing device 16, and more particularly to the accelerometer cable. In one embodiment, the result is sub 1° resolution in position sensing. This provides a higher lifetime because sampling can be done at a slower rate, due to knowing the position after the position sensing device 16 has been turned off for a time period of no great 100 milliseconds. With the present invention, accuracy can be enhanced taking repeated measurements. With the present invention, the positioning sensing device 16, such as the accelerometer, does not need to consume additional power beyond what the knock sensing application already uses.

In one embodiment, the position sensing device 16 is positioned on the drive shaft 14, or on an element coupled to the drive shaft 14. In one embodiment, a position of the drive shaft 14 and power sensing device and/or a torque limited link 38 are known. When the position of the drive shaft 14 is known, it is used to detect if the bolt/lock 24 of a door lock device 22 is in a locked or unlocked position, as well as a depth of bolt/lock 24 travel of lock device 22, and the like. This includes but is not limited to if someone, who turned the bolt/lock 24 of lock device 22 from the inside using the ring 32, used the key to open the door 12, if the door 12 has been kicked down, attempts to pick the bolt/lock 24, bangs on the door 12, knocks on the door 12, opening and closing motions of the door 12 and the like. In various embodiments, the intelligent door lock system 10 can be interrogated via hardware, including but not limited to a key, a mobile device, a computer, key fob, key cards, personal fitness devices, such as Fitbit®, nike fuel, jawbone up, pedometers, smart watches, smart jewelry, car keys, smart glasses, including but not limited to Google Glass, and the like.

During a power up mode, the current position of the drive shaft 14 is known.

Real time position information of the drive shaft 14 is determined and the bolt/lock 24 of lock device 22 travels can be inferred from the position information of the drive shaft 14. The X axis is a direction along a width of the door 12, the Y axis is in a direction along a length of a door 12, and the Z axis is in a direction extending from a surface of the door 12.

In one embodiment, the accelerometer 16 is the knock sensor. Knocking can be sensed, as well as the number of times a door 12 is closed or opened, the physical swing of the door 12, and the motion the door 12 opening and closing. With the present invention, a determination is made as to whether or not someone successfully swung the door 12, if the door 12 was slammed, and the like. Additionally, by coupling the position sensing device 16 on the moveable drive shaft 14, or coupled to it, a variety of information is provided, including but not limited to, if the bolt/lock 24 is stored in the correct orientation, is the door 12 properly mounted and the like.

In one embodiment, a calibration step is performed to determine the amount of drive shaft 14 rotations to fully lock and unlock the bolt/lock 24 of lock device 22. The drive shaft 14 is rotated in a counter-counter direction until it can no longer rotate, and the same is then done in the clock-wise direction. These positions are then stored in the engine memory. Optionally, the force is also stored. A command is then received to rotate the drive shaft 14 to record the amount of rotation. This determines the correct amount of drive shaft 14 rotations to properly lock and unlock the lock device 22.

In another embodiment, the drive shaft 14 is rotated until it does not move anymore. This amount of rotation is then stored in the memory and used for locking and unlocking the lock device 22.

In another embodiment, the drive shaft 14 is rotated until it does not move anymore. However, this may not provide the answer as to full lock and unlock. It can provide information as to partial lock and unlock. Records from the memory are then consulted to see how the drive shaft 14 behaved in the past. At different intervals, the drive shaft 14 is rotated until it does not move anymore. This is then statistically analyzed to determine the amount of drive shaft 14 rotation for full locking and unlocking. This is then stored in the memory.

In one embodiment, the engine/processor 36 is coupled to at least one wireless communication device 40 that utilizes audio and RF communication to communicate with a wireless device, including but not limited to a mobile device/key fob 210, with the audio used to communicate a security key to the intelligent door lock system 10 from the wireless device 210 and the RF increases a wireless communication range to and from the at least one wireless communication device 40. In one embodiment, only one wireless communication device 40 is used for both audio and RF. In another embodiment, one wireless communication device 40 is used for audio, and a second wireless communication device 40 is used for RF. In one embodiment, the bolt/lock 22 is included in the intelligent door lock system 10. In one embodiment, the audio communications initial set up information is from a mobile device/key fob 210 to the intelligent door lock system 10, and includes at least one of, SSID WiFi, password WiFi, a Bluetooth key, a security key and door configurations.

In one embodiment, an audio signal processor unit includes an audio receiver, a primary amplifier circuit, a secondary amplifier circuit, a current amplifier circuit, a wave detection circuit, a switch circuit and a regulator circuit. In one embodiment, the audio receiver of each said audio signal processor unit is a capacitive microphone. In one embodiment, the switch circuit of each audio signal processor unit is selected from one of a transistor and a diode. In one embodiment, the regulator circuit of each audio signal processor unit is a variable resistor. In one embodiment, the audio mixer unit includes a left channel mixer and a right channel mixer. In one embodiment, the amplifier unit includes a left audio amplifier and a right audio amplifier. In one embodiment, the Bluetooth device includes a sound volume control circuit with an antenna, a Bluetooth microphone and a variable resistor, and is electrically coupled with the left channel mixer and right channel mixer of said audio mixer unit. Additional details are in U.S. Publication US20130064378 A1, incorporated fully herein by reference.

In one embodiment, the faceplate 20 and/or ring 32 is electrically isolated from the circuit 18 and does not become part of circuit 18. This allows transmission of RF energy through the faceplate 20. In various embodiments, the faceplate and/or ring are made of materials that provide for electrical isolation. In various embodiments, the faceplate 20, and/or the ring 32 are at ground. As non-limiting examples, (i) the faceplate 20 can be grounded and in non-contact with the ring 32, (ii) the faceplate 20 and the ring 32 are in non-contact with the ring 32 grounded, (iii) the faceplate 20 and the ring can be coupled, and the ring 32 and the faceplate 20 are all electrically isolated from the circuit 18. In one embodiment, the ring 32 is the outer enclosure to the faceplate 20, and the bolt/lock 24 and lock device 22 is at least partially positioned in an interior defined by the ring 32 and the faceplate 20.

In one embodiment, the lock device 22 has an off center drive mechanism relative to the outer periphery that allows up to R displacements from a center of rotation of the bolt/lock 24 of lock device 22, where R is a radius of the bolt/lock 24, 0.75 R displacements, 0.5 R displacements, and the like, as illustrated in FIG. 1(*e*). The off center drive mechanism provides for application of mechanical energy to the lock device 22 and bolt/lock 22 off center relative to the outer periphery.

As illustrated in FIG. 1(*f*) in one embodiment, a wireless communication bridge 41 is coupled to a first wireless communication device 40 that communicates with Network Systems via a device, including but not limited to a router, a 3G device, a 4G device, and the like, as well as mobile device 210. The wireless communication bridge 41 is also coupled to a second wireless communication device 40 that is coupled to the processor 38, circuit 18, positioning sensing device 16, motor 38 and the lock device 22 with bolt/lock 24, and provides for more local communication. The first wireless communication device 40 is in communication with the second wireless communication device 40 via bridge 41. The second wireless communication device 40 provides local communication with the elements of the intelligent door lock system 10. In one embodiment, the second communication device 45 is a Bluetooth device. In one embodiment, the wireless communication bridge 41 includes a third wireless communication device 40. In one embodiment, the wireless communication bridge 41 includes two wireless communication devices 40, e.g, and third and fourth wireless communication devices 40. In one embodiment, the wireless communication bridge 41 includes a WiFi wireless communication device 40 and a Bluetooth wireless communication device 40.

FIG. 1(*g*) illustrates various elements that are coupled to the circuit 18 in one embodiment of the present invention.

In one embodiment of the present invention, a haptic device 49 is included to provide the user with haptic feedback for the intelligent door lock system 10, see FIG. 1(*g*). The haptic device is coupled to the circuit 18, the processor 38, and the like. In one embodiment, the haptic device provides a visual indication that the bolt/lock 24 of lock device 22 has reach a final position. In another embodiment, the haptic device 49 provides feedback to the user that the bolt/lock 24 of lock device 22 has reached a home open position verses a final position so the user does not over-torque. A suitable haptic device 49 is disclosed in U.S. Publication No. 20120319827 A1, incorporated herein by reference.

In one embodiment, the wing latches 37 are used to secure the intelligent door lock system 10 to a mounting plate 26 coupled to the door 12. In one embodiment, the wing latches 37 secure the intelligent door lock system 10 to a mounting plate 26 coupled to a door 12 without additional tools other than the wing latches 37.

FIG. 1(*g*) illustrates one embodiment of circuit 18, as well as elements that includes as part of circuit 18, or coupled to circuit 18, as discussed above.

FIGS. 2(*a*)-(*c*) illustrate front and back views of one embodiment of circuit 18, and the positioning of circuit 18 in the intelligent door lock system 10. FIGS. 2(*d*)-(*e*) illustrate an embodiment of non-wire, direct connection between PCBAs. FIG. 2 (*e*) shows the relative positioning of a PCBA in the intelligent door lock device 10.

In one embodiment, the main circuit 18 is coupled to, the engine 36 with a processor and memory, the motor 38, wireless communication device 40 such as a WiFi device including but not limited to a Bluetooth device with an antenna, position sensing device 16, \delete speaker (microphone) 17, temperature sensor 42, battery voltage sensor 44, current sensor or power sensor 46 that determines how hard the motor 38 is working, a protection circuit to protect the motor from overheating, an LED array 48 that reports status and one or more batteries 50 that power circuit 18, see FIG. 1(*g*).

The current sensor 46 monitors the amount of current that goes to the motor 38 and this information is received and processed by the engine/processor 36 with memory and is coupled to the circuit 18. The amount of current going to the motor 38 is used to determine the amount of friction experienced by door 12 and/or lock device 22 with lock/bolt 24 in opening and/or closing, as applied by the intelligent door lock system 10 and the positioning sensing device 16 to the drive shaft 14. The circuit 18 and engine/processor 36 can provide for an adjustment of current. The engine/processor 36 can provide information regarding the door and friction to the user of the door 12.

FIGS. 3(*a*)-(*d*) illustrate embodiments of LED 48 lighting that can include diffusers, a plurality of LED patterns point upward, inward, and outward and a combination of all three. In one embodiment two control PCDs are provide to compare side by side. Each LED 48 can be independently addressable to provide for maximization of light with the fewest LEDs 48. In one embodiment, an air gap is provided.

FIGS. 4(*a*)-(*d*), illustrate one embodiment of a faceplate 20 and views of the housing 32 and faceplate 20.

Figure 5A:
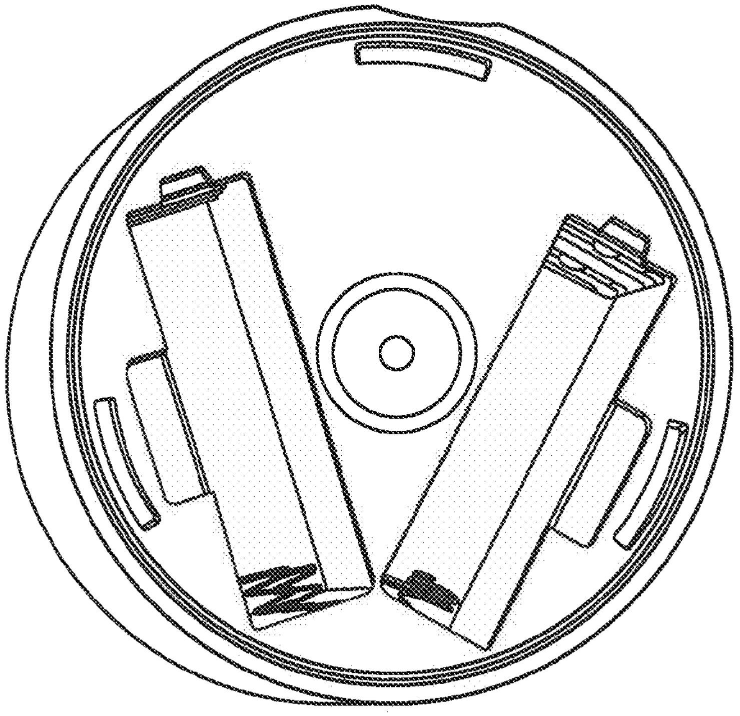
FIGS. 5(*a*) and (*b*) illustrate the rotation range, with a minimized slot length of a faceplate lock that can be used in one embodiment of the present invention.
Figure 5B:
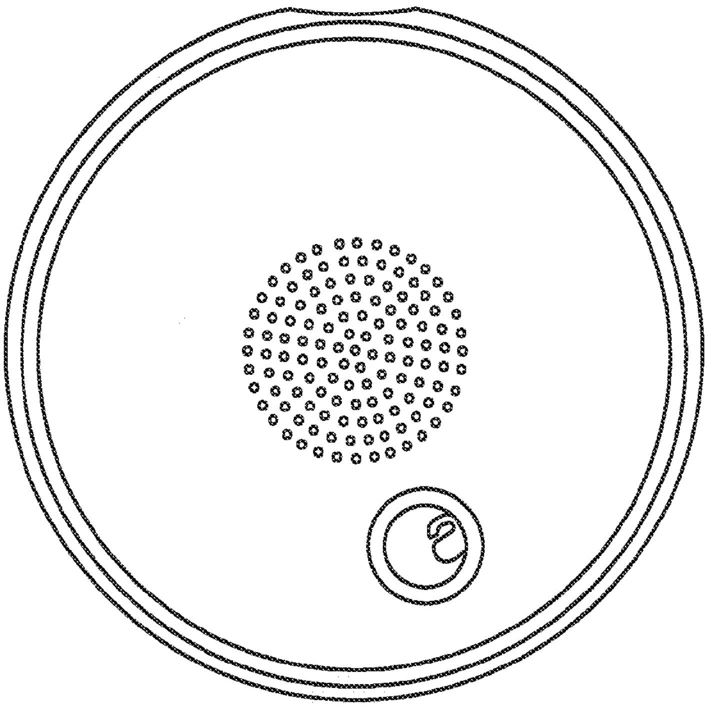

FIGS. 5(*a*) and (*b*) illustrate the rotation range of the ring 32, with a minimized slot length of a bolt/lock 24 of lock device 22 in one embodiment of the present invention. In one embodiment, there is a 1:1 relationship of ring 32 and shaft rotation. In other embodiments, the ratio can change. This can be achieved with gearing. In various embodiments, the bolt/lock 24 and/or lock device 22 can have a rotation of 20-5 and less turns clockwise or counter-clockwise in order to open the door 12. Some lock devices 22 require multiple turns.

Figure 6A:
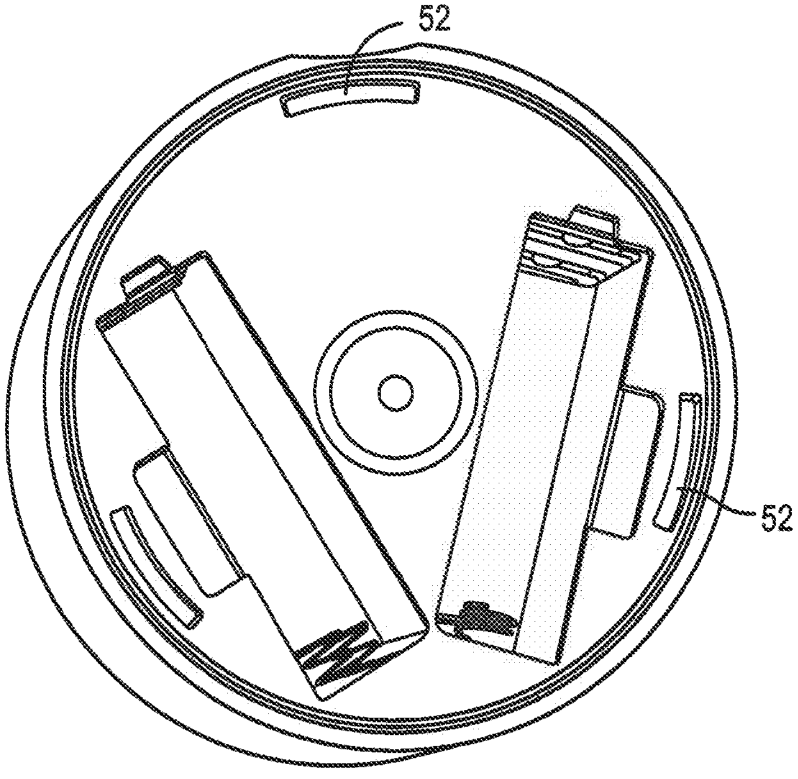
FIGS. 6(*a*) and (*b*) illustrate hook slots that can be used with the present invention.
Figure 6B:
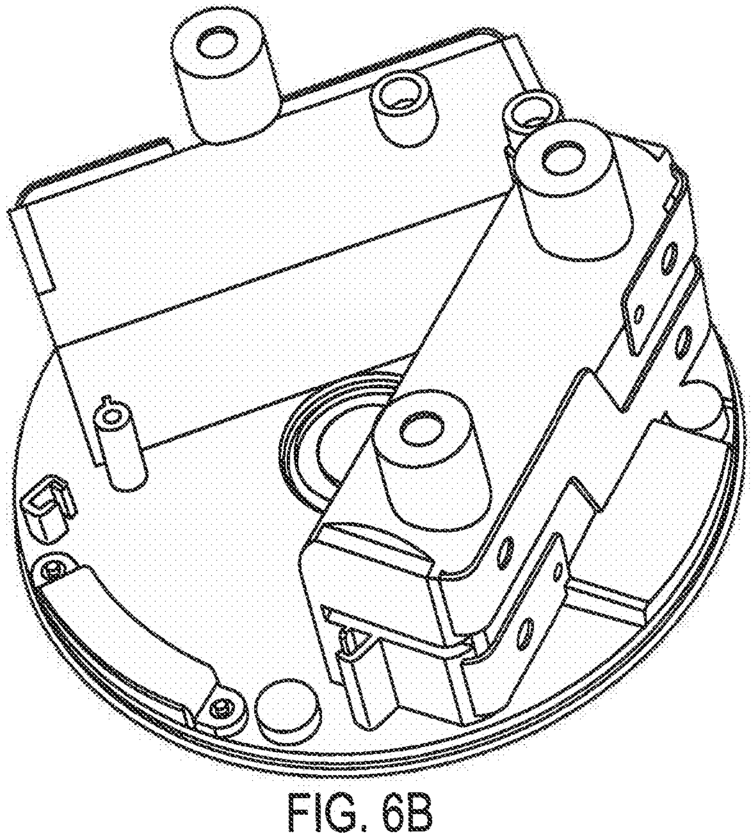
Figure 7A:
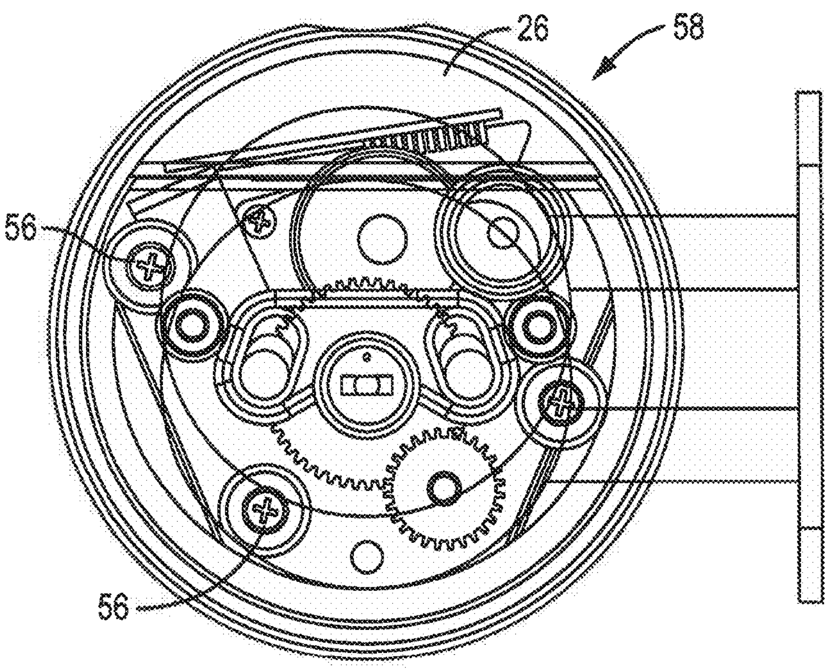
FIGS. 7(*a*) through (*e*) illustrate one embodiment of a mount, with attachment to the mounting plate that can be used with the present invention.
Figure 7B:
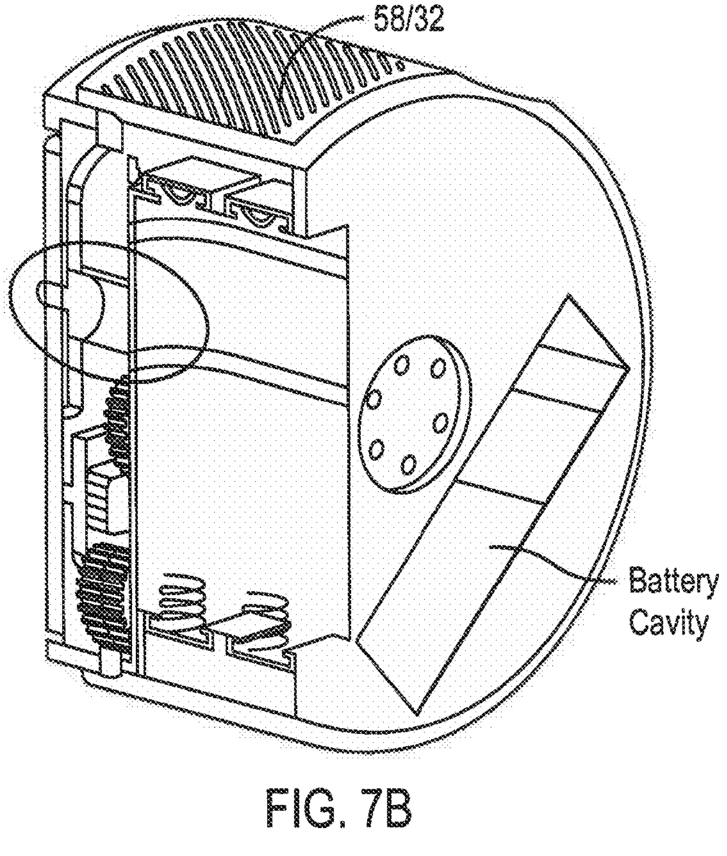
Figure 7C:
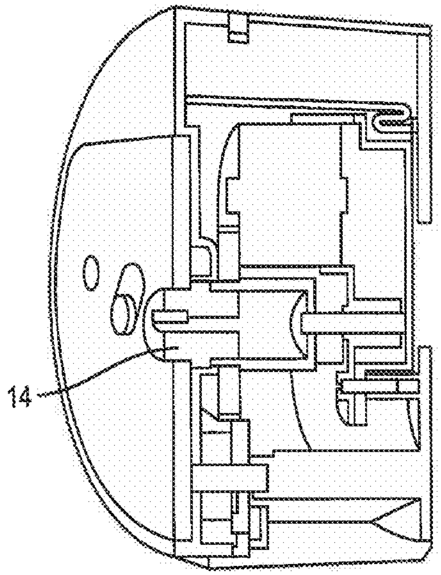
Figure 7D:
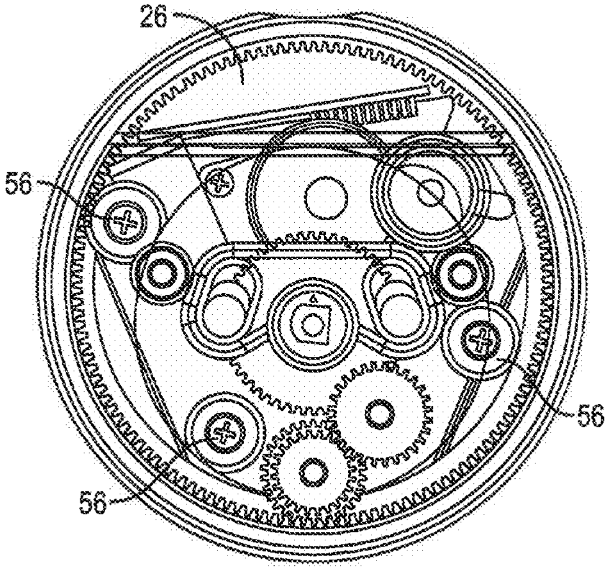
Figure 7E:
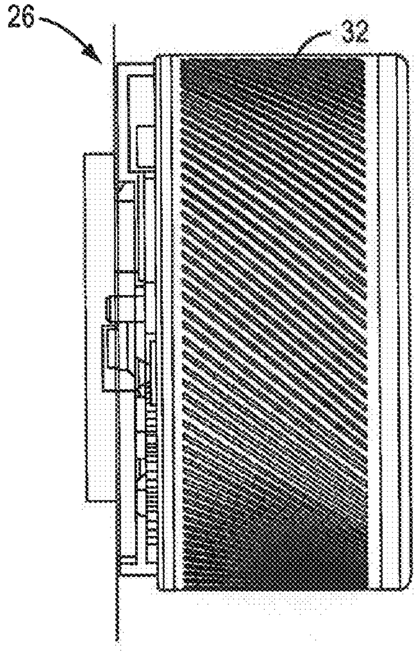

FIGS. 6(*a*) and (*b*), with front and back views, illustrate hook slots 52 that can be used with the present invention.

FIGS. 7(*a*) through (*e*) illustrate an embodiment of a mount 54, with attachment to the mounting plate 26. Screws 56 are captured in the housing 58, and/or ring 32 and accessed through a battery cavity. A user can open holes for access and replace the screws 56. In one embodiment, the screws extend through the mounting plate 26 into a door hole. In one embodiment, a height of the mounting plate 26 is minimized. During assembly, the lock device 22 is held in place, FIG. 7(*c*), temporarily by a top lip, FIG. 7(*d*) and the lock drive shaft 14.

Figure 8A:
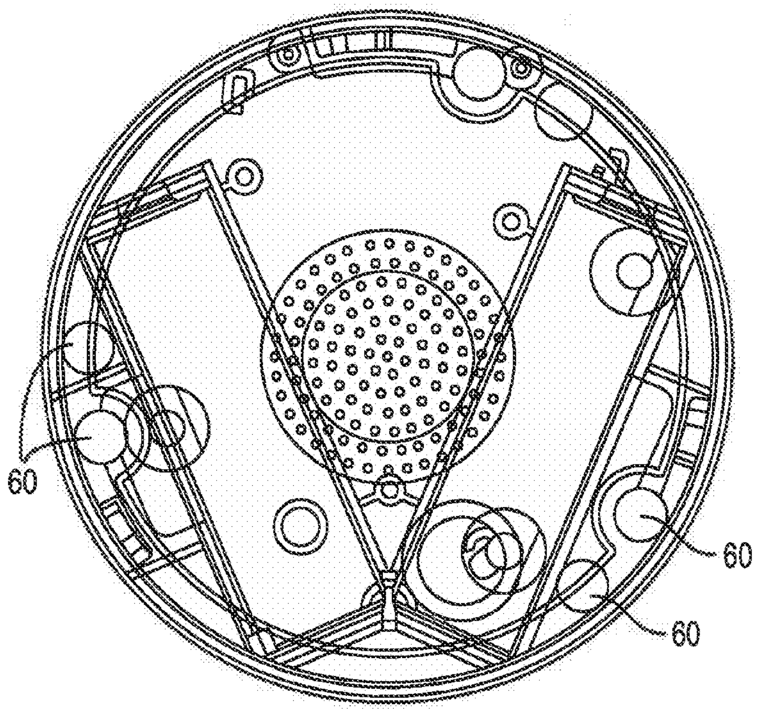
FIGS. 8(*a*)-(*b*) illustrate embodiments of the present invention where magnets are utilized.
Figure 8B:
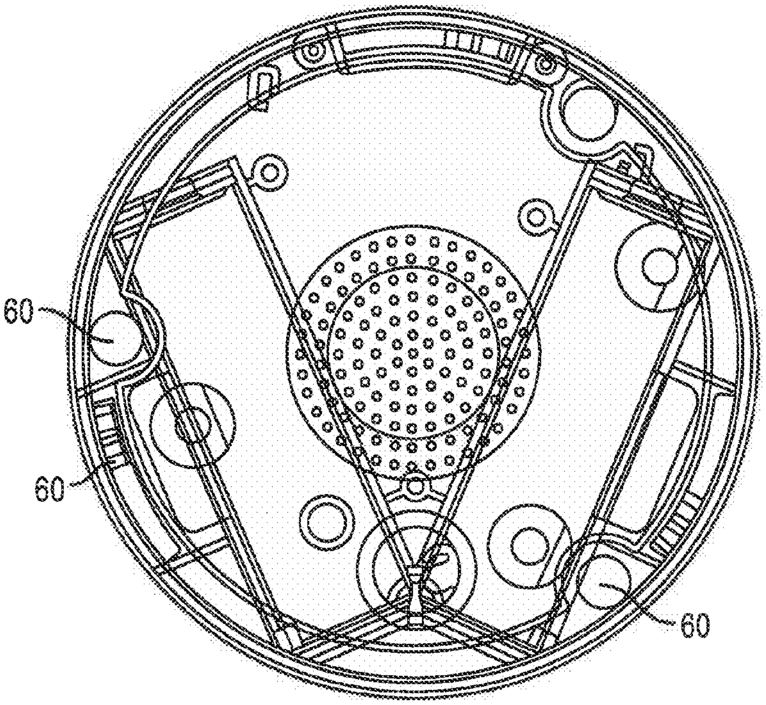
Figure 9A:
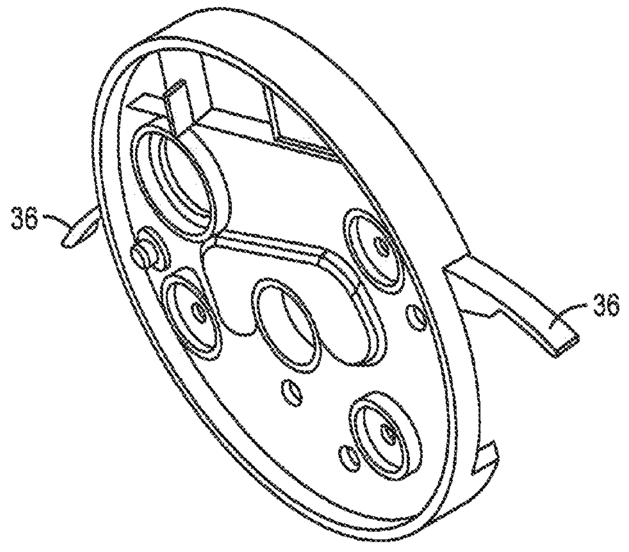
FIGS. 9(*a*)-(*e*) illustrate embodiments of the present invention with wing latches.
Figure 9B:
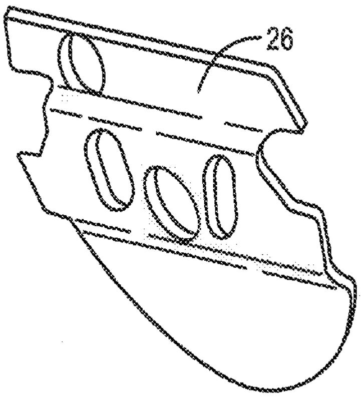
Figure 9C:
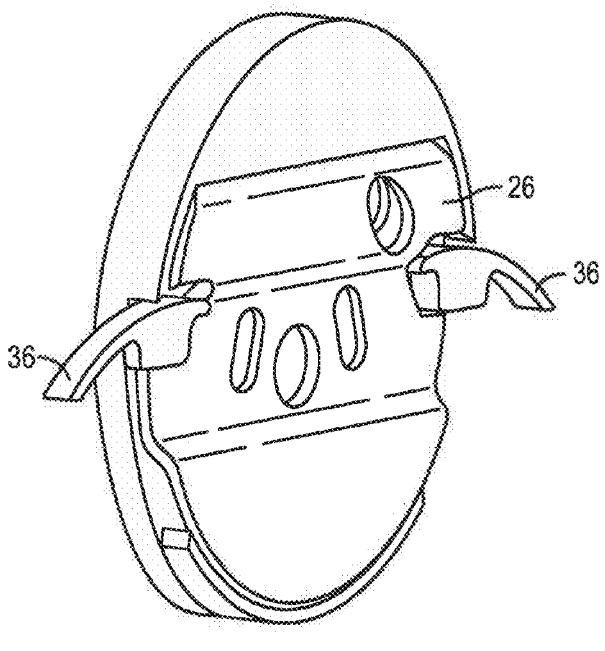
Figure 9E:
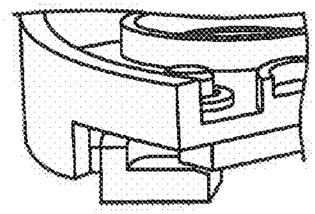
Figure 9D:
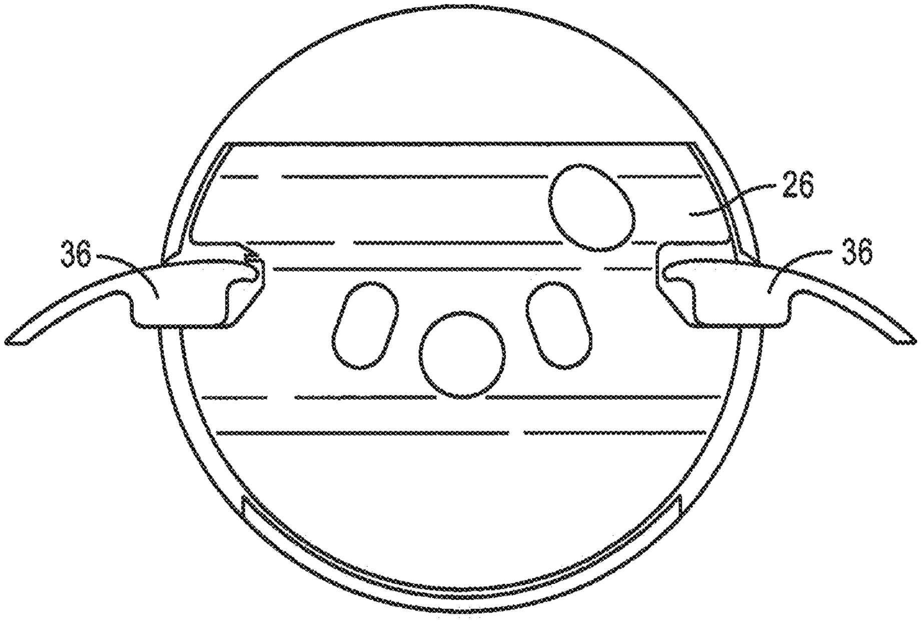

FIGS. 8(*a*)-(*b*) illustrate embodiments where magnets 60 are utilized. The magnet 60 locations are illustrated as are the tooled recesses from the top and side. In one embodiment, the magnets 60 are distanced by ranges of 1-100 mm, 3-90, 5-80 mm apart and the like.

FIGS. 9(*a*)-(*e*) illustrate embodiments of the present invention with wing latches 36. The wing latches 36 allow for movement of the lock device 22 with bolt/lock 24 towards its final position, in a Z-axis direction towards the door 12. Once the lock device 22 with bolt/lock 24 is in a final position, the wing latches 36 allows for the secure mounting without external tools. The wing latches 36 do the mounting. Wing latches 36 enable mounting of the lock device 22 and bolt/lock 24 with use of only the Z axis direction only, and X and Y directionality are not needed for the mounting.

In one embodiment, a lead in ramp, FIG. 9 (*e*) is used to pull the elements together.

Figure 10A:
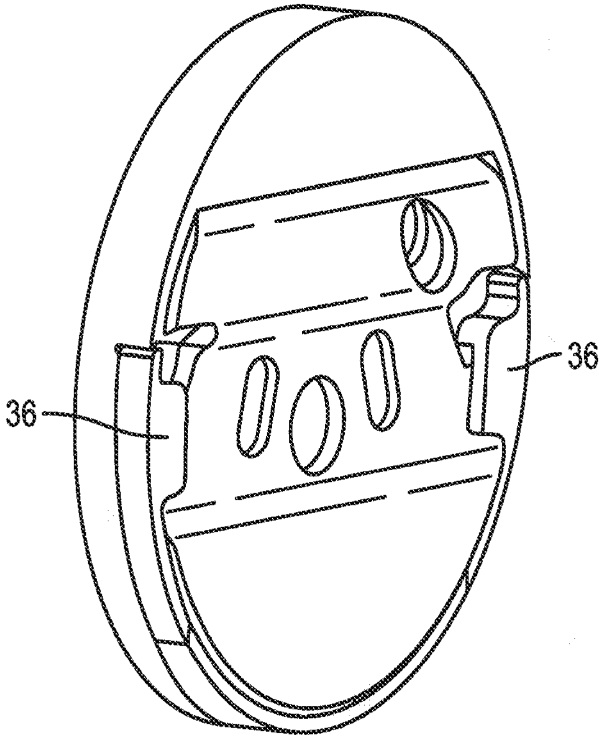
FIGS. 10(*a*)-(*c*) and FIGS. 11(*a*)-(*d*) illustrate further details of wing latching that is used in certain embodiments of the present invention.
Figure 10B:
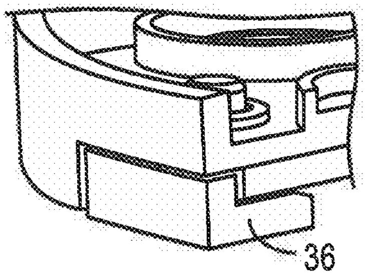
Figure 10C:
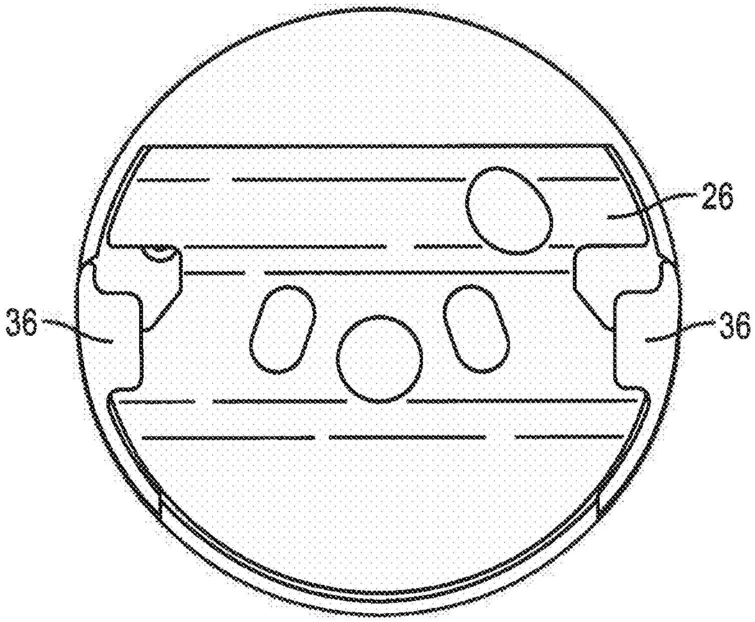
Figure 11A:
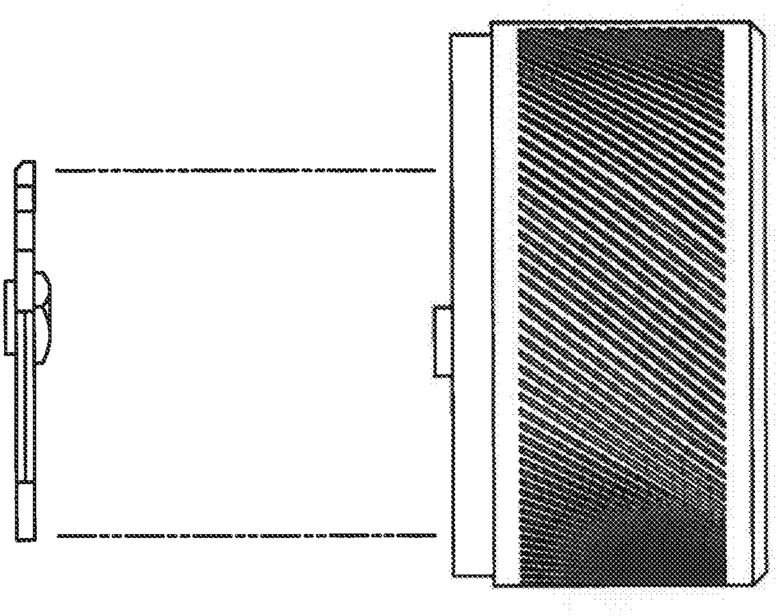
Figure 11B:
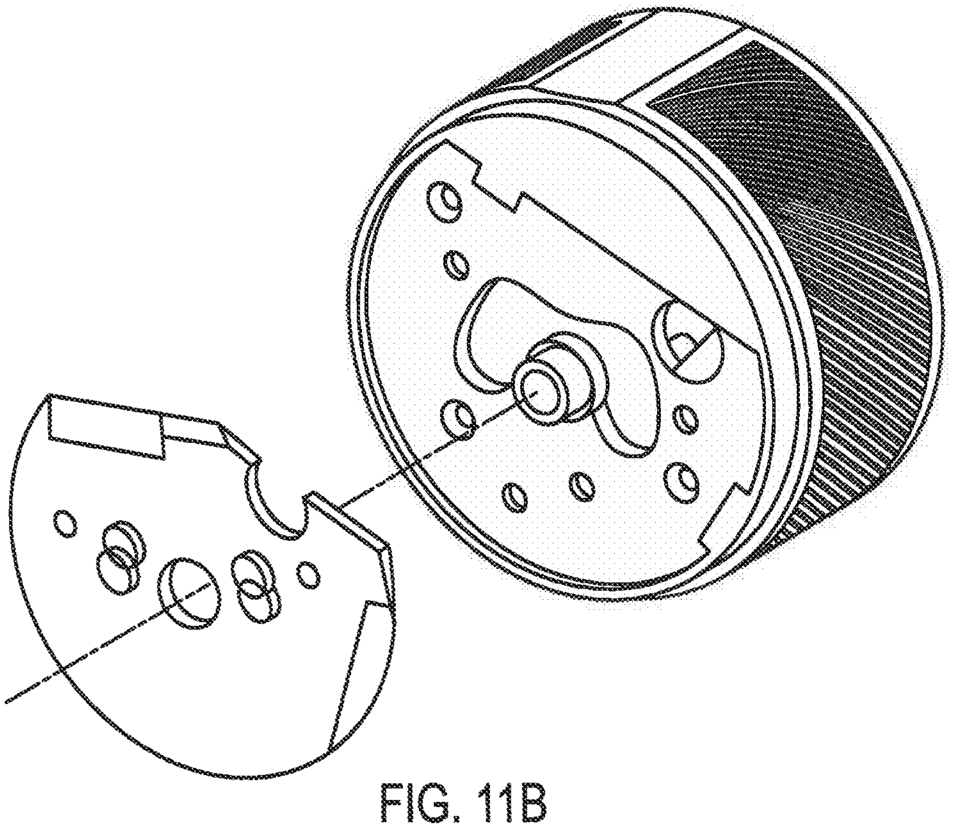
Figure 11C:
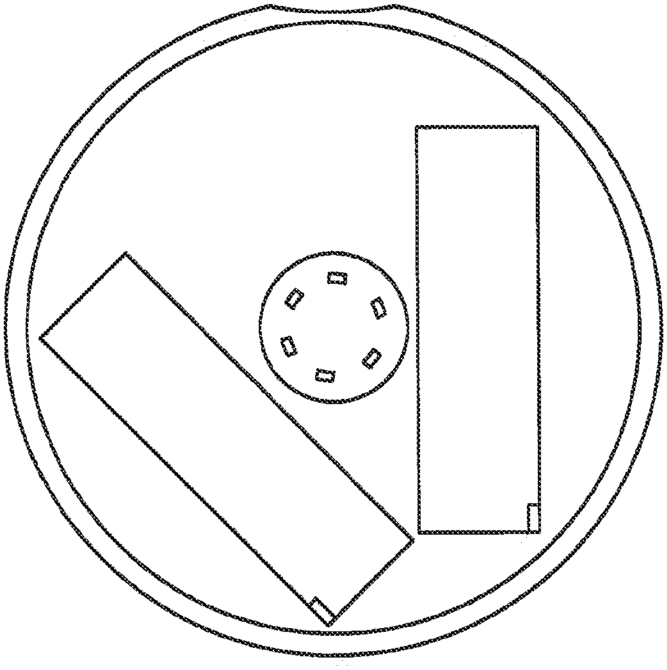
Figure 11D:
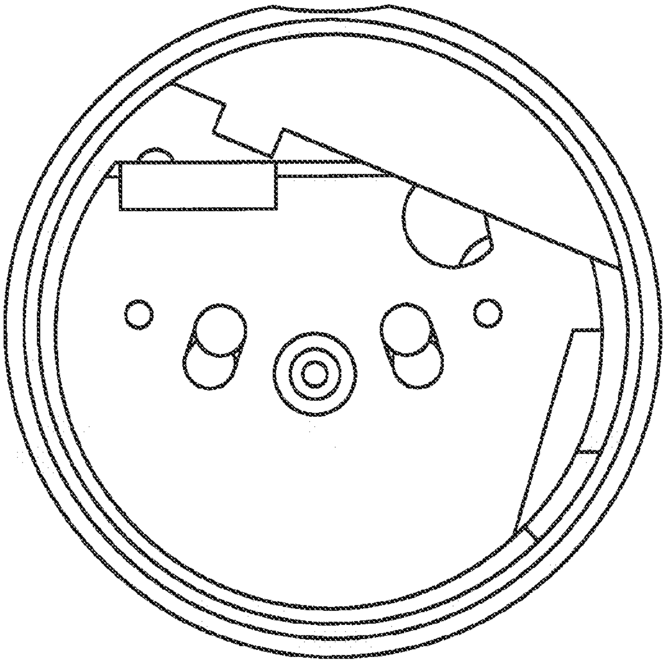
Figure 12A:
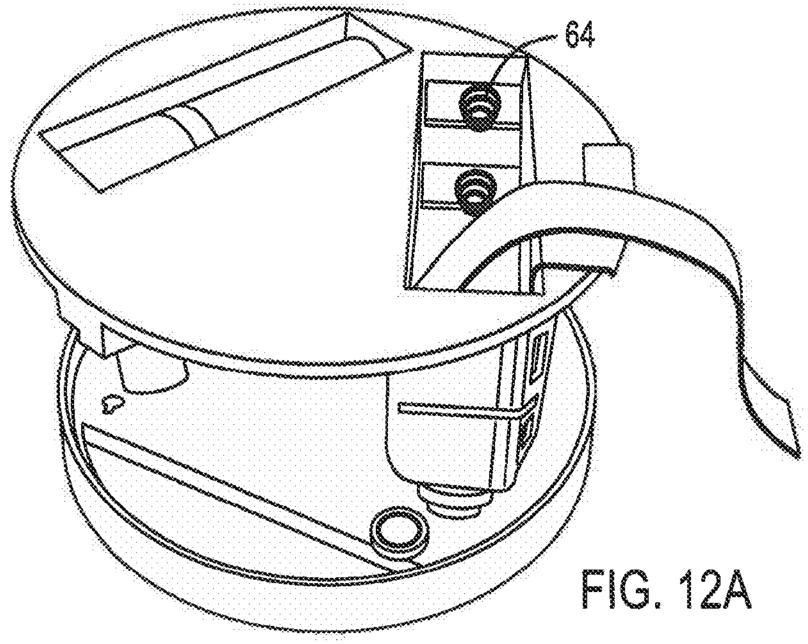
FIGS. 12(*a*)-(*d*) illustrate embodiments of battery contacts that can be used with the present invention.
Figure 12B:
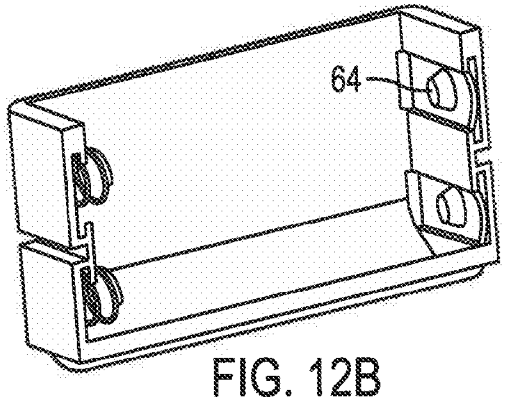
Figure 12C:
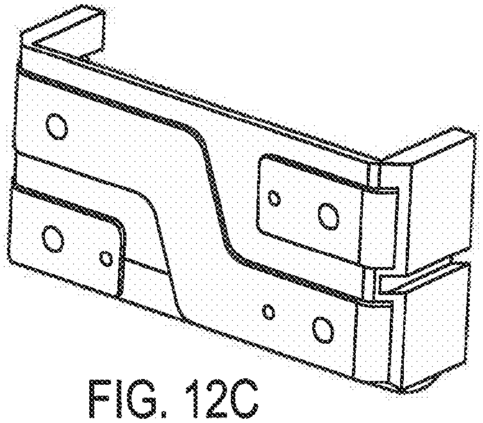
Figure 12D:
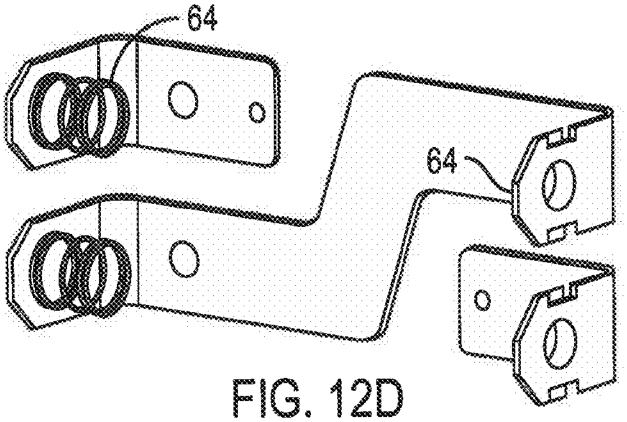

FIGS. 10(*a*)-(*c*) and FIGS. 11(*a*)-(*d*) illustrate further details of wing latching.

FIGS. 12(*a*)-(*d*) illustrate embodiments of battery contacts 64.

Figure 13A:
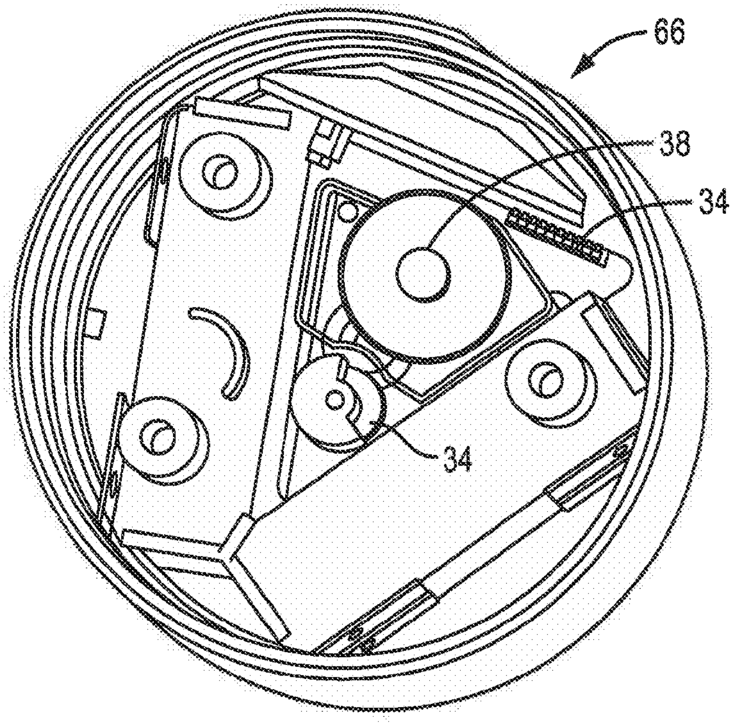
FIGS. 13(*a*) and (*b*) illustrate embodiments of a motor and gears in one embodiment of the present invention.
Figure 13B:
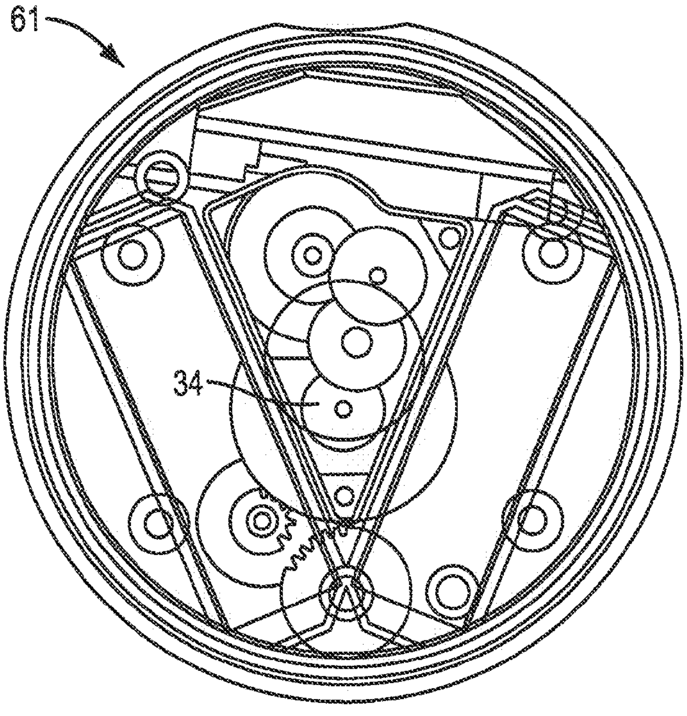

FIGS. 13(*a*) and (*b*) illustrate embodiments of motor 38 and one or more gears 34, with a gearbox 66. In one embodiment, a first gear 34 in sequence takes a large load if suddenly stopped while running.

Figure 14:
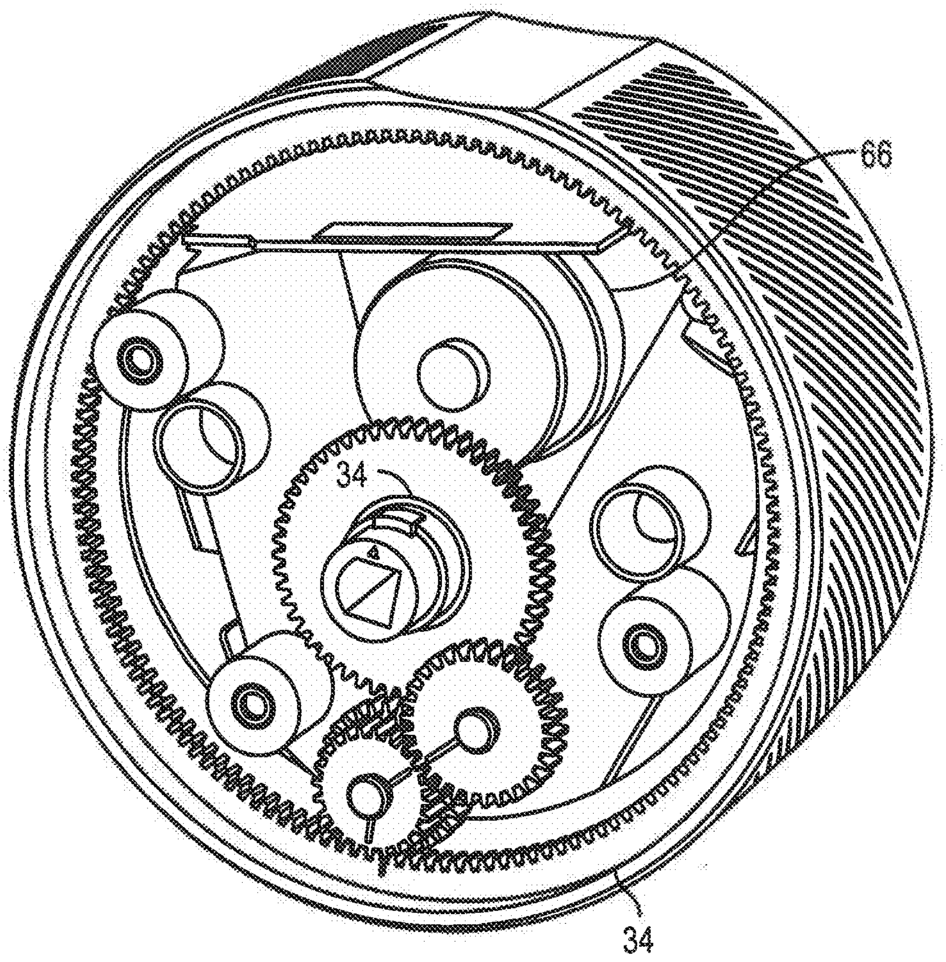
FIG. 14 illustrates an embodiment of the plurality of motion transfer device, including but not limited to gears, used in one embodiment of the present invention.
Figure 15A:
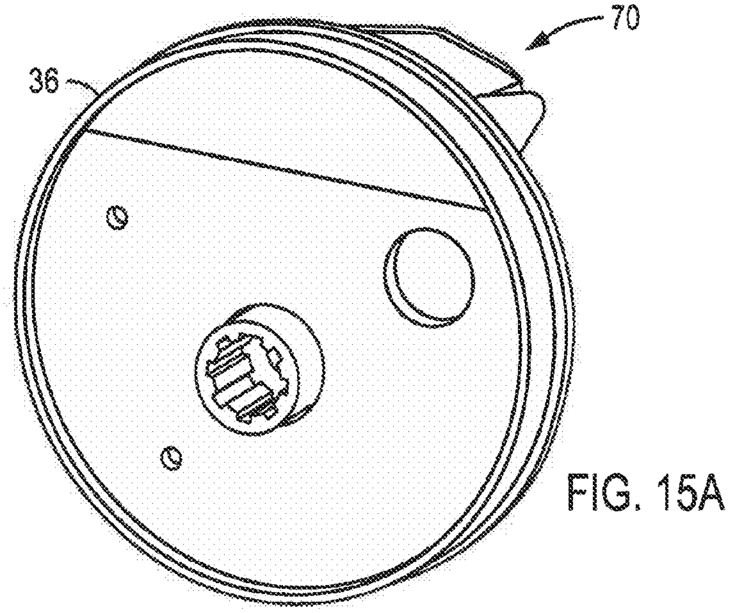
FIGS. 15(*a*)-(*b*) illustrate an embodiment of a speaker mounting.
Figure 15B:
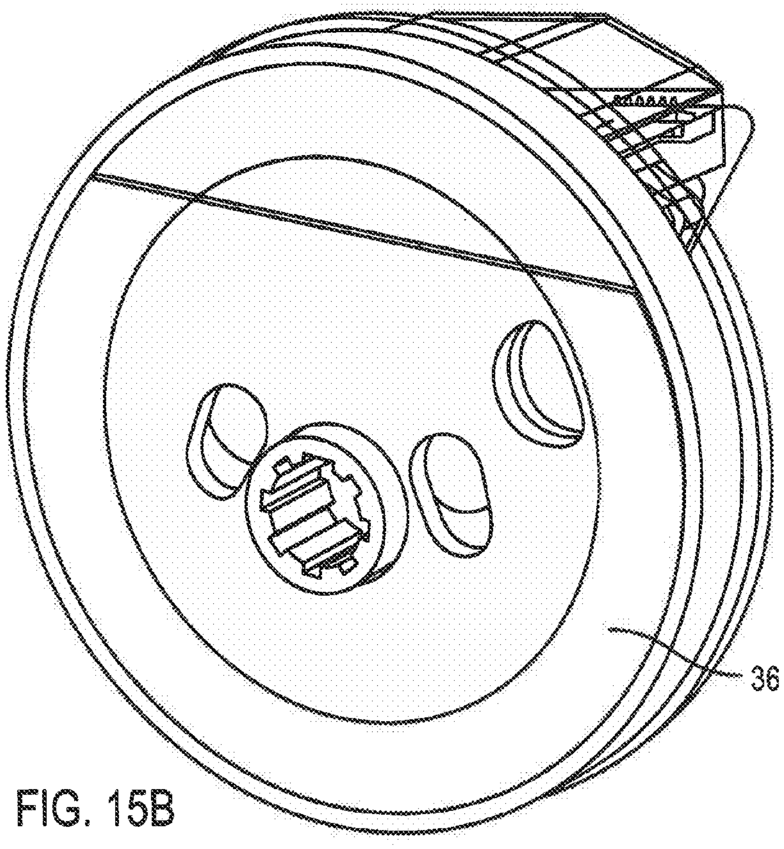
Figure 15C:
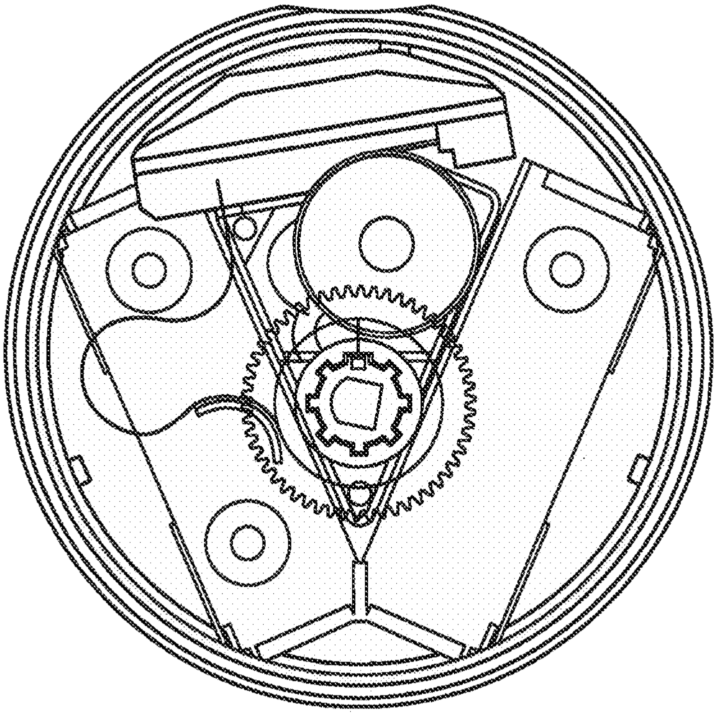
Figure 15D:
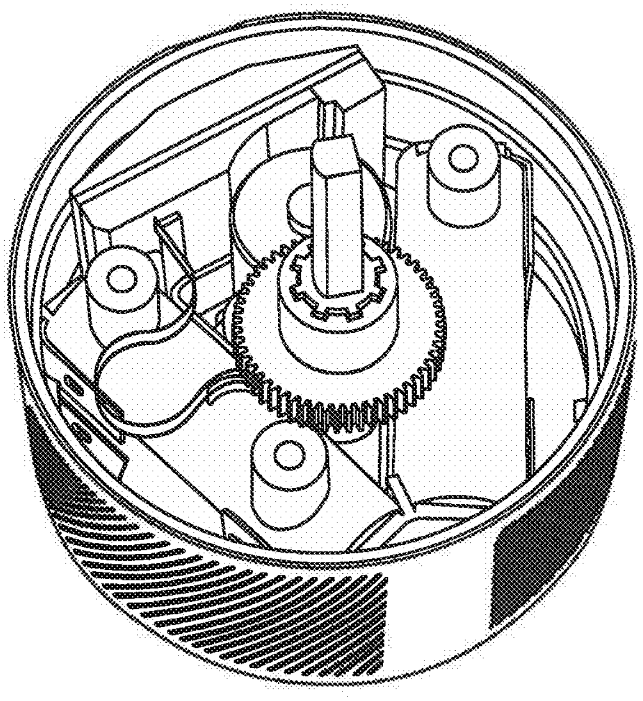

FIG. 14 illustrates an embodiment of a plurality of motion transfer devices such as gears 34. There can be come backlash in a gear train as a result of fits and tolerances. There can also be play between adapters 28 and lock drive shafts 14. This can produce play in an out gearbox 66 ring. This can be mitigated with a detent that located the outer ring.

The intelligent door lock system 10 can be in communication with an intelligent door lock system back-end 68, via Network Systems, as more fully described hereafter.

In one embodiment, the flex circuit 18, which has an out-of plane deflection of at least 1 degree, includes a position detector connector 46, Bluetooth circuit, and associated power points, as well as other elements.

In one embodiment, the intelligent door lock system 10 can use incremental data transfer via Network Systems, including but not limited to BLUETOOTH® and the like. The intelligent door lock system 10 can transmit data through the inductive coupling for wireless charging. The user is also able to change the frequency of data transmission.

In one embodiment, the intelligent door lock system 10 can engage in intelligent switching between incremental and full syncing of data based on available communication routes. As a non-limiting example, this can be via cellular networks, WiFi, BLUETOOTH® and the like.

In one embodiment, the intelligent door lock system 10 can receive firmware and software updates from the intelligent lock system back-end 68.

In one embodiment, the intelligent door lock system 10 produces an output that can be received by an amplifier, and decoded by an I/O decoder to determine 1/0 logic levels, as well as, both clock and data information. Many such methods are available including ratio encoding, Manchester encoding, Non-Return to Zero (NRZ) encoding, or the like; alternatively, a UART type approach can be used. Once so converted, clock and data signals containing the information bits are passed to a memory at the intelligent door lock system 10 or intelligent door lock system back-end 68.

In one embodiment, the intelligent door lock system 10, or associated back-end 68, can includes a repeatable pseudo randomization algorithm in ROM or in ASIC logic.

FIGS. 15(*a*)-(*b*) illustrate an embodiment of a speaker 17 and speaker mounting 70.

FIGS. 15(*c*)-(*d*) illustrate one embodiment of an accelerometer FPC service loop.

Figure 16:
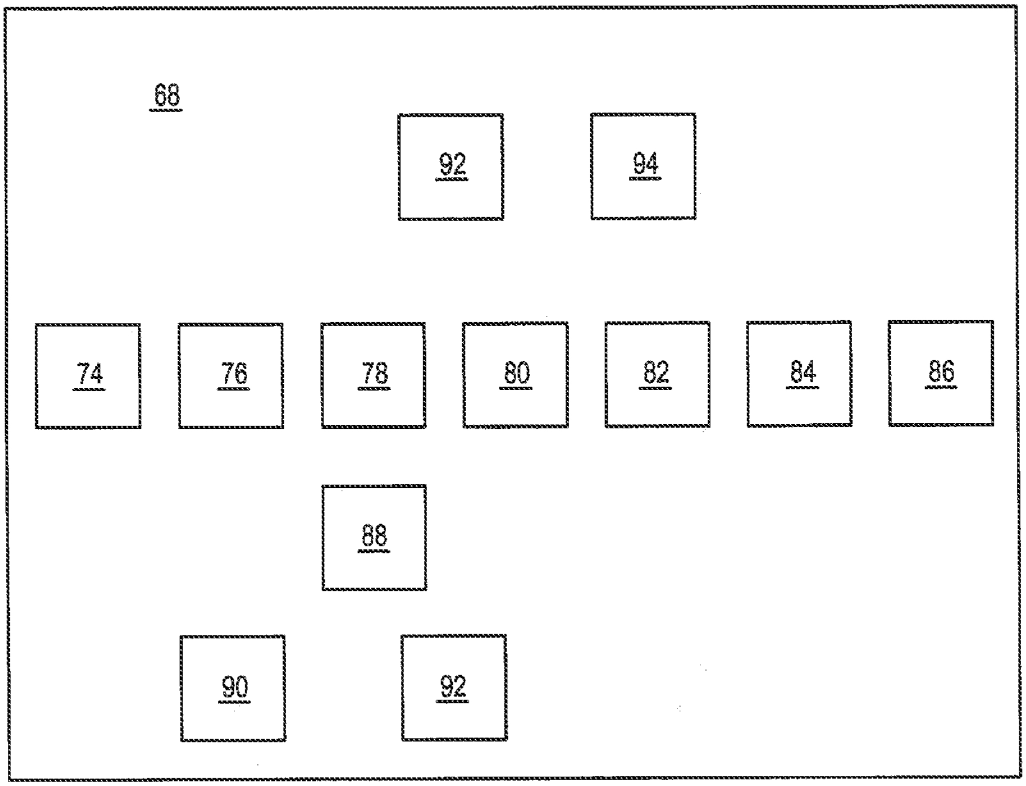
FIG. 16 illustrates one embodiment of a back-end associated with the intelligent door lock system.

As illustrated in FIG. 16, the intelligent door lock system back-end 68 can include one or more receivers 74, one or more engines 76, with one or more processors 78, coupled to conditioning electronics 80, one or more filters 82, one or more communication interfaces 84, one or more amplifiers 86, one or more databases 88, logic resources 90 and the like.

The back-end 68 knows that an intelligent door lock system 10 is with a user, and includes a database with the user's account information. The back-end 68 knows if the user is registered or not. When the intelligent door lock system 10 is powered up, the back-end 68 associated that intelligent door lock system 10 with the user.

The conditioning electronics 80 can provide signal conditioning, including but not limited to amplification, filtering, converting, range matching, isolation and any other processes required to make sensor output suitable for processing after conditioning. The conditioning electronics can provide for, DC voltage and current, AC voltage and current, frequency and electric charge. Signal inputs accepted by signal conditioners include DC voltage and current, AC voltage and current, frequency and electric charge. Outputs for signal conditioning electronics can be voltage, current, frequency, timer or counter, relay, resistance or potentiometer, and other specialized output.

In one embodiment, the one or more processors 78, can include a memory, such as a read only memory, used to store instructions that the processor may fetch in executing its program, a random access memory (RAM) used by the processor 78 to store information and a master dock. The one or more processors 78 can be controlled by a master clock that provides a master timing signal used to sequence the one or more processors 78 through internal states in their execution of each processed instruction. In one embodiment, the one or more processors 78 can be low power devices, such as CMOS, as is the necessary logic used to implement the processor design. Information received from the signals can be stored in memory.

In one embodiment, electronics 92 are provided for use in intelligent door system 10 analysis of data transmitted via System Networks. The electronics 92 can include an evaluation device 94 that provides for comparisons with previously stored intelligent door system 10 information.

Signal filtering is used when the entire signal frequency spectrum contains valid data. Filtering is the most common signal conditioning function, as usually not all the signal frequency spectrum contains valid data.

Signal amplification performs two important functions: increases the resolution of the inputed signal, and increases its signal-to-noise ratio.

Suitable amplifiers 86 include but are not limited to sample and hold amplifiers, peak detectors, log amplifiers, antilog amplifiers, instrumentation amplifiers, programmable gain amplifiers and the like.

Signal isolation can be used in order to pass the signal from to a measurement device without a physical connection. It can be used to isolate possible sources of signal perturbations.

In one embodiment, the intelligent door lock system back-end 68 can provide magnetic or optic isolation. Magnetic isolation transforms the signal from voltage to a magnetic field, allowing the signal to be transmitted without a physical connection (for example, using a transformer). Optic isolation takes an electronic signal and modulates it to a signal coded by light transmission (optical encoding), which is then used for input for the next stage of processing.

In one embodiment, the intelligent door lock system 10 and/or the intelligent door lock system back-end 68 can include Artificial Intelligence (AI) or Machine Learning-grade algorithms for analysis. Examples of AI algorithms include Classifiers, Expert systems, case based reasoning, Bayesian networks, and Behavior based AI, Neural networks, Fuzzy systems, Evolutionary computation, and hybrid intelligent systems.

Information received or transmitted from the back-end 68 to the intelligent door system 10 and mobile device 210 can use logic resources, such as AI and machine learning grade algorithms to provide reasoning, knowledge, planning, learning communication, and create actions.

In one embodiment, AI is used to process information from the intelligent door lock system 10, from mobile device 210, and the like. The back-end 68 can compute scores associated with various risk variables involving the intelligent door lock system 10. These score can be compared to a minimum threshold from a database and an output created. Alerts can be provided to the intelligent door lock system 10, mobile device 210 and the like. The alert can provide a variety of options for the intelligent door lock system 10 to take, categorizations of the received data from the mobile device 210, the intelligent door lock system 10, and the like, can be created. A primary option can be created as well as secondary options.

In one embodiment, data associated with the intelligent door lock system 10 is received. The data can then be pre-processed and an array of action options can be identified. Scores can be computed for the options. The scores can then be compared to a minimum threshold and to each other. A sorted list of the action options based on the comparison can be outputted to the intelligent door lock system 10, the mobile device 210 and the like. Selections can then be received indicating which options to pursue. Action can then be taken. If an update to the initial data is received, the back-end 68 can then return to the step of receiving data.

Urgent indicators can be determined and directed to the intelligent door lock system 10, including unlocking, locking and the like.

Data received by the intelligent door lock system 10 and mobile device 210 can also be compared to third party data sources.

In data evaluation and decision making, algorithm files from a memory can be accessed specific to data and parameters received from the intelligent door lock system 10 and mobile device 210.

Scoring algorithms, protocols and routines can be run for the various received data and options. Resultant scores can then be normalized and weights assigned with likely outcomes.

The intelligent door lock system 10 can be a new lock system mounted to a door 12, with all or most of the elements listed above, or it can be retrofitted over an existing lock device 22.

To retrofit the intelligent door lock system 10 with an existing lock system, the user makes sure that the existing lock device 22 and bolt/lock 24 is installed right-side up. The existing thumb-turn is then removed. With some lock devices 22, additional mounting plates 26 need to be removed and the intelligent door lock system 10 can include replacement screws 56 that are used. The correct mounting plate 26 is then selected. With the existing screws 56 in the thumb-turn, the user sequentially aligns with 1 of 4 mounting plates 26 that are supplied or exist. This assists in determining the correct diameter and replace of the screws 56 required by the bolt/lock 24. The mounting plate 26 is then positioned. The correct adapter 28 is positioned in a center of the mounting plate 26 to assist in proper positioning. Caution is made to ensure that the adapter 28 does not rub the sides of the mounting plate 26 and the screws 56 are then tightened on the mounting plate 26. The intelligent door lock system bolt/lock 24 of lock device 22 is then attached. In one embodiment, this is achieved by pulling out side wing latches 36, sliding the lock device 22 and/or bolt/lock 24 over the adapter 28 and pin and then clamping down the wings 36 to the mounting plate 26. The faceplate is rotated to open the battery compartment and the battery tabs are then removed to allow use of the battery contacts 64. An outer metal ring 32 to lock and unlock the door 12 is then rotated. An app from mobile device 210 and/or key then brings the user through a pairing process.

A door 12 can be deformed, warped, and the like. It is desirable to provide a customer or user, information about the door, e.g., if it is deformed, out of alignment, if too much friction is applied when opening and closing, and the like.

As recited above, the current sensor 46 monitors the amount of current that goes to the motor 38 and this information is received and processed by the engine/processor 36 with memory and is coupled to the circuit 18. The amount of current going to the motor 38 is used to determine the amount of friction experienced by door 12 and/or lock device 22 in opening and/or closing, as applied by the intelligent door lock system 10 and the positioning sensing device 16 to the drive shaft 14. The circuit 18 and engine/processor 36 can provide for an adjustment of current. The engine/processor 36 can provide information regarding the door and friction to the user of the door 12.

In one embodiment of the present invention, the intelligent door lock system 10 provides an ability to sense friction on the lock device 22 and/or door 12 by measuring the torque required to move the bolt/lock 24. The intelligent door lock system 10 increases the applied torque gradually until the bolt/lock 24 moves into its desired position, and the applied torque is the minimum amount of torque required to move the bolt/lock 24, which is directly related to how deformed the door is.

In one embodiment, when a bad door is detected, a customer can be notified that their door may require some servicing. In one embodiment, door deformation can be detected with a torque device is used to determine if the torque applied when the door is rotated is too high. As a non-limiting example, this can be 2-15 in lbs of torque The intelligent door lock system back end 68 can then perform a comparison between the measured torque with a standard, or a norm that is included in the one or more databases 88.

In one embodiment of the present invention, before the door is serviced, the intelligent door lock system 10 allows operation by offering a high-friction mode. As a non-limiting example, the high friction mode is when, as non-limiting examples, 2 inch lbs, 3 inch lbs., 3.5 inch pounds, and the like are required to open the door. In the high friction mode, the bolt/lock 24 is driven while the user is pushing, lifting, torqueing the door, pulling, performing visual inspections of rust, blockage, other conditions that can compromise a door and the like, that is applied to the doorknob. The position sensing device 16 is used to determine if the bolt/lock 24 was moved to a final position. In the high friction mode, motion of the door closing is confirmed. Upon detecting the closing of the door, the bolt/lock 24 is then driven. When the user receives an auditory, visual, or any other type of perceptible confirmation, the user then knows that the door has been locked. In one embodiment, the firmware elements, of the intelligent door lock system 10, as well as other door lock device 22 elements, can also attempt to drive the bolt/lock 24 for a second time when the first time fails. However, this can result in more power consumption, reducing lifetime of the power source, particularly when it is battery 50 based.

In one embodiment of the present invention, the intelligent door lock system 10 seeks to have the motor 38 operate with reduced energy consumption for energy source lifetime purposes, as well as eliminate or reduce undesirable noises, operations, and user experiences that occur when this is a failure in door locking and unlocking, particularly due to door deformation, door non-alignment, as well as other problems with the door that can be irritating to the person locking or unlocking the door.

In one embodiment of the present invention, the intelligent door lock system back-end 68 can track performance of doors and friction levels across time and build a service to encourage users to better maintain their doors. Such service can be a comparison of a door's friction level to other users that are similar geographic locations, at similar weather pattern, such that the user is encouraged to maintain their doors at a competent level. There can be a comparison to standards that at a certain level the door becomes unsafe. Guidelines are provided as to how to maintain their doors. This can be achieved by asking a door user what improves their door, including but not limited to, pushing, lifting, torqueing the door, pulling, visual inspections of rust, blockage, other conditions that can compromise a door, and the like. The analysis and comparison can be conducted at the back-end 68 and the results computed to door lock operator as well as others.

In one embodiment of the present invention, the intelligent door lock system 10 has a deformed operation mode that can be activated after a selected amount of time. As a non-limiting example, this can immediately after the user has been notified, more than 1 pico second, 1 second, 5 seconds, and greater periods of time. The deformed operation mode can be activated by the intelligent door lock system 10 itself, or by the intelligent door lock system back-end 68. It can be activated on the door operator's request. In one embodiment, the back-end 68 can anticipate these problems. As non-limiting examples, these can include but are not limited to, due to analysis of doors 12 in similar geographic areas, doors under similar conditions, doors with similar histories, similar environmental conditions, as well as the history of a particular door, and the like.

The deformed mode provides cooperation with the door user to more readily open the door. In one embodiment, this is a mechanism for the door to communicate back to the door lock operator. As a non-limiting example, feedback can be provided to the door operator. Such feedback can include, but is not limited to, communication via, tactile, audio, visual, temperature, electronic, wirelessly, through a computer, mobile device and the like. In another embodiment, the operator can signify to the door the operator's desire to leave by unlocking and opening the door 12. This is a door operator and lock communication. The door operator can close the door, which is sensed by the intelligent door lock system 10, a timer can then be initiated to provide with door operator with a selected time period in which the door operator can manually alleviate the friction problem. When the time has expired, the intelligent door system 10 can then lock the door 12. Upon detecting a successful door locking event, the intelligent door lock system 10 can advise the door operator that there is a successful door locking. If the door locking is not successful, the intelligent door lock system 10 can provide a message to the door operator via a variety of means, including but not limited to a message or alert to the door lock operator's mobile device. Such a mobile device message provides the door operator with notification that door locking was not successful or achieved, and the door lock operator can then take action to lock the door 12 either in person, wirelessly, and the like.

For entry, communication with the lock device 22 may be different. In one embodiment, it can be locking coupled with close proximity to a mobile device that is exterior to the door.

In another embodiment of the present invention, the intelligent door lock system back-end 68 can track performance of doors and friction levels across time and build a simple service to encourage users to maintain their doors better, as discussed above.

This information can be stored in the one or more databases 64.

In one embodiment of the present invention, the intelligent door lock system 10 unlocks when a selected temperature is reached, when smoke is detected, when a fire is detected by processor 38 and the like. As non-limiting examples, the intelligent door lock system 10 unlocks the bolt/lock 24 when a temperature is sensed by the temperature sensor 46 that, as non-limiting examples, is greater than 40 degrees C., any temperature over 45 degrees C. and the like. The temperature sensor 46 212 sends a signal to the processor 36 which communicates with the motor 38 that will then cause the drive shaft 14 to rotate sufficiently and unlock the bolt/lock 24. An arm can also be activated. It will be appreciated that the processor 36 can be anywhere as long as it is in communication with the temperature sensor 46, and the motor 38, which can be at the intelligent door lock system 10, at the back-end 68, anywhere in the building, and at any remote location. The processor 36 determines if there is an unsafe condition, e.g., based on a rise in temperature and this then results in an unlocking of the bolt/lock 24.

In one embodiment, the intelligent door lock system back-end 68 can track performance of doors and friction levels across time and build a service to encourage users to better maintain their doors, as discussed above.

Figure 17:
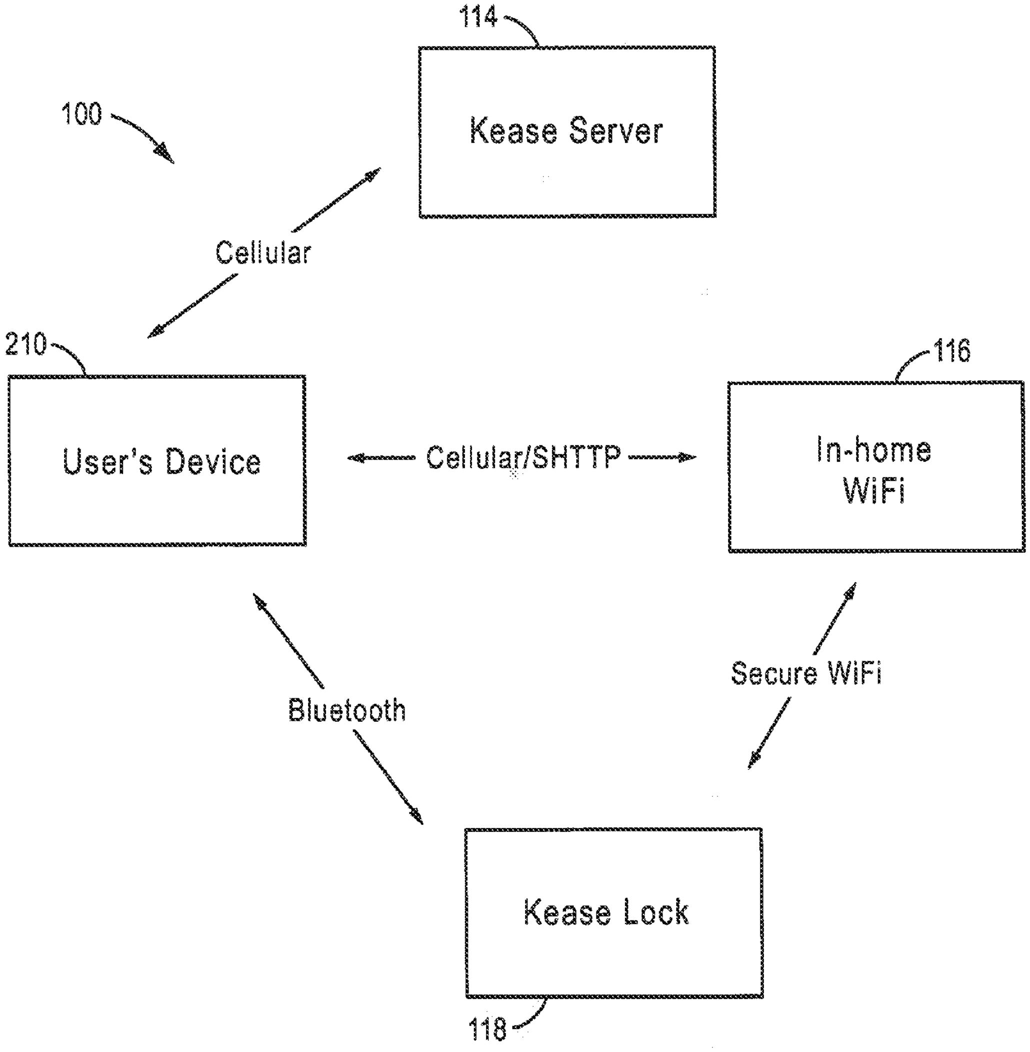
FIG. 17 is a diagram illustrating an implementation of an intelligent door lock system.

FIG. 17 is a diagram illustrating an implementation of an intelligent door look system 100 that allows an intelligent lock on one or more buildings to the controlled, as described above, and also controlled remotely by a mobile device or computer, as well as remotely by an intelligent lock system back-end component 114, a mobile device or a computing device 210 of a user who is a member of the intelligent door lock system 100, as disclosed above. The intelligent door lock system back-end component 114 may be any of those listed above included in the intelligent lock system back-end 68, one or more computing resources, such as cloud lock access services computing resources or server computers with the typical components, that execute a plurality of lines of computer code to implement the intelligent door lock system 100 functions described above and below. Each computing device 210 of a user may be a processing unit based device with sufficient processing power, memory and connectivity to interact with the intelligent door lock system back-end component 114. As a non-limiting example, the mobile device or computing device 210 may be as defined above, and include those disclosed below, that is capable of interacting with the intelligent door lock back-end component 114. In one implementation, the mobile device or computing device 210 may execute an application stored in the memory of the mobile device computing device 210 using a processor from the mobile device or computing device 210 to interact with the intelligent door lock back-end component 114. Examples of a user interface for that application is shown in FIGS. 21(*a*)-22(*e*) discussed below in more detail.

In another embodiment, the mobile device or computing device 210 may execute a browser stored in the memory of the mobile or computing device 210 using a processor from the mobile device or computing device 210 to interact with the intelligent door lock system back-end component 114. Each of the elements shown in FIG. 17 may be linked by System Networks, including but not limited to a cellular network, a Bluetooth system, the Internet (HTTPS), a WiFi network and the like.

As shown in FIG. 17, each user's mobile device or computer 210 may interact with the intelligent door lock system back-end 68 over System Networks, including but not limited to a wired or wireless network, such as a cellular network, digital data network, computer network and may also interact with the intelligent door lock system 10 using System Networks. Each mobile device or computing device 210 may also communicate with a WiFi network 115 or Network Systems over, as a non-limiting example, a network and the WiFi network 115 may then communicate with the intelligent door lock system 10.

Figure 18A:
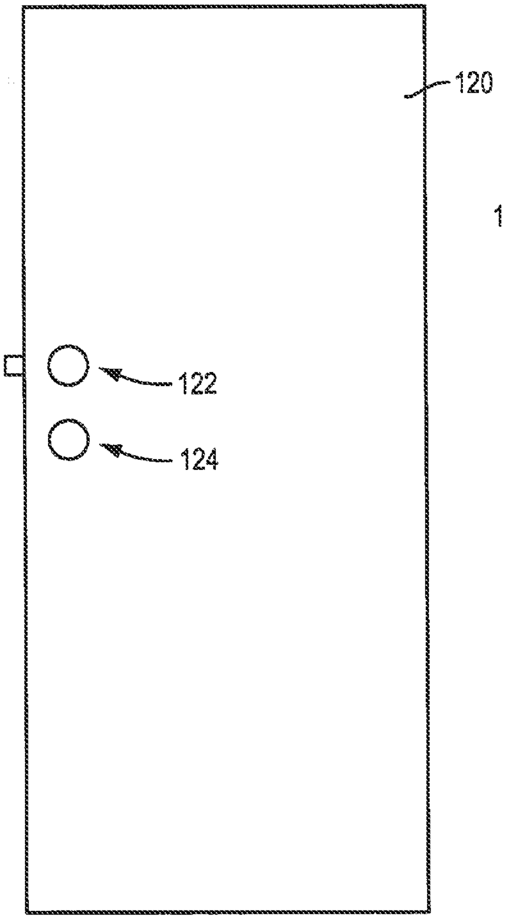
FIGS. 18(*a*) and (*b*) illustrate one embodiment of the present invention with a front view and a back view of a door with a bolt and an intelligent door lock system.
Figure 18B:
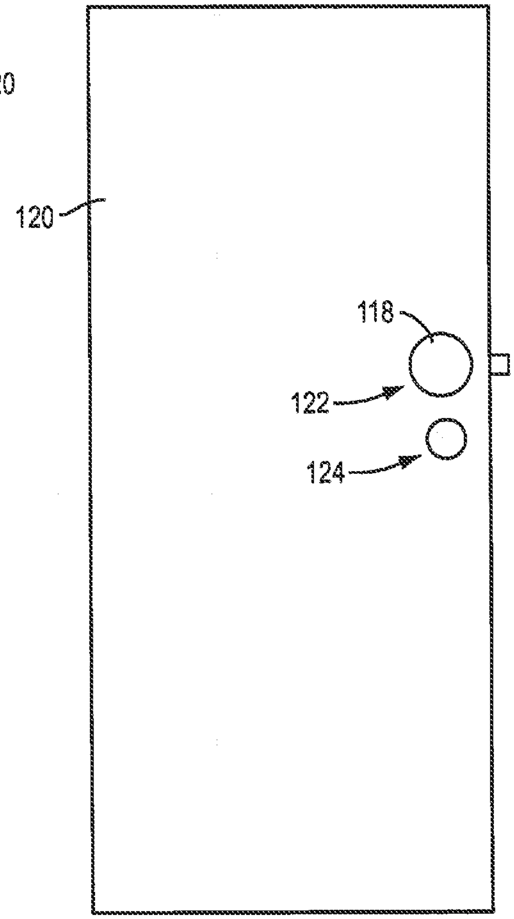

FIGS. 18(*a*) and (*b*) illustrate a front view and a back view, respectively, of a door 120 with intelligent door lock system 10. The front portion of the door 120 (that is outside relative to a building or dwelling) shown in FIG. 17 looks like a typical door 120 with a bolt assembly 122 and a doorknob and lock assembly 124. The back portion of the door 120, that is inside of the dwelling when the door 120 is closed, illustrated in FIG. 18(*b*) has the same doorknob and lock assembly 124, but then has an intelligent door lock system 100 that is retrofitted onto the bolt assembly 124 as described below in more detail.

Figure 23A:
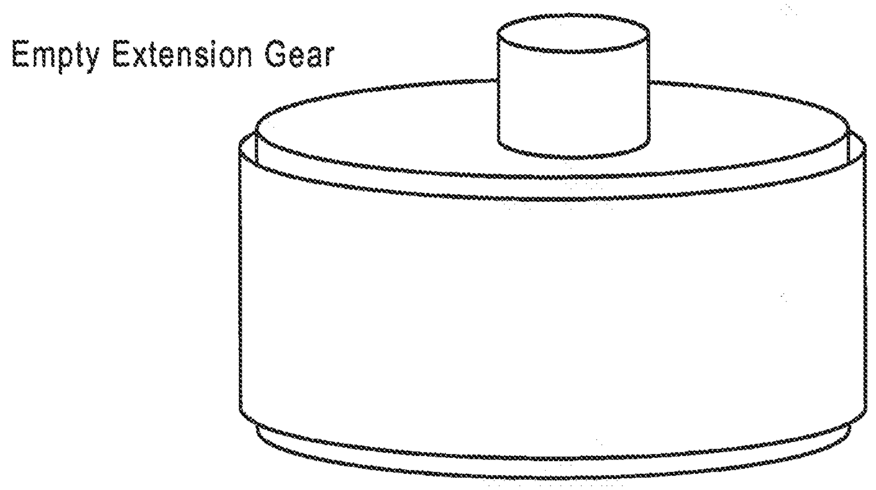
FIGS. 23(*a*) and (*b*) illustrate one embodiment of an intelligent door lock system with an empty extension and extension gear adapters.
Figure 23B:
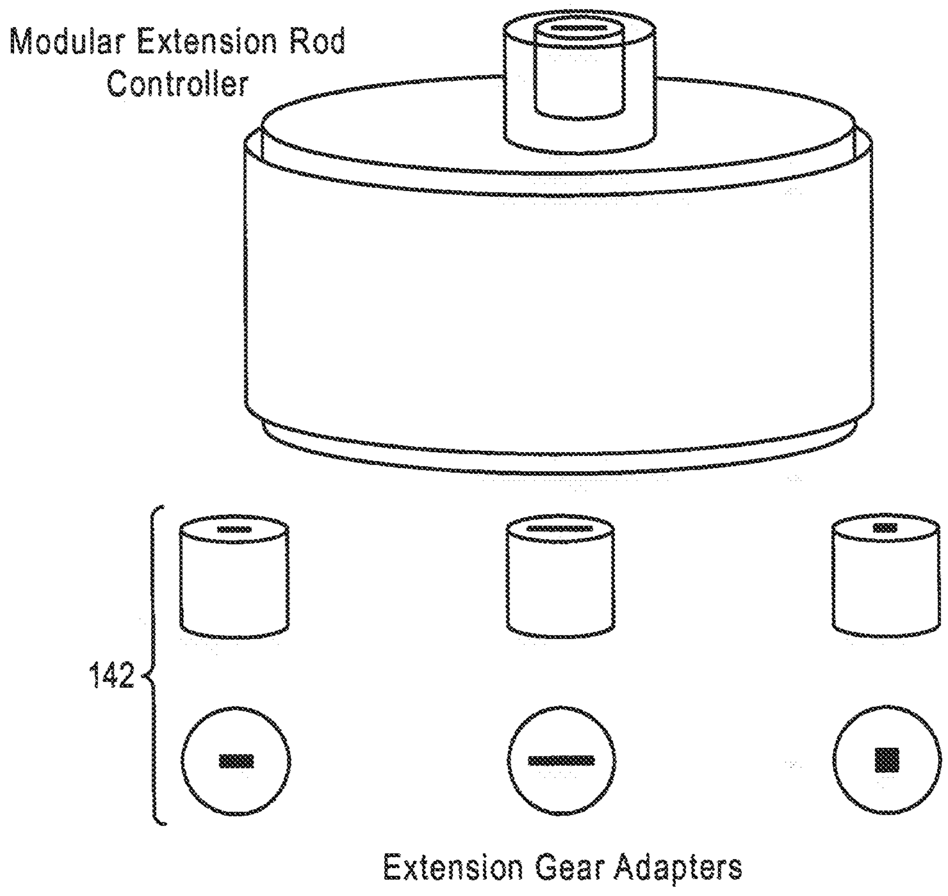

The intelligent door look assembly 100 may have an extension gear which extends through the baseplate of the smart door lock. The baseplate may have one or more oval mounting holes to accommodate various rose screw distances from 18 mm to 32 mm to accommodate various different doors. In one implementation, the intelligent door lock system 100 may have a circular shape and also a rotating bezel. The rotating bezel allows a user to rotate the smart door lock and thus manually lock or unlock the bolt as before. The extension gear extends through the baseplate and then interacts with the existing bolt elements and allows the smart door lock to lock/unlocks the bolt. The extension gear may have a modular adapter slot at its end which interfaces with an extension rod of the bolt assembly 124. These modular adapters, as shown in FIG. 23(*b*), may be used to match the existing extension rod of the bolt assembly 124. The smart door lock housing may further include an energy source, such as a battery, a motor assembly, such as a compact, high-torque, high-accuracy stepper motor, and a circuit board that has at least a processor, a first wireless connectivity circuit and a second wireless connectivity circuit, as described above. In one embodiment, the first wireless connectivity circuit may be a Bluetooth chip that allows the smart door lock to communicate using a Bluetooth protocol with a computing device of a user, such as a smartphone, tablet computer and the like. The second wireless connectivity circuit may be a WiFi chip that allows the smart door lock to communicate using a WiFi protocol with a back-end server system. The circuit board components may be intercoupled to each other and also coupled to the energy source and the motor for power and to control the motor, respectively. Each of the components described here may be coupled to the energy source and powered by the energy source.

Figure 19:
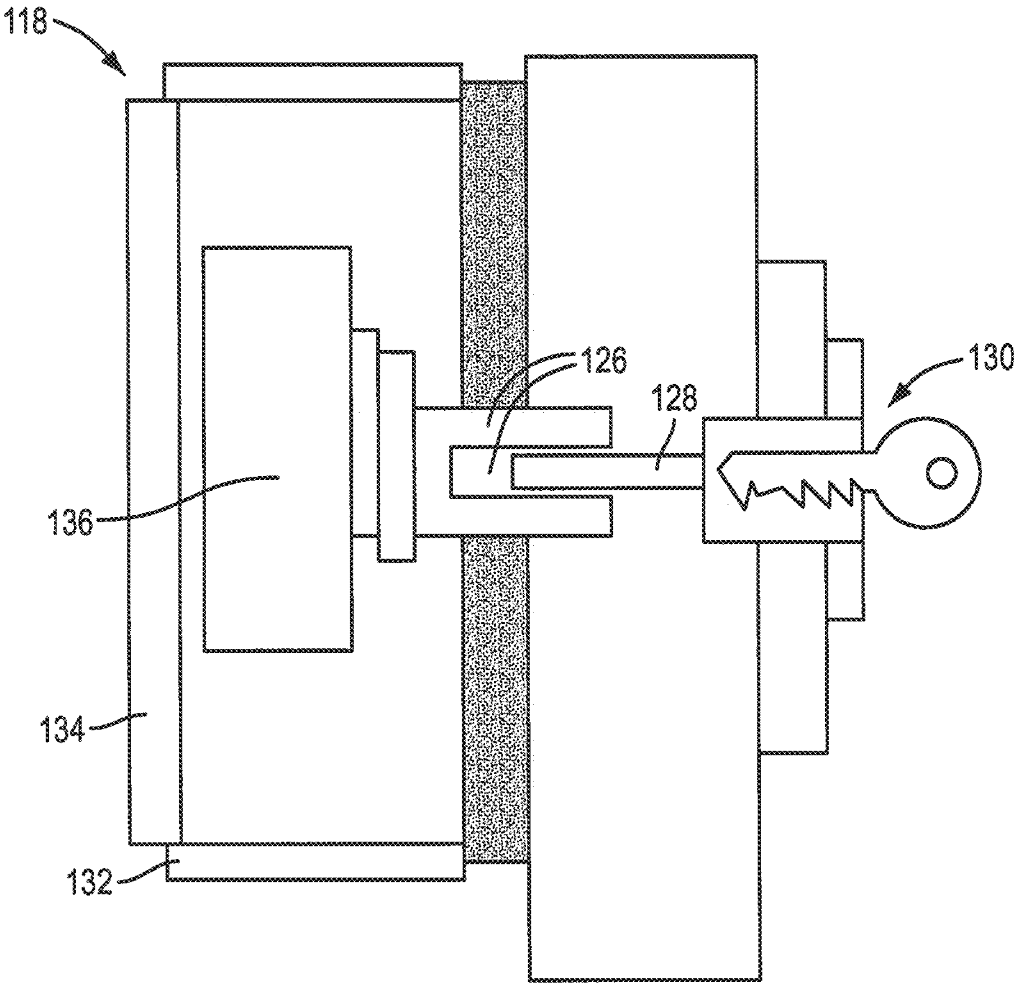
FIG. 19 illustrates more details of an embodiment of an intelligent door lock system of the present invention.

FIG. 19 illustrates the smart door lock system 100 being retrofitted onto a bolt in a door 10. As shown in FIG. 19, when the intelligent door lock system 100 is installed on the door 120, the thumb turn 124 is removed (replaced by the bezel that allows the user to manually unlock or lock the bolt.) In addition, the extension gear 126 of the intelligent door lock system 100, and more specifically the slotted portion 126(*a*) at the end of the extension gear, is mechanically coupled to the extension rod 128 of the bolt assembly as show in FIG. 19. When the intelligent door lock system 100 is installed, as shown in FIG. 19, the user can rotate the bezel 132 to manually lock or unlock the bolt assembly. In addition, when commanded to do so, the motor assembly in the intelligent door lock system 100 can also turn the extension gear 126 that in turn turns the extension rod and lock or unlock the bolt assembly. Thus, the extension gear 126 allows the smart door lock to act as a manual thumb turn (using the bezel) and rotate either clockwise or counterclockwise to engage or disengage the bolt of a bolt. The extension gear 126 is designed in a manner to control the physical rotation of extension rods/axial actuators/tail pieces/tongues 128 which are traditional rotated by means of a thumb turn. This is achieved by designing the extension gear 126 with modular gear adapters as shown in FIG. 23(*b*) to fit over the extension rod 22 as shown. This allows the extension gear 126 to fit with a variety of existing extension rods.

Figure 20:
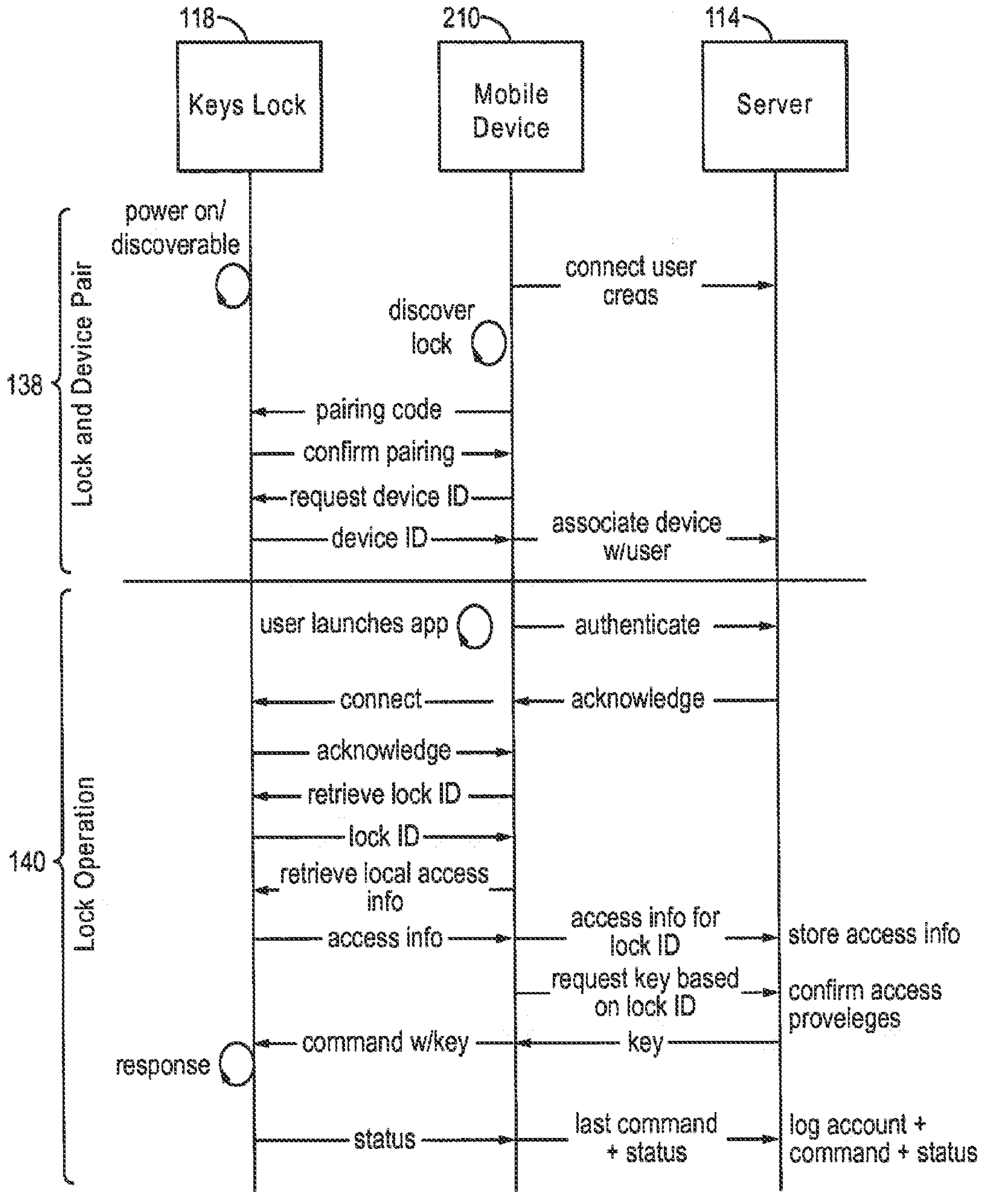
FIG. 20 illustrates one embodiment of the present invention showing a set of interactions between an intelligent door lock system, a mobile or computer and an intelligent door lock system back-end.
Figure 21A:
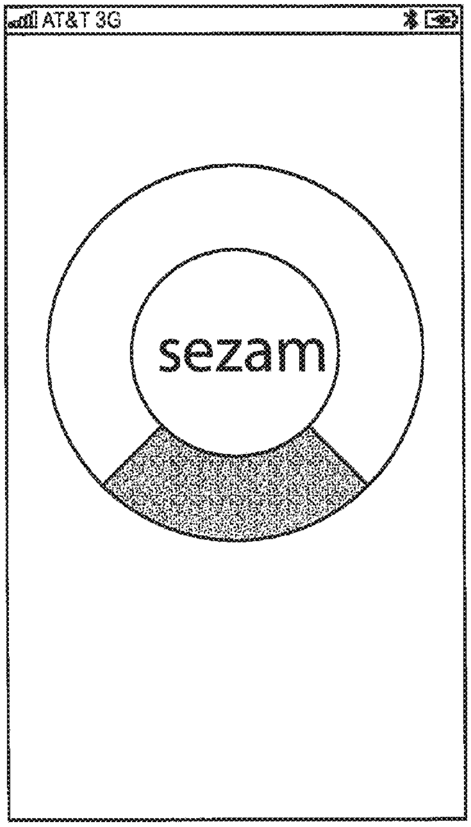
FIG. 21(*a*)-21(*g*) are examples of a user interface for an owner of a building that has an intelligent door lock system in one embodiment of the present invention.
Figure 21B:
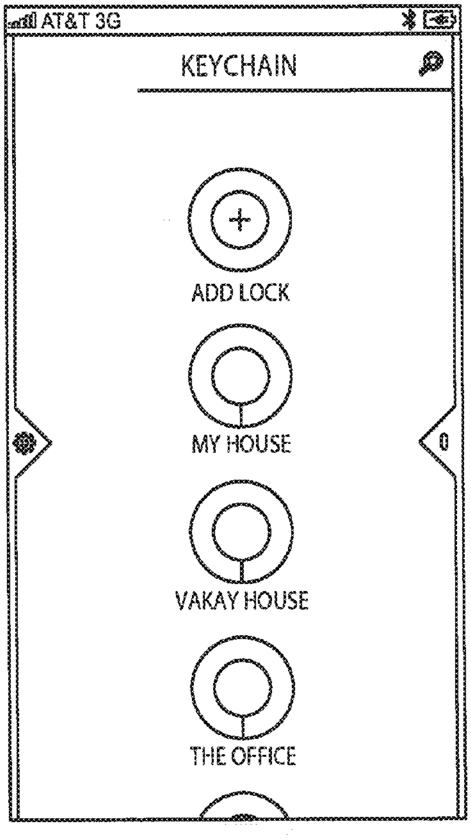
Figure 21C:
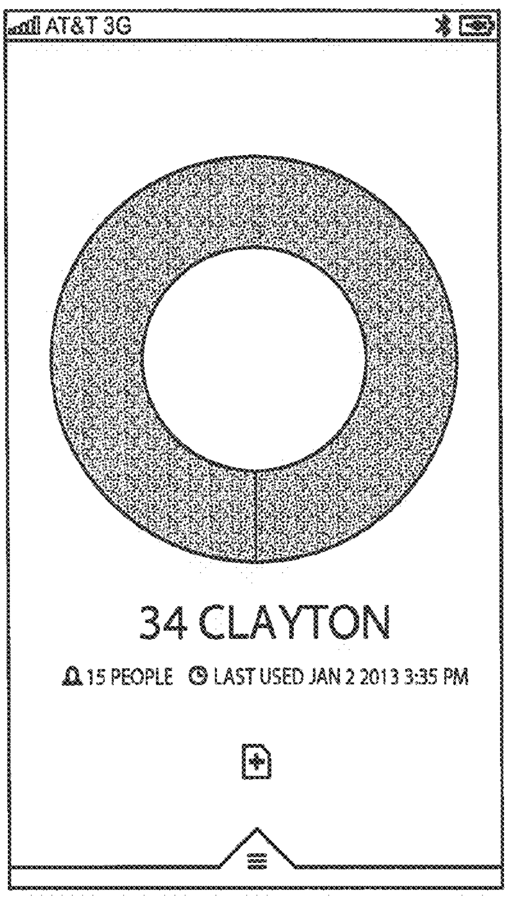
Figure 21D:
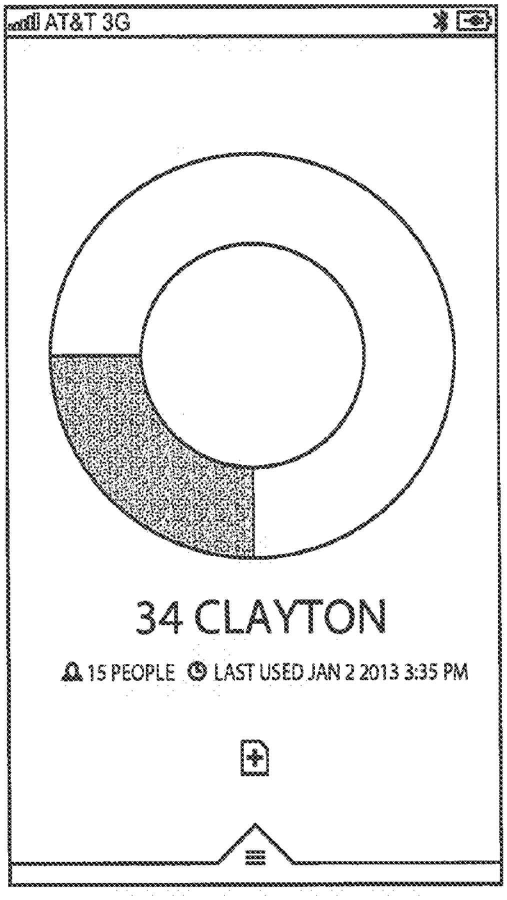
Figure 21E:
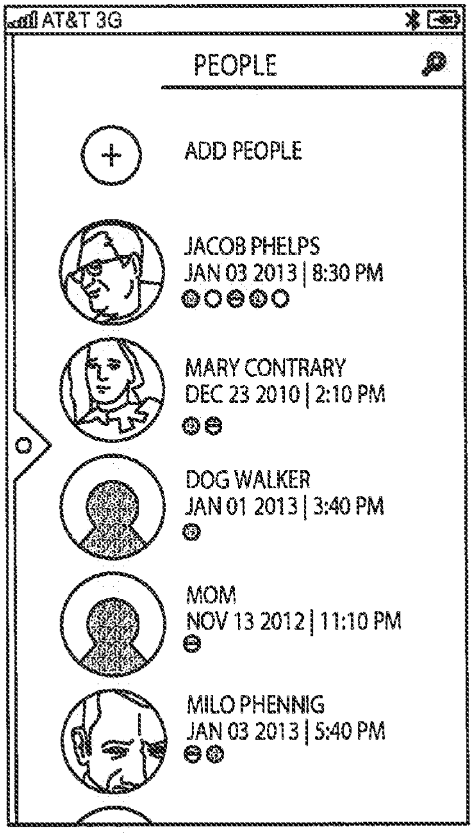
Figure 21F:
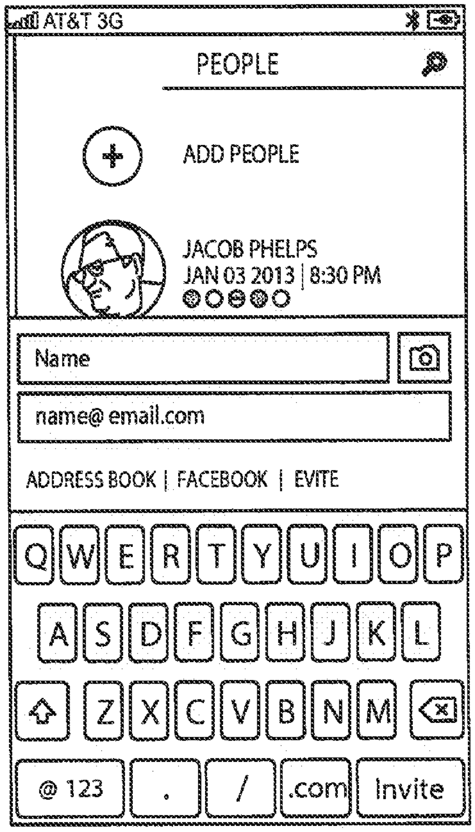
Figure 21G:
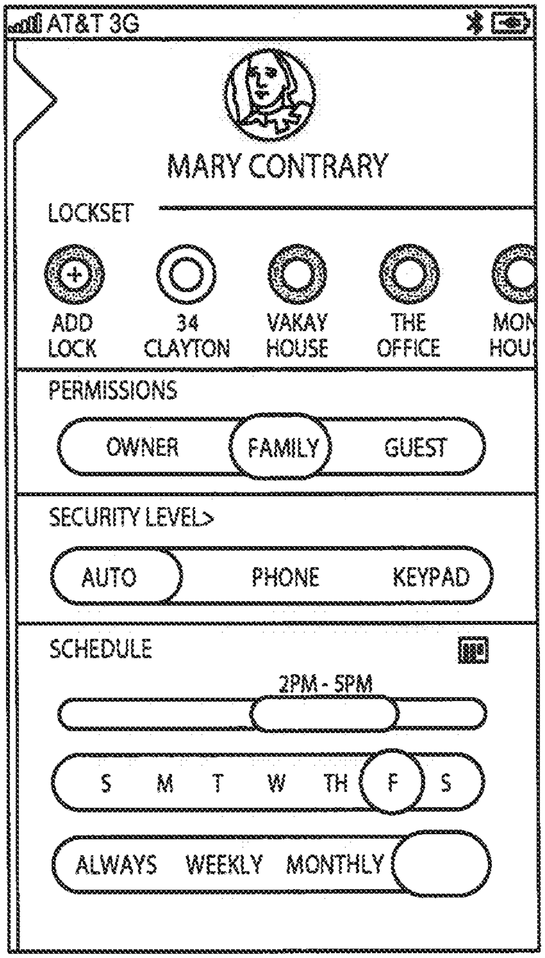
Figure 22A:
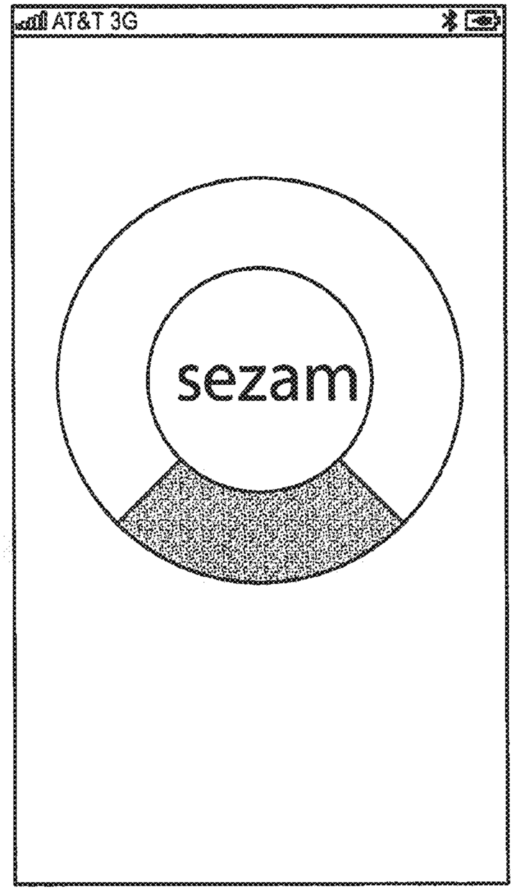
FIGS. 22(*a*)-22(*e*) are examples of a user interface for a guest of an owner of a building that has an intelligent door lock system in one embodiment of the present invention.
Figure 22B:
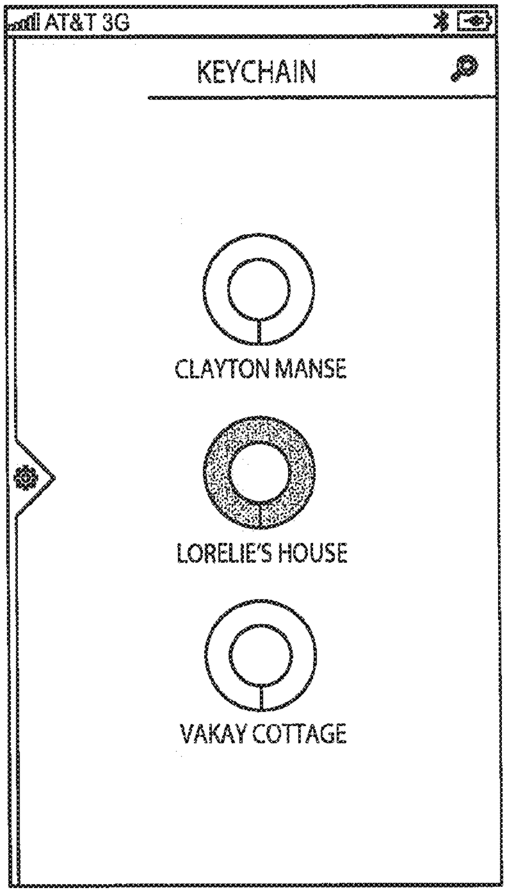
Figure 22C:
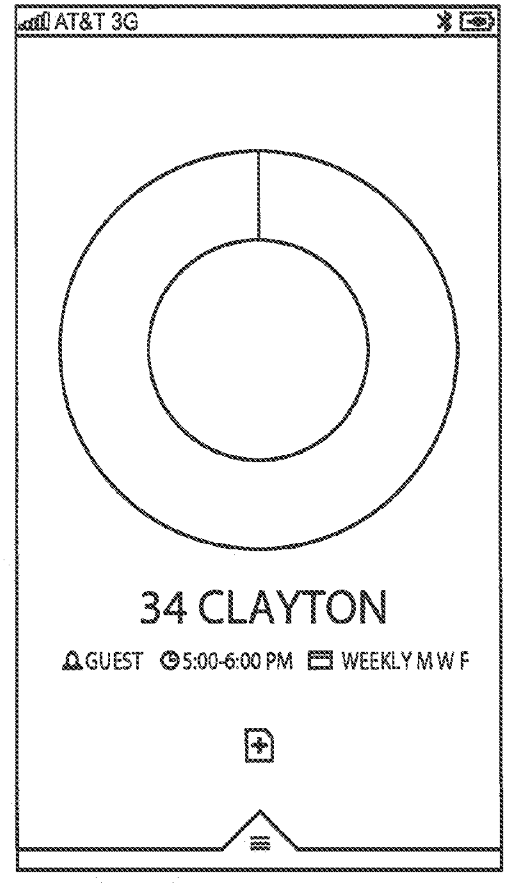
Figure 22D:
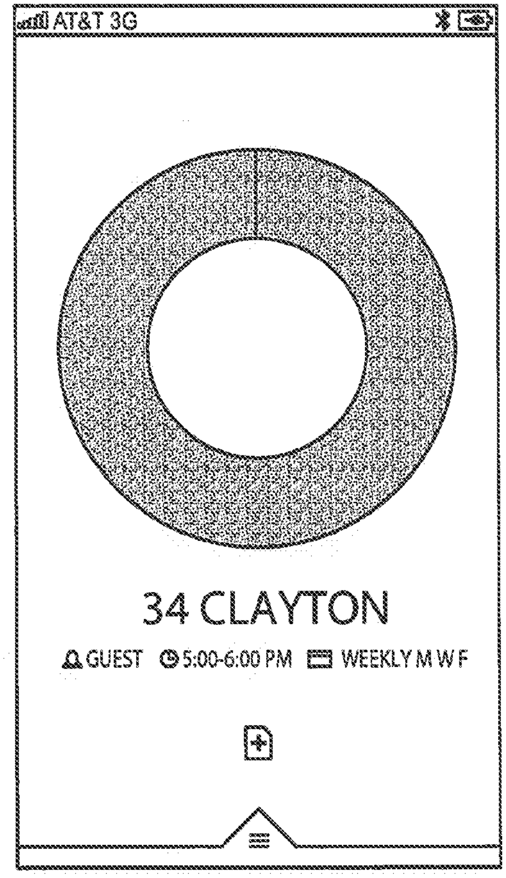
Figure 22E:
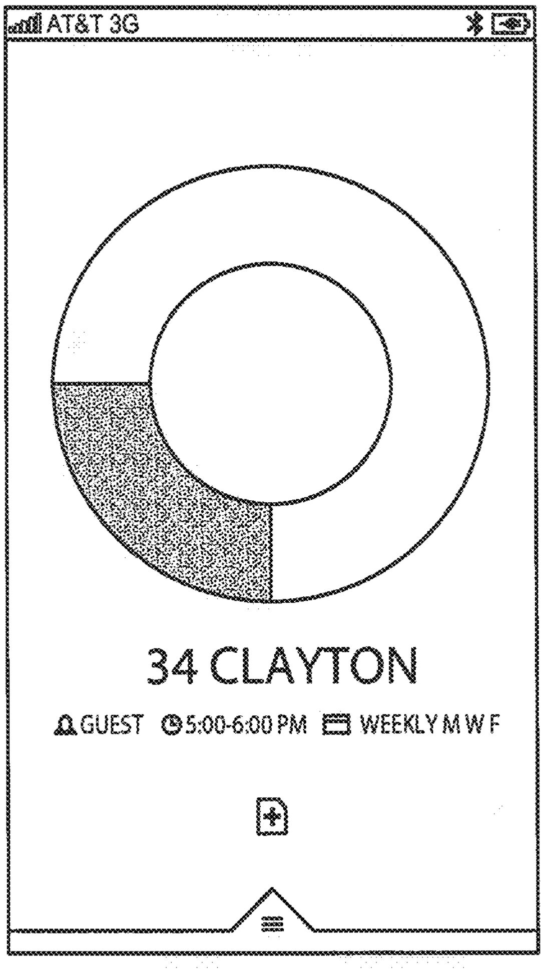

FIG. 20 illustrates a set of interactions between the intelligent door lock system 100, mobile or computing device 210 and intelligent door lock system back-end 68, that may include a pairing process 138 and a lock operation process 140. During the pairing process 138, the intelligent door lock system 100 and mobile or computing device 210 can be paired to each other and also authenticated by the intelligent door lock system back-end 68. Thus, as shown in FIG. 20, during the pairing process, the intelligent door look system 100 is powered on and becomes discoverable, while the mobile or computing device 210 communicates with the intelligent door lock system back-end 68, and has its credentials validated and authenticated. Once the mobile or computing device 210, and the app on the mobile or computing device 210, is authenticated, the mobile or computing device 210 discovers the lock, such as through a Bluetooth discovery process, since the intelligent door look system 100 and the mobile or computing device 210 are within a predetermined proximity to each other. The mobile or computing device 210 may then send a pairing code to the intelligent door look system 100, and in turn receive a pairing confirmation from the intelligent door lock system 100. The pairing process is then completed with the processes illustrated in FIG. 20. The lock operation may include the steps listed in FIG. 20 to operate the intelligent door look system 100 wirelessly using the mobile or computing device 210.

The intelligent door lock system 100 may be used for various functions. As a non-limiting example, the intelligent door lock system 100 may enable a method to exchange a security token between mobile or computing device 210 and the intelligent door look system 100. All or all of the intelligent door look systems 100 may be registered with the intelligent door lock back-end 68 with a unique registration ID. The unique ID of the an intelligent door look system 100 may be associated with a unique security token that can only be used to command a specific intelligent door look system 100 to lock or unlock. Through a virtual key provisioning interface of the intelligent door lock system back-end 68, a master user, who may be an administrator, can issue a new security token to a particular mobile or computing device 210. The intelligent door look system 100 can periodically broadcast an advertisement of its available services over System Networks. When the mobile or computing device 210 is within a predetermined proximity of the intelligent door look system 100, which varies depending on the protocol being used, the mobile or computing device 210 can detect the advertisement from the intelligent door lock assembly 100.

The application on the mobile or computing device 210 detects the intelligent door look system 100 and a communications session can be initiated. The token, illustrated as a key 118 in FIG. 20, is exchanged and the lock is triggered to unlock automatically. Alternatively, if the intelligent door look system 100 is equipped with a second wireless communications circuit, then the intelligent door look system 100 can periodically query the intelligent door lock system back-end 68 for commands. A user can issue commands via a web interface to the intelligent door lock system back-end 68, and the intelligent door look system 100 can lock or unlock the door 120. The intelligent door lock system 100 may also allow the user to disable auto-unlock, at which time the application on the user's mobile or computing device 210 can provide a notification which then allows the user to press a button on the mobile or computing device 210 to lock or unlock the lock.

The intelligent door lock system 100 may also allow for the triggering of multiple events upon connection to an intelligent door look system 100 by a mobile or computing device 210. As a non-limiting example, the intelligent door look system 100 can detect and authenticate the mobile or computing device 210, as described herein, and initiate a series of actions, including but not limiting to, unlocking doors 100, turning on lights, adjusting temperature, turning on stereo etc. The commands for these actions may be carried out by the mobile or computing device 210 or the intelligent door lock system back-end 68. In addition, through a web interface of the intelligent door lock system back-end 68, the user may define one or more events to be triggered upon proximity detection and authentication of the user's mobile or computing device 210 to the intelligent door look system 100.

The intelligent door lock system 100 may also allow for the intelligent triggering of events associated with an individual. In particular, environmental settings may be defined per individual in the intelligent door lock system back-end 68 and then applied intelligently by successive ingress by that person into a building that has an intelligent door look system 100. For example: person A arrives home and its mobile or computing device 210 is authenticated by the intelligent door look system 100. His identity is shared with the intelligent door lock system back-end 68. The intelligent door lock system back-end 68 may send environmental changes to other home controllers, such as "adjust heat to 68 degrees". Person B arrives at the same building an hour later and her mobile or computing device 210 is also authenticated and shared with the intelligent door lock system back-end 68. The intelligent door lock system back-end 68 accesses her preferred environmental variables such as "adjust heat to 71 degrees". The intelligent door lock system back-end understands that person B has asked for a temperature increase and issues the respective command to the dwelling thermostat. In one example, the intelligent door lock back-end system 68 has logic that defers to the higher temperature request or can deny it. Therefore if person A entered the home after person B, the temperature would not be decreased.

FIGS. 21(*a*)-(*g*) are examples of a user interface for an owner of a building that has an intelligent door lock system 100. These user interfaces may be seen by a user who is the owner of a building that has an intelligent door look system 100 with the unique ID. FIG. 21(*a*) is a basic home screen while FIG. 22(*b*) shows the smart door locks (in a keychain) which the user of the mobile or computing device 210 has access rights to in intelligent door lock system 100. FIG. 21(*c*) illustrates an example of a user interface when a particular intelligent door look system 100 is locked. FIG. 22(*d*) illustrates an example of a user interface when a particular intelligent door look system 100 is unlocked. FIGS. 21(*e*) and (*f*) are user interface examples that allow the owner to add other users/people to be able to control the intelligent door look system 100 of the building. FIG. 21(*g*) is an example of a configuration interface that allows the owner of the building to customize a set of permissions assigned for each intelligent door lock system 100.

FIGS. 22(*a*)-(*e*) are examples of a user interface for a guest of an owner of a building that has an intelligent door lock system 100.

FIGS. 23(*a*) and (*b*) illustrate an intelligent door look system 100 and extension gear adapters 142. In particular, FIG. 23(*a*) shows the bolt of a lock device with an empty extension gear receptacle that allows different extension gear adapters 150 (shown in FIG. 7B) to be inserted into the receptacle so that the an intelligent door look system 100 may be used with a number of different bolts of lock devices that each have a different shaped extension rod and/or extension rods that have different cross-sections.

Mobile Device

Figure 24A:
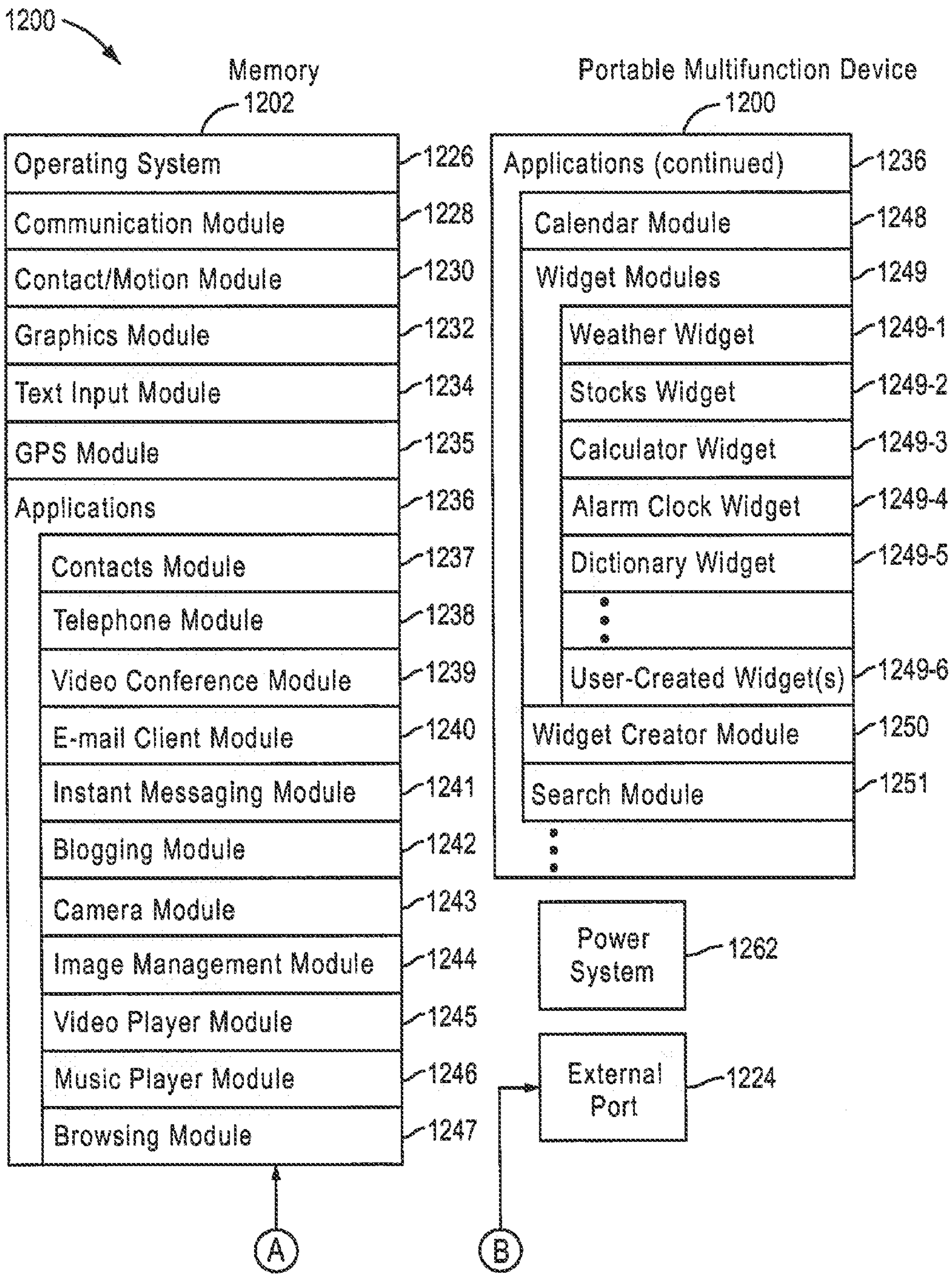
FIG. 24 (*a*)-(*b*) illustrates one embodiment of a mobile device that is used with the intelligent door lock system.
Figure 24B:
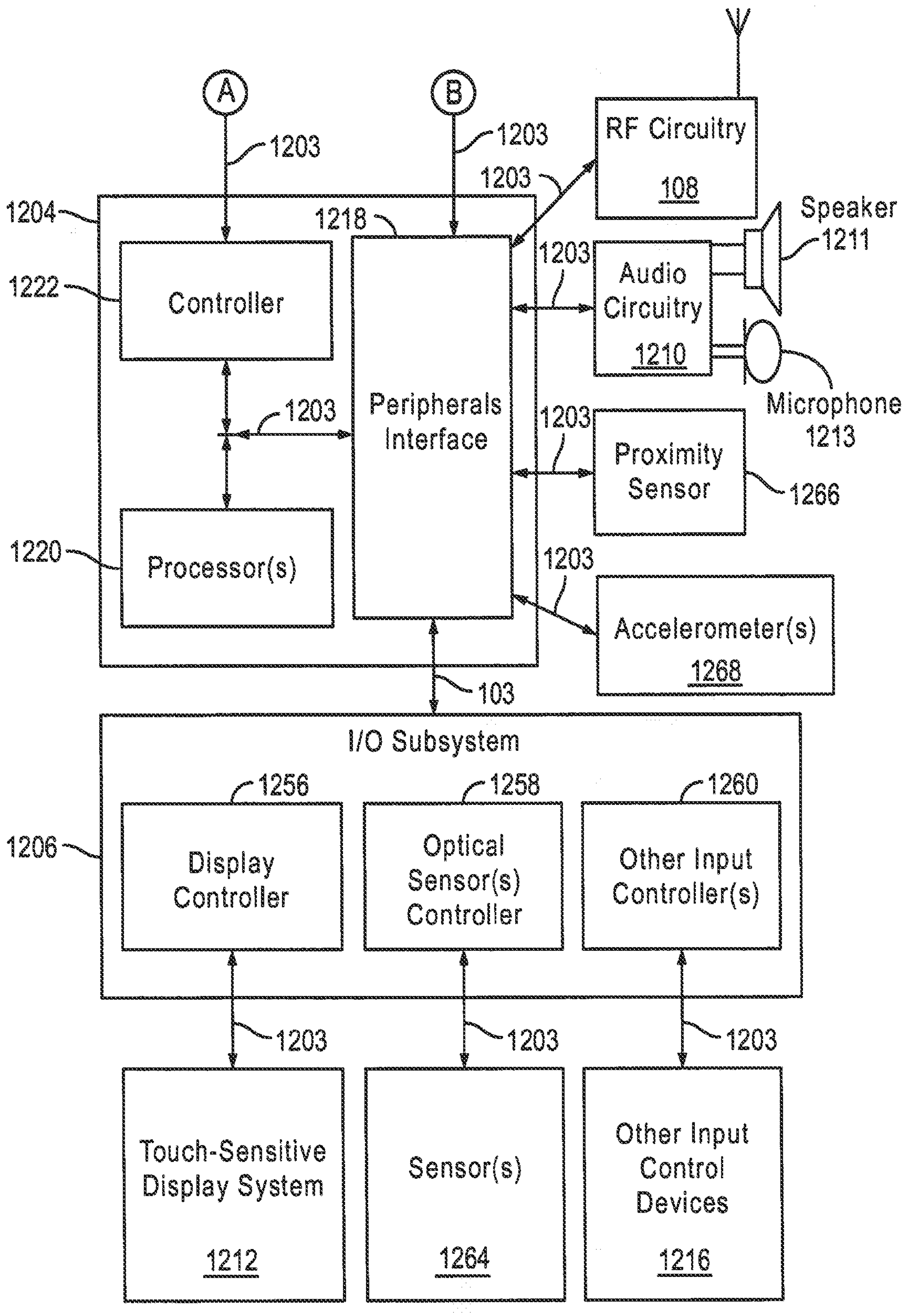
Figure 25A:
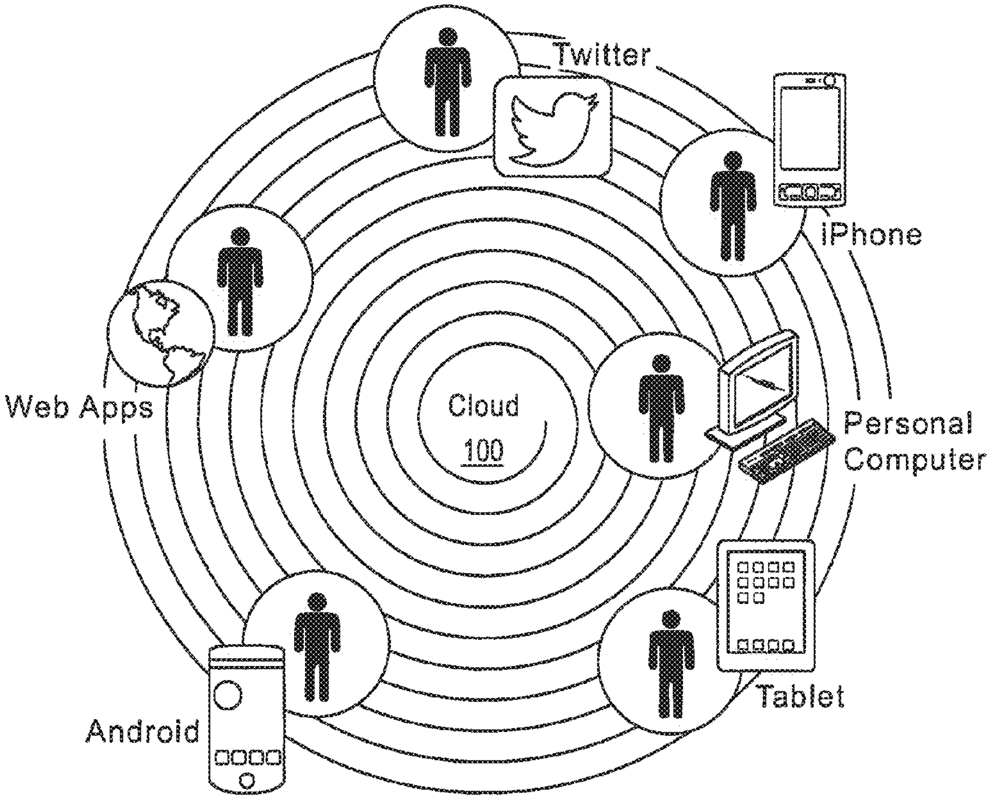
FIG. 25(*a*)-(*e*) represent a logical diagram of a Cloud lock access services Infrastructure in accordance with one embodiment of the present invention.
Figure 25B:
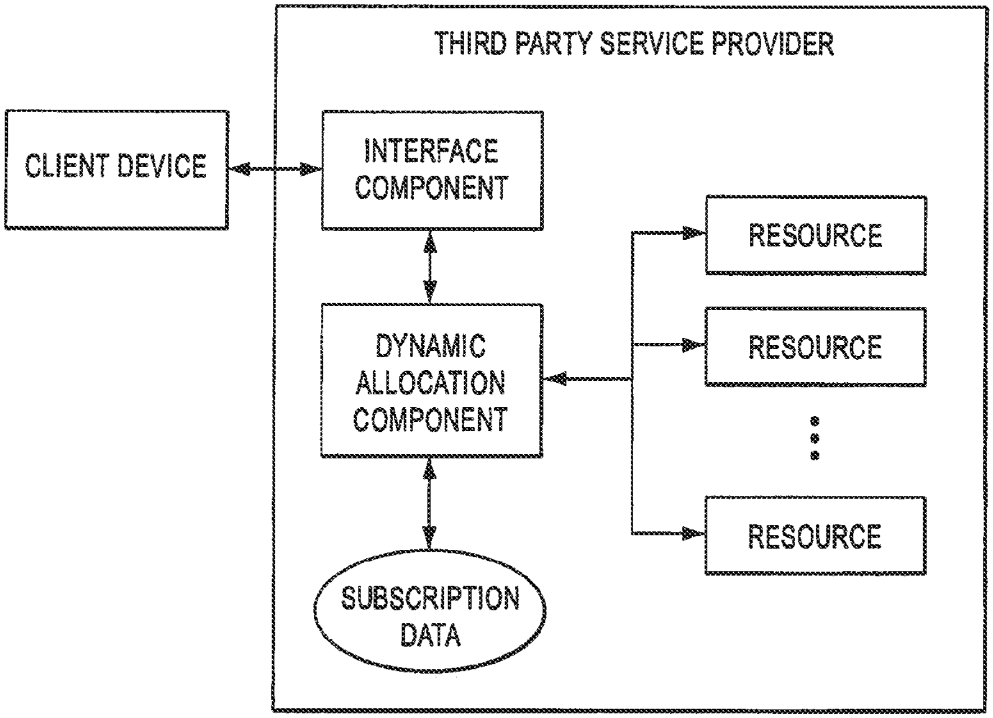
Figure 25C:
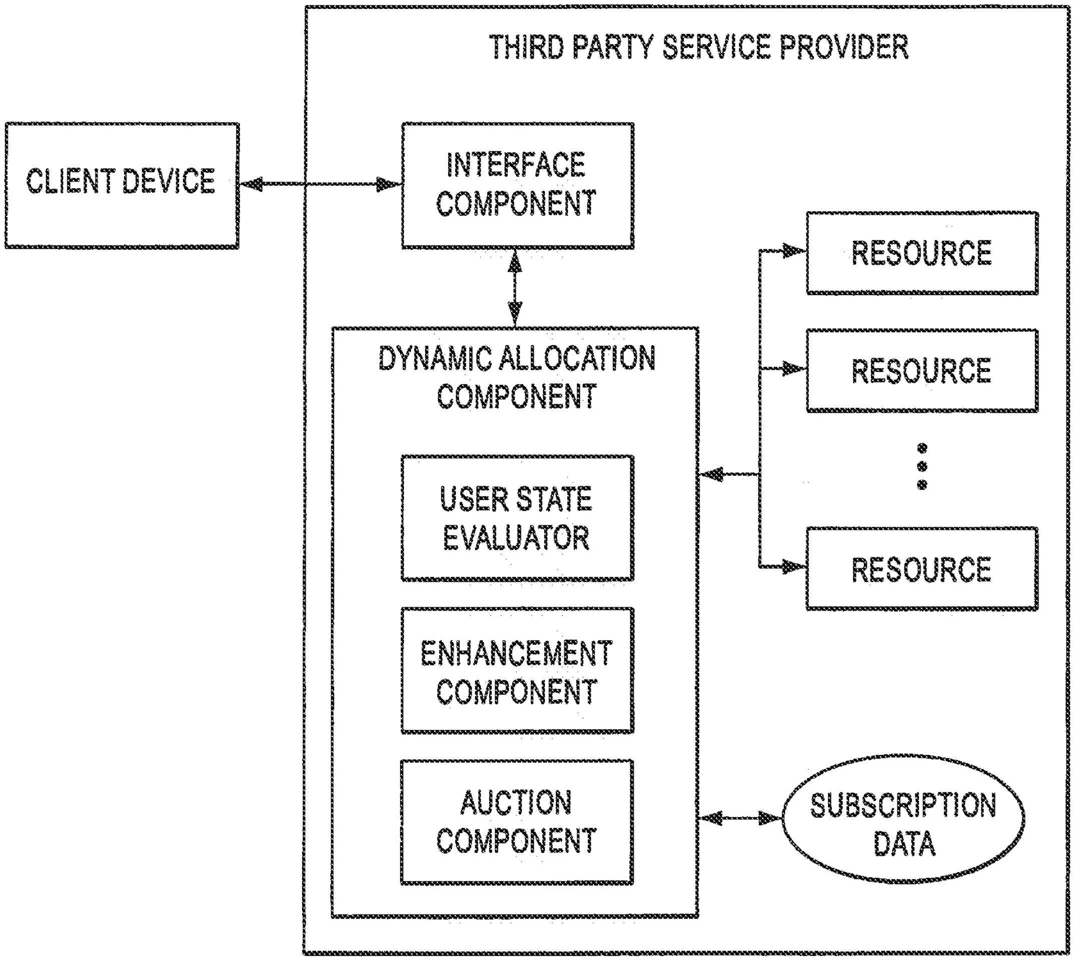
Figure 25D:
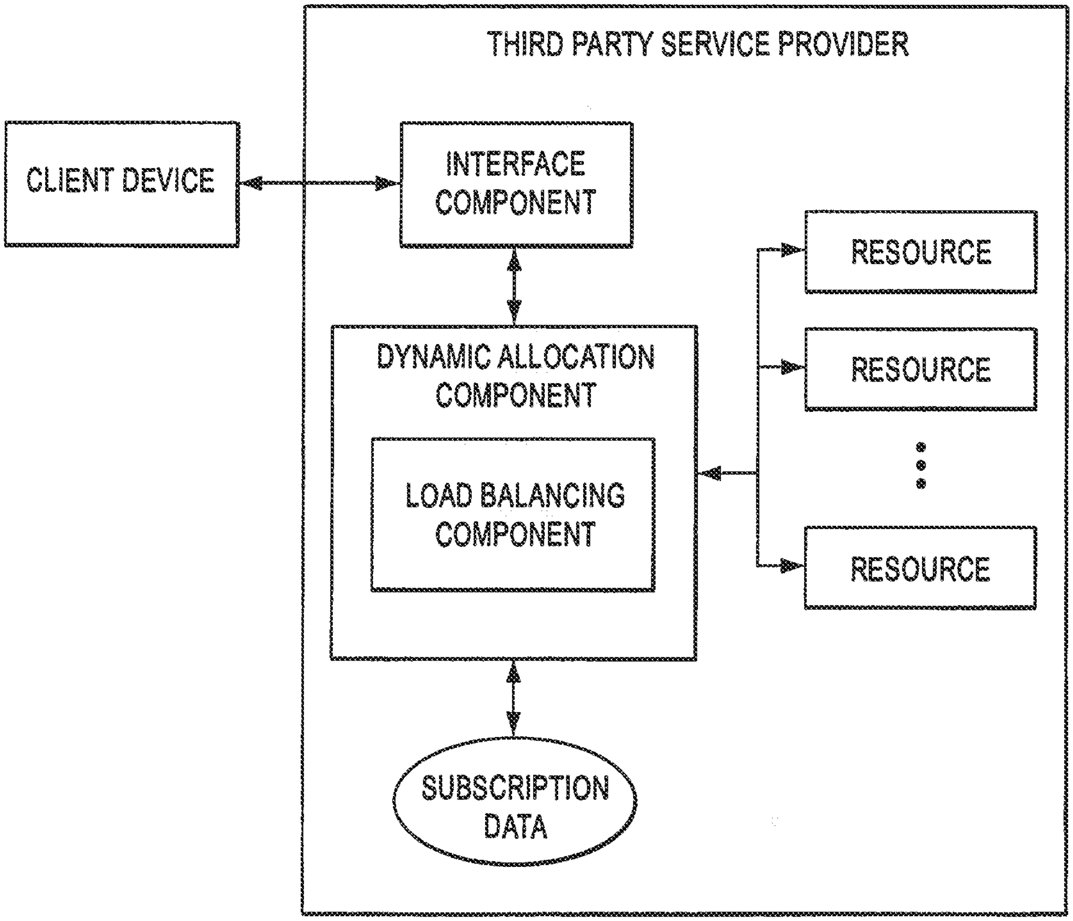
Figure 25E:
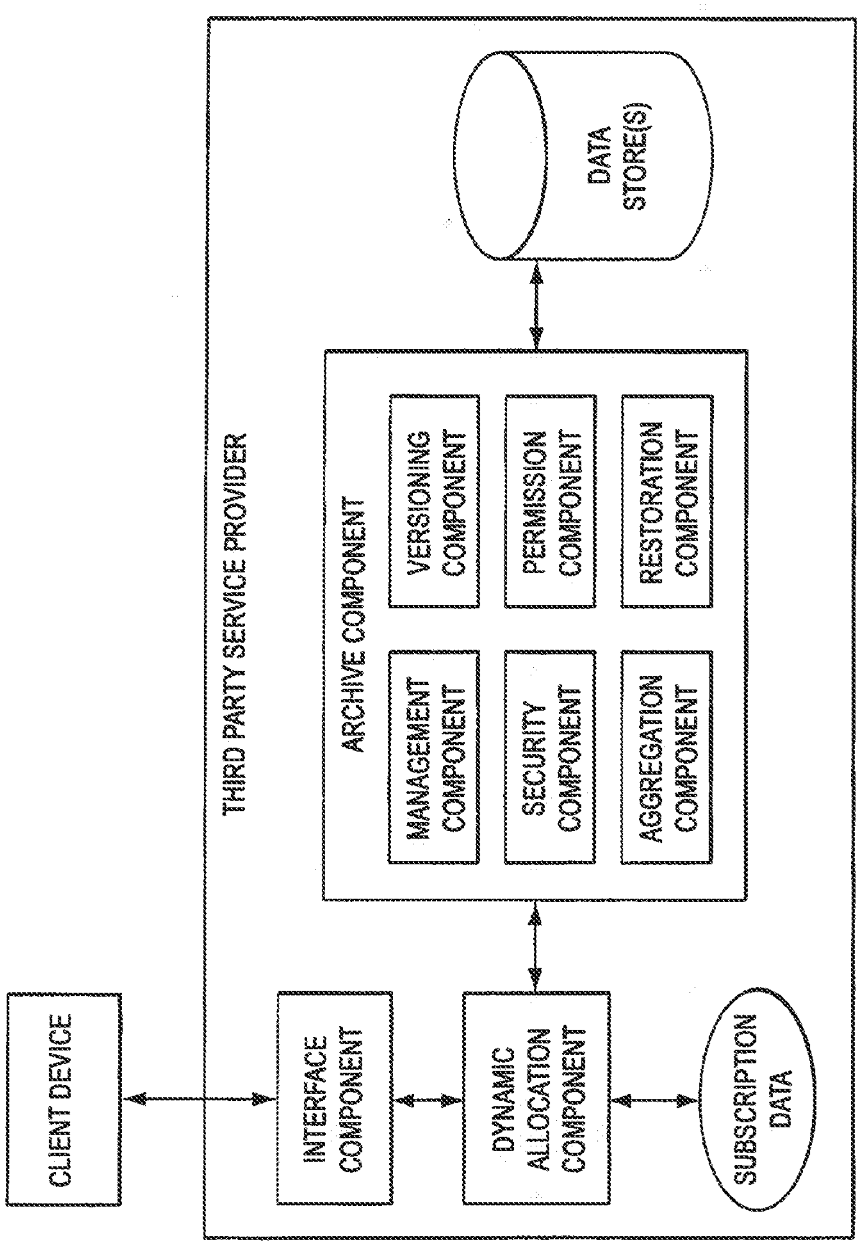
Figure 26:
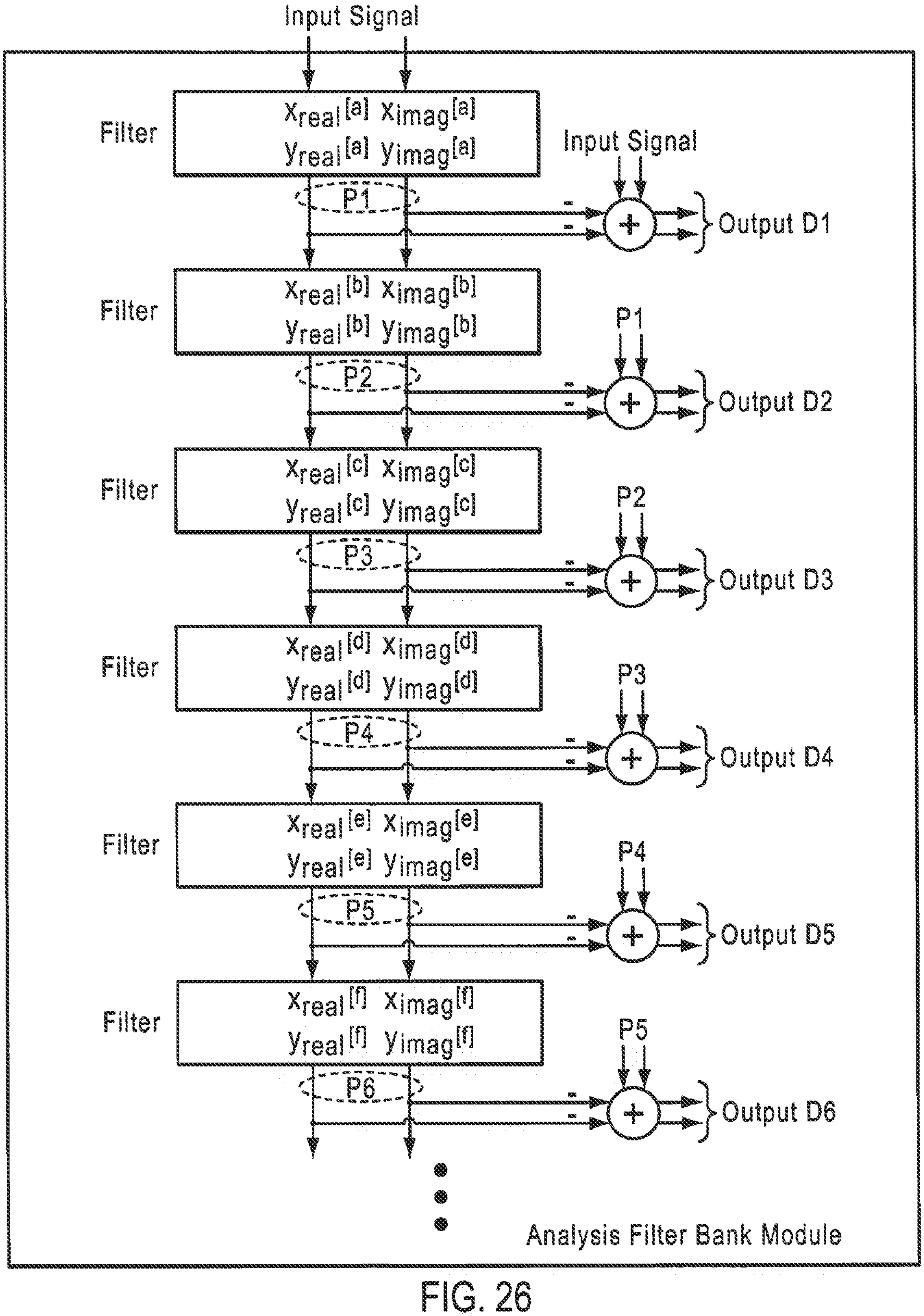
FIG. 26 illustrates one embodiment inputs and outputs.

Referring now to FIGS. 24(*a*)-(*b*), 1212 is a block diagram illustrating embodiments of a mobile or computing device 210 that can be used with intelligent door lock system 10.

The mobile or computing device 210 can include a display 1214 that can be a touch sensitive display. The touch-sensitive display 1214 is sometimes called a "touch screen" for convenience, and may also be known as or called a touch-sensitive display system. The mobile or computing device 210 may include a memory 1216 (which may include one or more computer readable storage mediums), a memory controller 1218, one or more processing units (CPU's) 1220, a peripherals interface 1222, Network Systems circuitry 1224, including but not limited to RF circuitry, audio circuitry 1226, a speaker 1228, a microphone 1230, an input/output (I/O) subsystem 1232, other input or control devices 1234, and an external port 1236. The mobile or computing device 210 may include one or more optical sensors 1238. These components may communicate over one or more communication buses or signal lines 1240.

It should be appreciated that the mobile or computing device 210 is only one example of a portable multifunction mobile or computing device 210, and that the mobile or computing device 210 may have more or fewer components than shown, may combine two or more components, or a may have a different configuration or arrangement of the components. The various components shown in FIGS. 24 (*a*)-(*b*) may be implemented in hardware, software or a combination of hardware and software, including one or more signal processing and/or application specific integrated circuits.

Memory 1216 may include high-speed random access memory and may also include non-volatile memory, such as one or more magnetic disk storage devices, flash memory devices, or other non-volatile solid-state memory devices. Access to memory 1216 by other components of the mobile or computing device 210, such as the CPU 1220 and the peripherals interface 1222, may be controlled by the memory controller 1218.

The peripherals interface 1222 couples the input and output peripherals of the device to the CPU 1220 and memory 1216. The one or more processors 1220 run or execute various software programs and/or sets of instructions stored in memory 1216 to perform various functions for the mobile or computing device 210 and to process data.

In some embodiments, the peripherals interface 1222, the CPU 1220, and the memory controller 1218 may be implemented on a single chip, such as a chip 1242. In some other embodiments, they may be implemented on separate chips.

The Network System circuitry 1244 receives and sends signals, including but not limited to RF, also called electromagnetic signals. The Network System circuitry 1244 converts electrical signals to/from electromagnetic signals and communicates with communications networks and other communications devices via the electromagnetic signals. The Network Systems circuitry 1244 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The Network Systems circuitry 1244 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication.

The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), BLUETOOTH®, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 1226, the speaker 1228, and the microphone 1230 provide an audio interface between a user and the mobile or computing device 210. The audio circuitry 1226 receives audio data from the peripherals interface 1222, converts the audio data to an electrical signal, and transmits the electrical signal to the speaker 1228. The speaker 1228 converts the electrical signal to human-audible sound waves. The audio circuitry 1226 also receives electrical signals converted by the microphone 1230 from sound waves. The audio circuitry 1226 converts the electrical signal to audio data and transmits the audio data to the peripherals interface 1222 for processing. Audio data may be retrieved from and/or transmitted to memory 1216 and/or the Network Systems circuitry 1244 by the peripherals interface 1222. In some embodiments, the audio circuitry 1226 also includes a headset jack. The headset jack provides an interface between the audio circuitry 1226 and removable audio input/output peripherals, such as output-only headphones or a headset with both output (e.g., a headphone for one or both ears) and input (e.g., a microphone).

The I/O subsystem 1232 couples input/output peripherals on the mobile or computing device 210, such as the touch screen 1214 and other input/control devices 1234, to the peripherals interface 1222. The I/O subsystem 1232 may include a display controller 1246 and one or more input controllers 210 for other input or control devices. The one or more input controllers 1 receive/send electrical signals from/to other input or control devices 1234. The other input/control devices 1234 may include physical buttons (e.g., push buttons, rocker buttons, etc.), dials, slider switches, and joysticks, click wheels, and so forth. In some alternate embodiments, input controller(s) 1252 may be coupled to any (or none) of the following: a keyboard, infrared port, USB port, and a pointer device such as a mouse. The one or more buttons may include an up/down button for volume control of the speaker 1228 and/or the microphone 1230. The one or more buttons may include a push button. A quick press of the push button may disengage a lock of the touch screen 1214 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button may turn power to the mobile or computing device 210 on or off. The user may be able to customize a functionality of one or more of the buttons. The touch screen 1214 is used to implement virtual or soft buttons and one or more soft keyboards.

The touch-sensitive touch screen 1214 provides an input interface and an output interface between the device and a user. The display controller 1246 receives and/or sends electrical signals from/to the touch screen 1214. The touch screen 1214 displays visual output to the user. The visual output may include graphics, text, icons, video, and any combination thereof (collectively termed "graphics"). In some embodiments, some or all of the visual output may correspond to user-interface objects, further details of which are described below.

A touch screen 1214 has a touch-sensitive surface, sensor or set of sensors that accepts input from the user based on haptic and/or tactile contact. The touch screen 1214 and the display controller 1246 (along with any associated modules and/or sets of instructions in memory 1216) detect contact (and any movement or breaking of the contact) on the touch screen 1214 and converts the detected contact into interaction with user-interface objects (e.g., one or more soft keys, icons, web pages or images) that are displayed on the touch screen. In an exemplary embodiment, a point of contact between a touch screen 1214 and the user corresponds to a finger of the user.

The touch screen 1214 may use LCD (liquid crystal display) technology, or LPD (light emitting polymer display) technology, although other display technologies may be used in other embodiments. The touch screen 1214 and the display controller 1246 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 1214.

A touch-sensitive display in some embodiments of the touch screen 1214 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in their entirety. However, a touch screen 1214 displays visual output from the portable mobile or computing device 210, whereas touch sensitive tablets do not provide visual output.

A touch-sensitive display in some embodiments of the touch screen 1214 may be as described in the following applications: (1) U.S. patent application Ser. No. 11/381,313, "Multipoint Touch Surface Controller," filed May 12, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 1214 may have a resolution in excess of 1000 dpi. In an exemplary embodiment, the touch screen has a resolution of approximately 1060 dpi. The user may make contact with the touch screen 1214 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the mobile or computing device 210 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 1214 or an extension of the touch-sensitive surface formed by the touch screen.

In some embodiments, the mobile or computing device 210 may include a physical or virtual click wheel as an input control device 1234. A user may navigate among and interact with one or more graphical objects (henceforth referred to as icons) displayed in the touch screen 1214 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 1252 as well as one or more of the modules and/or sets of instructions in memory 1216. For a virtual click wheel, the click wheel and click wheel controller may be part of the touch screen 1214 and the display controller 1246, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The mobile or computing device 210 also includes a power system 1214 for powering the various components. The power system 1214 may include a power management system, one or more power sources (e.g., battery 1254, alternating current (AC)), a recharging system, a power failure detection circuit, a power converter or inverter, a power status indicator (e.g., a light-emitting diode (LED)) and any other components associated with the generation, management and distribution of power in portable devices.

The mobile or computing device 210 may also include one or more sensors 1238, including not limited to optical sensors 1238. An optical sensor can be coupled to an optical sensor controller 1248 in I/O subsystem 1232. The optical sensor 1238 may include charge-coupled device (CCD) or complementary metal-oxide semiconductor (CMOS) phototransistors. The optical sensor 1238 receives light from the environment, projected through one or more lens, and converts the light to data representing an image. In conjunction with an imaging module 1258 (also called a camera module); the optical sensor 1238 may capture still images or video. In some embodiments, an optical sensor is located on the back of the mobile or computing device 210, opposite the touch screen display 1214 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 1238 can be changed by the user (e.g., by rotating the lens and the sensor in the device housing) so that a single optical sensor 1238 may be used along with the touch screen display for both video conferencing and still and/or video image acquisition.

The mobile or computing device 210 may also include one or more proximity sensors 1250. In one embodiment, the proximity sensor 1250 is coupled to the peripherals interface 1222. Alternately, the proximity sensor 1250 may be coupled to an input controller in the I/O subsystem 1232. The proximity sensor 1250 may perform as described in U.S. patent application Ser. No. 11/241,839, "Proximity Detector In Handheld Device," filed Sep. 30, 2005; Ser. No. 11/240,788, "Proximity Detector In Handheld Device," filed Sep. 30, 2005; Ser. No. 13/096,386, "Using Ambient Light Sensor To Augment Proximity Sensor Output"; Ser. No. 11/586,862, "Automated Response To And Sensing Of User Activity In Portable Devices," filed Oct. 24, 2006; and Ser. No. 11/638,251, "Methods And Systems For Automatic Configuration Of Peripherals," which are hereby incorporated by reference in their entirety. In some embodiments, the proximity sensor turns off and disables the touch screen 1214 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

In some embodiments, the software components stored in memory 1216 may include an operating system 1260, a communication module (or set of instructions) 1262, a contact/motion module (or set of instructions) 1264, a graphics module (or set of instructions) 1268, a text input module (or set of instructions) 1270, a Global Positioning System (GPS) module (or set of instructions) 1272, and applications (or set of instructions) 1272.

The operating system 1260 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 1262 facilitates communication with other devices over one or more external ports 1274 and also includes various software components for handling data received by the Network Systems circuitry 1244 and/or the external port 1274. The external port 1274 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 106 may detect contact with the touch screen 1214 (in conjunction with the display controller 1246) and other touch sensitive devices (e.g., a touchpad or physical click wheel). The contact/motion module 106 includes various software components for performing various operations related to detection of contact, such as determining if contact has occurred, determining if there is movement of the contact and tracking the movement across the touch screen 1214, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 106 and the display controller 1246 also detects contact on a touchpad. In some embodiments, the contact/motion module 1284 and the controller 1286 detects contact on a click wheel.

Examples of other applications that may be stored in memory 1216 include other word processing applications, JAVA-enabled applications, encryption, digital rights management, voice recognition, and voice replication.

In conjunction with touch screen 1214, display controller 1246, contact module 1276, graphics module 1278, and text input module 1280, a contacts module 1282 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone, video conference, e-mail, or IM; and so forth.

The Cloud

FIGS. 25(*a*)-(*e*) and 26 represents a logical diagram of a cloud lock access services Infrastructure that can be utilized with the present invention that is in communication with the bridge 11, Bluetooth devices 21 and/or the intelligent door lock system 10. As shown, the cloud lock access services encompasses web applications, mobile devices, personal computer and/or laptops and social networks, such as, Twitter®. ("Twitter®" is a trademark of Twitter Inc.). It will be appreciated that other social networks can be included in the cloud lock access services and Twitter® has been given as a specific example. Therefore, every component forms part of the cloud lock access services which comprises servers, applications and users as defined above.

The cloud lock access services based system facilitates adjusting utilization and/or allocation of hardware resource(s) to remote users. The system includes a third party service provider, that is provided by the methods used with the present invention, that can concurrently service requests from several users without participant perception of degraded computing performance as compared to conventional techniques where computational tasks can be performed upon a user or a server within a proprietary intranet. The third party service provider (e.g., "cloud lock access services") supports a collection of hardware and/or software resources. The hardware and/or software resources can be maintained by an off-premises party, and the resources can be accessed and utilized by identified participants over Network System. Resources provided by the third party service provider can be centrally located and/or distributed at various geographic locations. For example, the third party service provider can include any number of data center machines that provide resources. The data center machines can be utilized for storing/retrieving data, effectuating computational tasks, rendering graphical outputs, routing data, and so forth.

In one embodiment the cloud is used for the remote door 12 status operation, remote door operation for locking, unlocking and the like.

According to an illustration, the third party service provider can provide any number of resources such as data storage services, computational services, word processing services, electronic mail services, presentation services, spreadsheet services, gaming services, web syndication services (e.g., subscribing to a RSS feed), and any other services or applications that are conventionally associated with personal computers and/or local servers. Further, utilization of any number of third party service providers similar to the third party service provider is contemplated. According to an illustration, disparate third party service providers can be maintained by differing off-premise parties and a participant can employ, concurrently, at different times, and the like, all or a subset of the third party service providers.

By leveraging resources supported by the third party service provider, limitations commonly encountered with respect to hardware associated with users and servers within proprietary intranets can be mitigated. Off-premises parties, instead of participants of users or Network System administrators of servers within proprietary intranets, can maintain, troubleshoot, replace and update the hardware resources. Further, for example, lengthy downtimes can be mitigated by the third party service provider utilizing redundant resources; thus, if a subset of the resources are being updated or replaced, the remainder of the resources can be utilized to service requests from participants. According to this example, the resources can be modular in nature, and thus, resources can be added, removed, tested, modified, etc. while the remainder of the resources can support servicing participant requests. Moreover, hardware resources supported by the third party service provider can encounter fewer constraints with respect to storage, processing power, security, bandwidth, redundancy, graphical display rendering capabilities, etc. as compared to conventional hardware associated with users and servers within proprietary intranets.

The system can include a client device, which can be the wearable device and/or mobile device that employs resources of the third party service provider. Although one client device is depicted, it is to be appreciated that the system can include any number of client devices similar to the client device, and the plurality of client devices can concurrently utilize supported resources. By way of illustration, the client device can be a desktop device (e.g., personal computer), mobile device, and the like. Further, the client device can be an embedded system that can be physically limited, and hence, it can be beneficial to leverage resources of the third party service provider.

Resources can be shared amongst a plurality of client devices subscribing to the third party service provider. According to an illustration, one of the resources can be at least one central processing unit (CPU), where CPU cycles can be employed to effectuate computational tasks requested by the client device. Pursuant to this illustration, the client device can be allocated a subset of an overall total number of CPU cycles, while the remainder of the CPU cycles can be allocated to disparate client device(s). Additionally or alternatively, the subset of the overall total number of CPU cycles allocated to the client device can vary over time. Further, a number of CPU cycles can be purchased by the participant of the client device. In accordance with another example, the resources can include data store(s) that can be employed by the client device to retain data. The participant employing the client device can have access to a portion of the data store(s) supported by the third party service provider, while access can be denied to remaining portions of the data store(s) (e.g., the data store(s) can selectively mask memory based upon participant/device identity, permissions, and the like). It is contemplated that any additional types of resources can likewise be shared.

The third party service provider can further include an interface component that can receive input(s) from the client device and/or enable transferring a response to such input(s) to the client device (as well as perform similar communications with any disparate client devices). According to an example, the input(s) can be request(s), data, executable program(s), etc. For instance, request(s) from the client device can relate to effectuating a computational task, storing/retrieving data, rendering a participant interface, and the like via employing one or more resources. Further, the interface component can obtain and/or transmit data over a Network System connection. According to an illustration, executable code can be received and/or sent by the interface component over the Network System connection. Pursuant to another example, a participant (e.g. employing the client device) can issue commands via the interface component.

In one embodiment, the third party service provider includes a dynamic allocation component that apportions resources, which as a non-limiting example can be hardware resources supported by the third party service provider to process and respond to the input(s) (e.g., request(s), data, executable program(s), and the like, obtained from the client device.

Although the interface component is depicted as being separate from the dynamic allocation component, it is contemplated that the dynamic allocation component can include the interface component or a portion thereof. The interface component can provide various adaptors, connectors, channels, communication paths, etc. to enable interaction with the dynamic allocation component.

In one embodiment a system includes the third party service provider that supports any number of resources (e.g., hardware, software, and firmware) that can be employed by the client device and/or disparate client device(s) not shown. The third party service provider further comprises the interface component that receives resource utilization requests, including but not limited to requests to effectuate operations utilizing resources supported by the third party service provider from the client device and the dynamic allocation component that partitions resources, including but not limited to, between participants, devices, computational tasks, and the like. Moreover, the dynamic allocation component can further include a participant state evaluator, an enhancement component and an auction component.

The user state evaluator can determine a state associated with a user and/or the client device employed by the user, where the state can relate to a set of properties. For instance, the user state evaluator can analyze explicit and/or implicit information obtained from the client device (e.g., via the interface component) and/or retrieved from memory associated with the third party service provider (e.g., preferences indicated in subscription data). State related data yielded by the user state evaluator can be utilized by the dynamic allocation component to tailor the apportionment of resources.

In one embodiment, the user state evaluator can consider characteristics of the client device, which can be used to apportion resources by the dynamic allocation component. For instance, the user state evaluator can identify that the client device is a mobile device with limited display area. Thus, the dynamic allocation component can employ this information to reduce resources utilized to render an image upon the client device since the cellular telephone may be unable to display a rich graphical user interface.

Moreover, the enhancement component can facilitate increasing an allocation of resources for a particular participant and/or client device.

In one embodiment a system employs load balancing to optimize utilization of resources. The system includes the third party service provider that communicates with the client device (and/or any disparate client device(s) and/or disparate third party service provider(s)). The third party service provider can include the interface component that transmits and/or receives data from the client device and the dynamic allocation component that allots resources. The dynamic allocation component can further comprise a load balancing component that optimizes utilization of resources.

In one embodiment, the load balancing component can monitor resources of the third party service provider to detect failures. If a subset of the resources fails, the load balancing component can continue to optimize the remaining resources. Thus, if a portion of the total number of processors fails, the load balancing component can enable redistributing cycles associated with the non-failing processors.

In one embodiment a system archives and/or analyzes data utilizing the third party service provider. The third party service provider can include the interface component that enables communicating with the client device. Further, the third party service provider comprises the dynamic allocation component that can apportion data retention resources, for example. Moreover, the third party service provider can include an archive component and any number of data store(s). Access to and/or utilization of the archive component and/or the data store(s) by the client device (and/or any disparate client device(s)) can be controlled by the dynamic allocation component. The data store(s) can be centrally located and/or positioned at differing geographic locations. Further, the archive component can include a management component, a versioning component, a security component, a permission component, an aggregation component, and/or a restoration component.

The data store(s) can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store(s) of the subject systems and methods is intended to comprise, without being limited to, these and any other suitable types of memory. In addition, it is to be appreciated that the data store(s) can be a server, a database, a hard drive, and the like.

The management component facilitates administering data retained in the data store(s). The management component can enable providing multi-tiered storage within the data store(s), for example. According to this example, unused data can be aged-out to slower disks and important data used more frequently can be moved to faster disks; however, the claimed subject matter is not so limited. Further, the management component can be utilized (e.g. by the client device) to organize, annotate, and otherwise reference content without making it local to the client device. Pursuant to an illustration, enormous video files can be tagged via utilizing a cell phone. Moreover, the management component enables the client device to bind metadata, which can be local to the client device, to file streams (e.g., retained in the data store(s)); the management component can enforce and maintain these bindings.

Additionally or alternatively, the management component can allow for sharing data retained in the data store(s) with disparate participants and/or client devices. For example, fine-grained sharing can be supported by the management component.

The versioning component can enable retaining and/or tracking versions of data. For instance, the versioning component can identify a latest version of a document (regardless of a saved location within data store(s)).

The security component limits availability of resources based on participant identity and/or authorization level. For instance, the security component can encrypt data transferred to the client device and/or decrypt data obtained from the client device. Moreover, the security component can certify and/or authenticate data retained by the archive component.

The permission component can enable a participant to assign arbitrary access permissions to various participants, groups of participants and/or all participants.

Further, the aggregation component assembles and/or analyzes collections of data. The aggregation component can seamlessly incorporate third party data into a particular participant's data.

The restoration component rolls back data retained by the archive component. For example, the restoration component can continuously record an environment associated with the third party service provider. Further, the restoration component can playback the recording.

Algorithm

Figure 27:
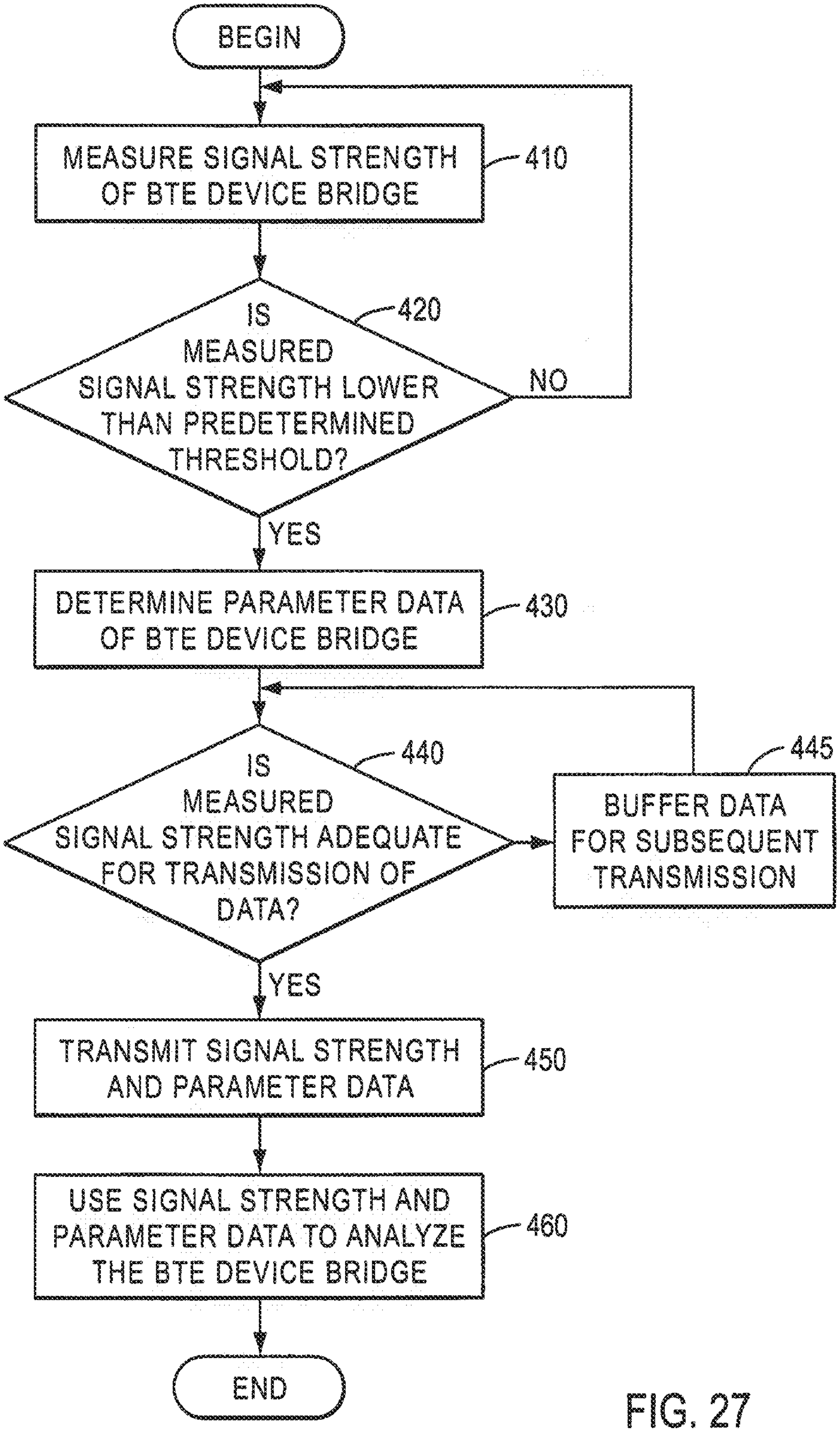
FIG. 27 shows one embodiment of a flowchart illustrating an example of a process for tracking signal strength.

FIG. 27 is a flowchart illustrating an example of a process for tracking signal strength of between the bridge 11 and the Bluetooth LE devices 21, as well as the intelligent door lock system 10. While FIG. 27 illustrates exemplary steps according to one embodiment, other embodiments may omit, add to, and/or modify any of the steps shown in FIG. 27.

An algorithm described hereafter computes proximity of a Bluetooth device 21 from the intelligent door lock system 10 of a dwelling and from the one or more bridges in the dwelling. The relative signal strength of connections to these two devices during lock operations is recorded as a threshold value. When the proximity to the bridge, placed inside the home is closer than before the lock operation, we will compute algorithmically that the device is inside the home.

In one embodiment the time spent with a relatively consistent signal strength value is a strong indicator a person being in the dwelling. A rapid change of proximity following a lock operation will be an indicator of coming.

In one embodiment a lock device 22 operation of the intelligent door lock system 10 followed by a rapid change of proximity is an indicator of going from the dwelling.

The process of FIG. 27 begins by measuring the signal strength of wireless signals between the bridge 11 and the Bluetooth LE devices 21 at step 310. The signal strength may be measured in any of the ways discussed above, including the bridge 11 measuring the power of downstream wireless signals. Step 310 may be initiated in accordance with a predefined schedule or in response to a predetermined event.

At step 320, parameter data of the non-interconnect device is determined. The parameter data may include location, time, and/or velocity coordinates associated with the non-interconnect device at the time of the signal strength measurement. Step 320 may be performed in any variety of ways, including but not limited to the use of GPS information. Further, step 320 may be initiated by a predefined schedule or a predefined event, as discussed above.

At step 330, the signal strength and parameter data are transmitted to the cloud lock access services. Step 330 may be performed in any of the ways discussed above, including using upstream control, communication, or out-of-band channels of Network System. The signal strength and parameter data, and optionally additional data, may be combined to form network status data, which is transmitted to the cloud lock access services at step 330.

At step 340, the signal strength and parameter data are used to analyze the signal strength between the bridge 11 and a Bluetooth LE device 21 . . . . The network operations center 150 is able to process the data in any of the ways discussed above, including mapping the signal strength to geographic representations of the bridge 11 and a Bluetooth LE device 21, based on the parameter data. A graphical representation of at least a section of the strength of the signal between the bridge 11 and a Bluetooth LE device 12 may be generated to illustrate instances of measured signal strength plotted based on corresponding parameter data. Network operators may use the output of the cloud lock access services to analyze, configure, reconfigure, overhaul, and/or optimize the wireless network, as discussed above.

FIG. 27 is a flowchart illustrating another example of a process for tracking signal strength between the bridge 11 and a Bluetooth LE device 21. While FIG. 27 illustrates exemplary steps according to one embodiment, other embodiments may omit, add to, and/or modify any of the steps shown in FIG. 27.

The process of FIG. 27 begins by measuring the signal strength between the bridge 11 and a Bluetooth LE device 21 at step 410. The signal strength may be measured in any of the ways discussed above, including measuring the power of downstream wireless signals being received from the cloud lock access services relative to bridge 11 and a Bluetooth LE device 21. Step 410 may be initiated in accordance with a predefined schedule or in response to a predetermined event.

At step 420, it is determined whether the measured signal strength is lower than a predetermined threshold. The predetermined threshold may be defined by network operators and may be based on a desired level of signal power that provides effective signal strength. If it is determined at step 420 that the measured signal strength is not lower than the predetermined threshold, the process returns to step 410, at which step another measurement of signal strength is obtained either immediately, according to an established schedule, or in response to a predetermined trigger event.

On the other hand, if it is determined at step 420 that the measured signal strength is lower than the predetermined threshold, the process continues at step 430. In one embodiment, at step 430, parameter data of the Bluetooth LE device 21 is determined. As non-limiting examples, the parameter data may include location, time, and/or velocity coordinates associated with the Bluetooth LE device 21 relative to the bridge 11. Step 430 may be performed in any of the ways discussed above; including using GPS signals to determine GPS coordinate data.

At step 440, it is determined whether the measured signal strength is adequate for transmission of data upstream to the cloud lock access services from the Bluetooth LE device 21. Step 440 may be performed by comparing the measured signal strength to a predetermined transmission threshold, which may be defined by network operators based on a level of signal power that supports reliable upstream data transmissions from the wireless device.

If it is determined at step 440 that the measured signal strength is inadequate for transmission of data, the process continues at step 445. At step 445, the signal strength and parameter data are buffered for subsequent transmission. Step 445 may be performed by storing the data to memory to maintain the data until it can be transmitted. In one embodiment, from step 445, the process returns to step 410 to obtain another measurement of signal strength. Multiple instances of data may be buffered until signal strength becomes strong enough for the stored data to be transmitted from the Bluetooth LE device 21. In other words, steps 410-440 may be repeated with different measurements being gathered and stored for later transmission when the signal strength becomes strong enough to support upstream transmissions.

If it is determined at step 440 that the measured signal strength is adequate for data transmission, the process continues to step 450. At step 450, the signal strength and parameter data are transmitted to the cloud lock access services. Step 450 may be performed in any of the ways discussed above, including using upstream control, communication, or out-of-band channels of the wireless network 144. The signal strength and parameter data, and optionally additional data, may be combined to form network status data, which is transmitted to the cloud lock access services at step 450.

Figure 28:
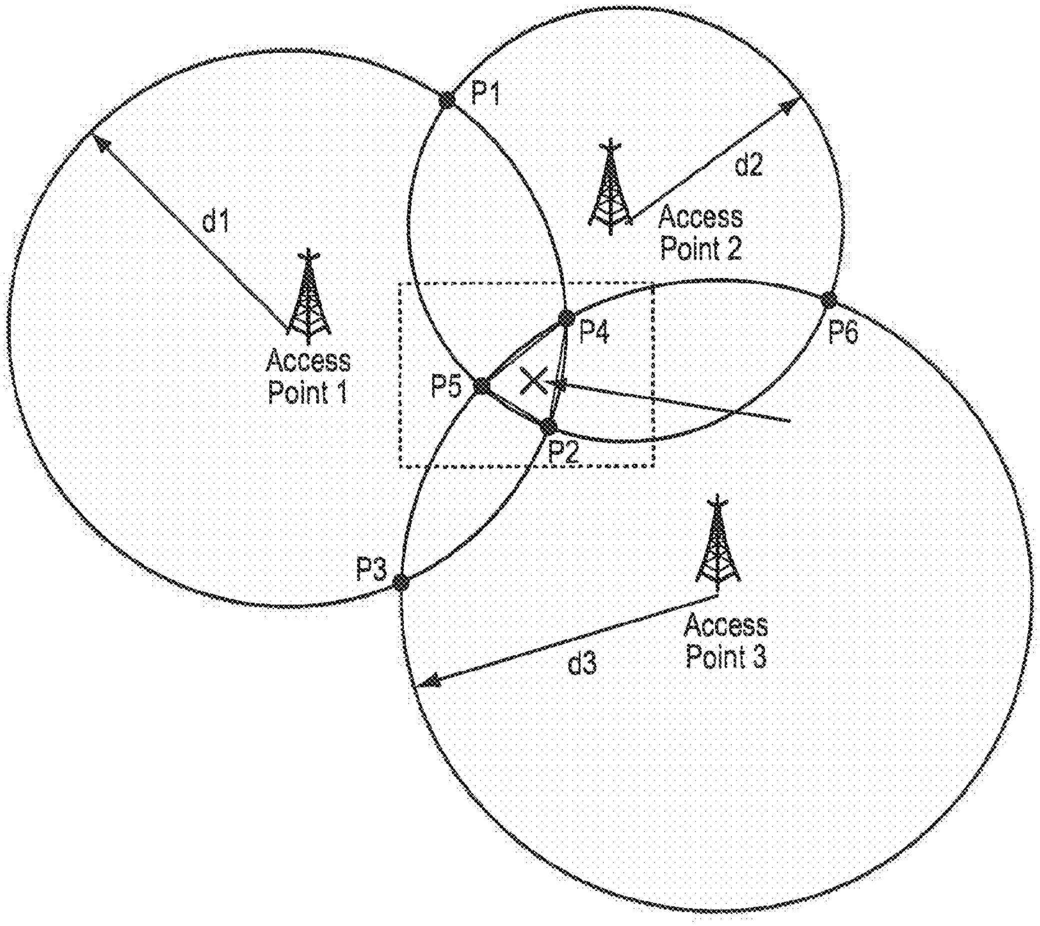
FIG. 28 is a flowchart illustrating another example of a process for tracking signal strength.

At step 460, the signal strength and parameter data are used to analyze any number of parameters relative to Bluetooth LE device 21, particularly its location. The cloud is able to process the data in any of the ways discussed above, including mapping the signal strength to geographic representations of the wireless network 144, based on the parameter data. A graphical representation may be generated to illustrate instances of measured signal strength plotted based on corresponding parameter data FIG. 28.

Figure 29:
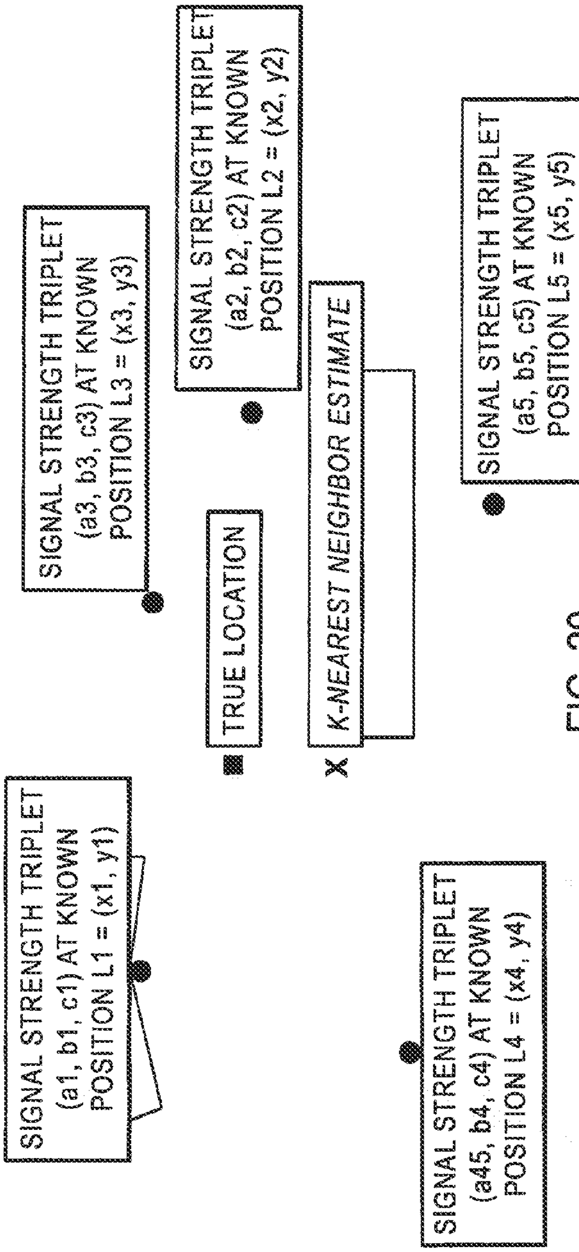
FIG. 29 illustrates one embodiment of a triangulation algorithm for location estimation that can be used with the bridge.

FIG. 29 illustrates one embodiment of a triangulation algorithm for location estimation that can be used for the bridge 11, the intelligent door lock system 10 and a Bluetooth LE device 21. In one embodiment the triangulation computes the location estimate by solving systems of quadratic equations. In one embodiment the triangulation forms circles whose centers are the locations of the transmitters, e.g., access points or base stations. Geometries other than circles can be used. In FIG. 29, the locations and RF characteristics of access points 1, 2, and 3 of the bridge 11, the intelligent door lock system 10 and the Bluetooth LE device 21 have been obtained at numerous known locations. Distances d1 between the object and the access point 1, d2 between the bridge 11, the intelligent door lock system 10 and the Bluetooth LE device 21 and the access point 2, and d3 between them and the access point 3 are calculated based on radio wave characteristics, e.g., TOA or TDOA. It will be appreciated than communication other than radio waves can be used.

Triangulation forms sets of circles. Each of the reference points, access points 1, 2 or 3, becomes the center of a circle, and the distances between the object and the center, d1, d2 or d3, becomes the radius of that circle.

Triangulation estimates locations based on various intersection areas formed by these circles. If three formed circles meet at a single spot, that spot becomes the location estimate as a result of the triangulation. However, as a practical matter, the three circles rarely will meet at a single spot. More often, if the circles intersect, they will intersect in multiple spots. In FIG. 29, the three circles have six intersection points, P1, P2, P3, P4, P5 and P6. The triangulation algorithm examines areas formed by the intersection points to obtain a location estimate for the bridge 11, the intelligent door lock system 10 and the Bluetooth LE device. Specifically, the triangle formed by P2, P4 and P5 has the smallest area among all possible triangles formed by these intersection points, and the centroid X of the triangle (P2, P4, and P5) is the best location estimate of the object.

Figure 30:
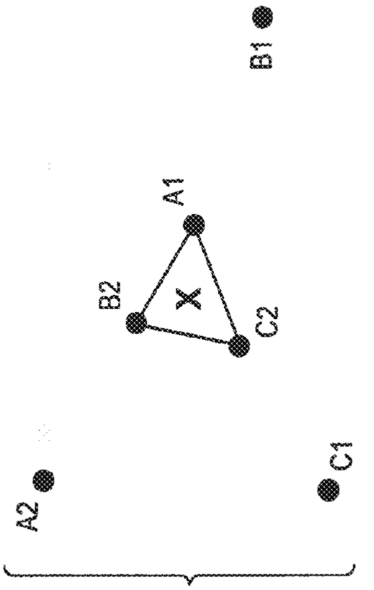
FIG. 30 illustrates one embodiment of a K-nearest neighbor averaging algorithm for location estimate that can be used with the bridge.

FIG. 30 illustrates the K-nearest neighbor averaging algorithm for location estimate, wherein K=5. Typically, K is larger than 2. Experimental analysis shows that K=3 gives the best performance. Let a triplet (Sa, Sb, Sc) represent a set of run-time signal strength measurements at a location of interest from the bridge 11, the intelligent door lock system 10 and the Bluetooth LE device 21, represented as a, b, and c. Five triplets which have the least root mean square (RMS) error in signal strength between the run-time and the off-line measurements are found. The root mean square error in signal strength is calculated as follows:

$$rms=\sqrt{}\{\text{square root over}((a-a\ i)2+(b-b\ i)2+(c-c\ i)2)\}\ \{\text{square root over}\ ((a-a\ i)2+(b-b\ i)2+(c-c\ i)2)\}\{\text{square root over}((a-a\ i)2+(b-b\ i)2+(c-c\ i)2)\} \quad (1)$$

wherein (Sa, Sb, Sc) represents off-line signal strength measurements at the location of interest.

In particular, these five triplets are: signal strength triplet (a1, b1, c1) at position L1 (x1, y1) from a, b and c; signal strength triplet (a2, b2, c2) at position L2 (x2, y2) from a, b and c; and signal strength triplet (a5, b5, c5) at position L5 (x5, y5) from a, b and c. L1, . . . , L5 are determined by using the location information database. The location information database for RF-based static scene analysis typically contains entries used to map RF signal metrics to positions (i.e., transfer from signal domain to space domain). The positions of these five locations are averaged to yield the location estimate of the object as follows:

$$L=(L1+L2+L3+L4+L5)/5 \quad (2)$$

Figure 31:
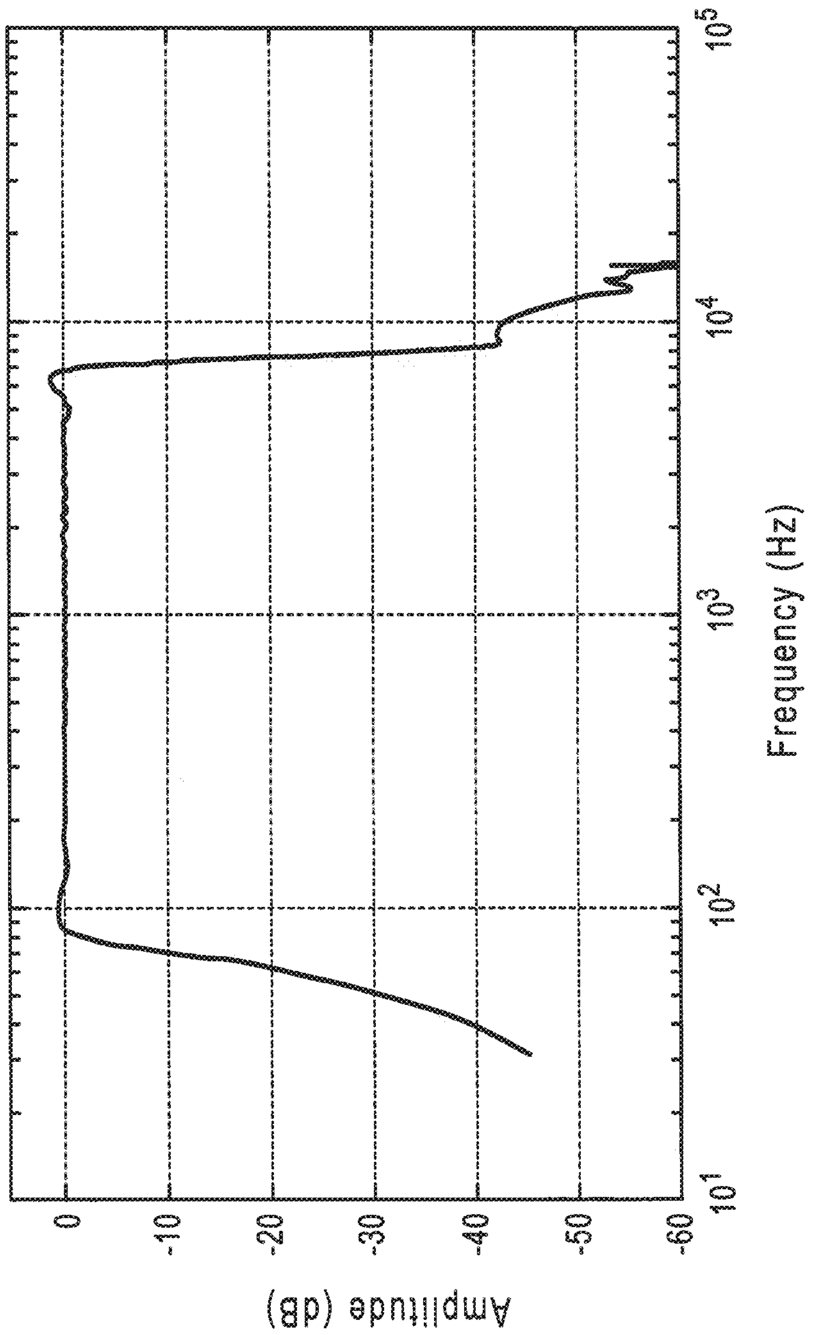
FIG. 31 illustrates one embodiment for triangulation where a smallest m-polygon algorithm is used for location estimate FIG. 32 an overview of the selfloc algorithm to fuse three information sources 1, 2 and 3.

FIG. 31 illustrates, in one embodiment, the smallest M-polygon algorithm for location estimate, wherein M=3. M is the number of access points, or base stations, used for the system. M=3 gives reasonably good performance for the algorithm. The bridge 11, intelligent door lock system 10 and Bluetooth LE device 21, represented as A, B, and C provide separate candidate locations A1, A2, B1, B2, C1 and C2 that match best with the off-line measurements. The algorithm then searches for the polygon that has the smallest perimeter formed by candidate locations contributed by each reference base station, wherein one and only one candidate from each base station must constitute a vertex of the polygon. In FIG. 3, candidate locations A1, B2 and C2 form the smallest perimeter polygon, in this case, a triangle. The final location estimate of the object is the centroid X of the polygon:

$$x=(A1+B2+C2)/3 \quad (3)$$

In one embodiment the conventional static scene analysis maps from the radio signal domain to the space domain. The final estimate is typically within a coordinate system. A main drawback of the static scene analysis is that it cannot effectively cope with the impact of errors in the radio signal domain. Due to interference and noise, objects at different locations might be represented similarly in the radio signal domain, a phenomenon called aliasing. The conventional methods cannot detect aliasing, and may provide these different locations with similar location estimates.

In one embodiment selective fusion location estimation (SELFLOC) algorithm selectively combines or fuses multiple location information sources to yield a combined estimate in a theoretically optimal manner. The SELFLOC algorithm is disclosed in U.S. patent application Ser. No. 10/330,523, filed Dec. 27, 2002, which is incorporated herein by reference.

Figure 32:
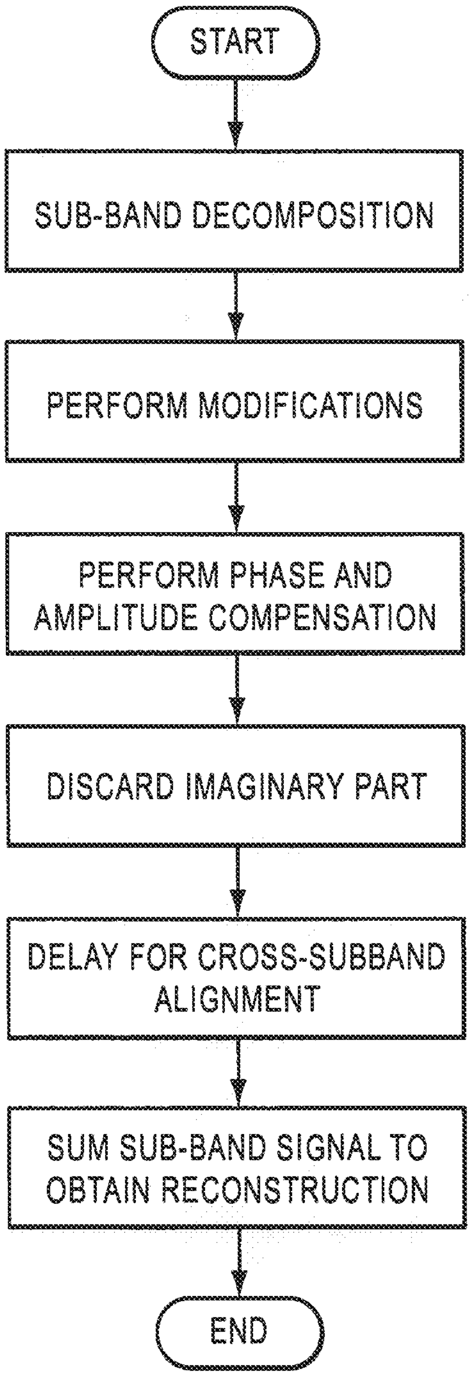

FIG. 32 illustrates, in one embodiment, an overview of the SELFLOC algorithm to fuse three information sources 1, 2 and 3. Each input branch is individually weighted by one of the weights 1, 2, and 3. The sum of the weighted input branches provides the SELFLOC estimate.

The branch weights 1, 2 and 3 are calibrated during the off-line stage using error feedback. A minimum mean square error (MMSE) algorithm can be used for SELFLOC weight training and calibration. As shown in FIG. 4, three location estimates available independently are to be fused, and x-coordinates of these estimates are X1, X2 and X3. The weights for these input branches are w1, w2, and W3 respectively. Thus, the SELFLOC estimate X could be written as:

$$X=w1\cdot X1+w2\cdot X2+w3\cdot X3 \quad (4)$$

Figure 33:
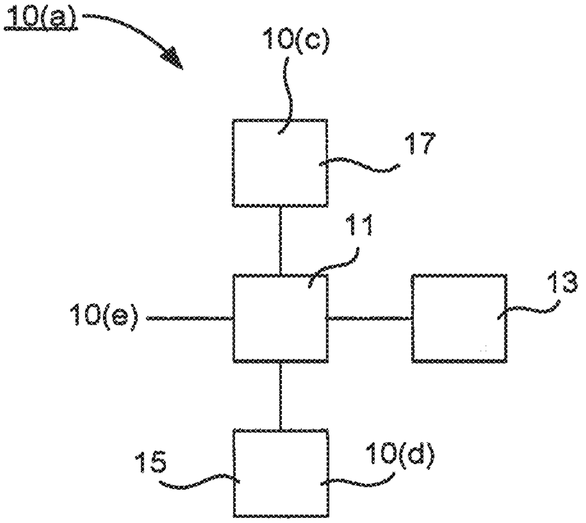
FIG. 33 illustrates one embodiment of a dwelling security system of the present invention.

The Dwelling Security System:

In one embodiment, a dwelling security system 10(*a*) is provided as illustrated in FIG. 33. In one embodiment the dwelling security system 10(*a*) is a wireless camera system with one or more wireless bridges 11 each including a computing device 13, an internet-facing radio 15, and a second radio 17 communicating with one or more dual-mode wireless cameras 10(*c*). The dual mode camera 10(*c*) includes a camera, a first radio 10(*d*) within communication range of the second radio 17 of the wireless bridge, and a third internet-facing radio 10(*e*) responsible for transmitting video. A trigger mechanism 10(*f*) is configured to receive a trigger via Network Systems or directly through hardware in communication with at least one of the bridges. The trigger mechanism 10(*f*) is configured triggers to at least one of the bridges to transmit on its second radio to wake up the dual mode camera 10(*c*) to transmit video on its third radio 10(*e*). As a non-limiting example, camera 10(*c*) can be the camera disclosed in US20040085205, incorporated fully herein by reference.

The camera 10(*c*) consumes less power in a standby mode because the first radio 10(*d*) consumes less power when configured to receive triggers and the third radio 10(*d*) is very efficient at transmitting video over Network Systems.

Figure 34:
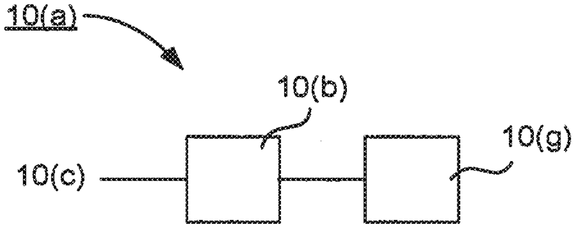
FIG. 34 illustrates one embodiment of a dwelling security system of the present invention that includes an authorization sensing device (motion detection device).

In one embodiment, illustrated in FIG. 34, security system 10(*a*) includes a camera 10(*c*) that can be coupled to a BLE-WiFi bridge 10(*b*), as described above and an authorization sensing device (motion detection device) 10(*g*). As non-limiting examples the authorization A dwelling sensing device 10(*g*) can be one or more of a device to sense key fobs/key cards, mobile devices, microchips, devices to sense biometrics, occupancy sensors including but not limited to rRF infrared, pressure, and optical-interrupter based sensor. Broadly motion detection device 10(*g*) is an electronic motion detector. As non-limiting examples, motion detection device can include an optical, microwave, or acoustic sensor, and a transmitter for illumination. In one embodiment a passive sensor 10(*g*) can be used. In one embodiment the motion detector 10(*g*) can detect up to distances of at least 15 feet (5 meters). Other ranges are suitable In one embodiment the motion detector 10(*g*) is an infrared detector mounted on circuit board, along with photoresistive detector for visible light. As non-limiting examples the following technologies can be used for the motion detector 10(*g*): passive infrared (PIR), micro wave which detects motion through the principle of Doppler radar, and the like, ultrasonic and the like, tomographic motion detector, video camera 10(*c*) software, and the like.

As non-limiting examples suitable motion detection devices 10(*g*) include but are not limited to Infrared (passive and active sensors); optics (video and camera 10(*c*) systems); radio frequency energy (radar, microwave and tomographic motion detection); sound (microphones and acoustic sensors); vibration (triboelectric, seismic, and inertia-switch sensors); magnetism (magnetic sensors and magnetometers); and the like.

In one embodiment in a first step, motion detection device 10(*g*) is used to detect motion of an individual approaching the dwelling. In a second step, if the motion detector 10(*g*)

detects the approach of the individual then the camera 10(*c*) is turned on in sufficient time to take a face picture of the individual.

In one embodiment the authorization sensing device 10(*g*) is a person sensing button. As non-limiting examples, the button can be a doorbell, a body or person sensing device, a hepatic device and the like. One embodiment of a suitable doorbell is disclosed in US 2004008205, incorporated herein by reference.

In other embodiments the camera 10(*c*) can be activated by an access authorization event. Suitable access authorization events include but are not limited to, use of an authorized mobile device to unlock a door of the dwelling; detection of an approaching face by another camera 10(*c*) that is powered, someone pressing the doorbell via a mechanical switch, capacitive sensor that senses touch, and the like. In other embodiments access to a dwelling is given to a person with one of the authorized devices recited above. In one embodiment instead of a doorbell a device is provided that translates mechanical movement or contact into an electrical signal. These devices include but are not limited to a rocker switch, body-heat sensitive switches, capacitive switch, pressure sensitive switches and the like.

In one embodiment the camera 10(*c*) is activated when a person is detected in proximity to an entrance to the dwelling. As a non-limiting example this can be achieved using a proximity sensor situated inside the doorbell; by pressure sensors on a dwelling floor; with the use of other proximity sensors with coverage in front of the a dwelling access such as a door; and the like.

In one embodiment the camera 10(*c*) is in an interior of the dwelling and the camera 10(*c*) is activated when a person entering the dwelling is detected.

In one embodiment a power supply powers the intelligent doorbell by extracting power from the 2 leads from the dwelling without ringing the doorbell 14, and without affecting the doorbells ability to ring. In one embodiment the intelligent doorbell is a bridge configured to communicate with another bridge.

In one embodiment the camera 10(*c*) is positioned at the doorbell and is activated by a sensor or when the doorbell is depressed. In one embodiment a doorbell module is integrated with the camera 10(*c*). In one embodiment the doorbell module of a dwelling is coupled to a wireless camera 10(*c*) that provides for wireless transmission of an image, and the like.

In one embodiment the camera is a micro-camera 10(*c*) mounted to a circuit board and is positioned in alignment with a hole defined in a case for photographing the visitor.

In one embodiment a generic input device, (hereafter "keypad") is provided. The key pad can be part of the intelligent door lock system or be an accessory to the intelligent door lock system. In one embodiment the key pad is retrofitted to an existing intelligent door lock system after the intelligent door lock system has been installed. It is retrofitted to the existing intelligent door lock system. In one embodiment the keypad is installed when the intelligent door lock system, and can be sold with the intelligent door lock system. In one embodiment the keypad is an exterior of the dwelling and in another embodiment it is in the interior of the dwelling.

In one embodiment the keypad includes: a battery, keypad, a Bluetooth chip and board. Optionally included are LED lighting and a proximity sensor. Suitable examples of proximity sensors are disclosed herein.

The keypad provides for entering a communication that is encrypted, in order to gain access to the intelligent door lock system to lock and unlock. In one embodiment the communication is via BLE low energy.

In one embodiment the keypad has a BLE range of range of 20-30 feet. In one embodiment the keypad is within 3-5 feet of the door. As a non-limiting example the keypad can have a communication distance of at least thirty feet.

In one embodiment, the user, on initial setup programs the keypad via its mobile device, or other web-enabled device. The initial setup program is encrypted and can be achieved with symmetric key encryption, public key encryption and the like.

The user can communicate with the keypad by a variety of different mechanisms, including but not limited to entering digitals, letters, codes, tapping, a code with a pattern and the like.

In one embodiment the proximity sensor is integral with the proximity sensor. In one embodiment the keypad lights up as the user walks towards the keypad via the LED's.

As non-limiting examples the keypad can be configured to have time codes for expiration, may only be available for a certain of time, codes can be on a recurring identified time basis, the user can set the availability of time for access via the key paid for who can use, and how often it can be used In one embodiment the keypad can be programmed via a bridge. This can be achieved remotely.

As non-limiting examples the keypad can be utilized using a mobile device, a computing device, via an API and the like. As a non-limiting example, a delivery company can issue a pass to a delivery person for access to the dwelling. This can be done at any time, or at a last minute via an API.

In one embodiment, illustrated in FIG. 34, a dwelling security system 10(*a*) includes a camera 10(*c*) that can be coupled to a BLE-WiFi bridge 10(*b*), as described above and an authorization sensing device (motion detection device) 10(*g*). As non-limiting examples the authorization sensing device 10(*g*) can be one or more of a device to sense key fobs/key cards, mobile devices, microchips, devices to sense biometrics, occupancy sensors including but not limited to rRF infrared, pressure, and optical-interrupter based sensor. In one embodiment detection device 10(*g*) is an electronic motion detector. As non-limiting examples, motion detection device 10(*g*) can include an optical, microwave, or acoustic sensor, and a transmitter for illumination. In one embodiment a passive sensor 10(*g*) can be used. In one embodiment the motion detector 10(*g*) can detect up to distances of at least 15 feet (5 meters). Other ranges are In one embodiment the motion detector 10(*g*) is an infrared detector mounted on circuit board, along with photoresistive detector for visible light. As non-limiting examples the following technologies can be used for the motion detector 10(*g*): passive infrared (PIR), micro wave which detects motion through the principle of Doppler radar, and the like, ultrasonic and the like, tomographic motion detector, video camera 10(*c*) software, and the like.

As non-limiting examples suitable motion detector 10(*g*) includes but are not limited to Infrared (passive and active sensors); optics (video and camera 10(*c*) systems); radio frequency energy (radar, microwave and tomographic motion detection); sound (microphones and acoustic sensors); vibration (triboelectric, seismic, and inertia-switch sensors); magnetism (magnetic sensors and magnetometers); and the like.

In one embodiment in a first step, motion detection device 10(*g*) is used to detect motion of an individual approaching the dwelling. In a second step, if the motion detector 10(*g*) detects the approach of the individual then the camera 10(*c*) is turned on in sufficient time to take a face or body picture of the individual. In one embodiment, motion detection of the individual and turning on of camera 10(*c*) 10(*c*) is processed in the cloud, and in another embodiment in an intelligent door lock system back-end.

As a non-limiting example the first distance for the motion detection device 10(*g*) to detect approach of an individual is 5 meters, 10 meters and the like and the first trigger is at 10 meters, 5 meters and the like. As a non-limiting example the second distance to wake up camera 10(*c*) 10(*c*) can be 2 mm, and any suitable distance suffice for a camera 10(*c*) to identify that there is a person. In one embodiment the second distance can be 5 meters for body detection.

As the person approaching hits, as a non-limiting example, 5 meters, the motion detection device 10(*g*) says that something has happened and wakes up camera 10(*c*), and at 2 meters determines if it is a person, the camera 10 (*c*) is awakened in sufficient time to take a picture, and send a notice to the owner, to any device capable of receiving messages and notifications, it can be sent also to the cloud, to the authorities such as law enforcement who can then be dispatched to the dwelling In one embodiment the authorization sensing device 10(*g*) is a person sensing device, including but not limited to a button. As non-limiting examples, the button can be a doorbell, a body or person sensing device, a hepatic device and the like. One embodiment of a suitable doorbell is disclosed in US 2004008205, incorporated herein by reference.

In other embodiments the camera 10(*c*) can be activated by an access authorization event. Suitable access authorization events include but are not limited to, use of an authorized mobile device to unlock a door of the dwelling; detection of an approaching face by another camera that is powered, someone pressing the doorbell via a mechanical switch, capacitive sensor that senses touch, and the like. In other embodiments access to a dwelling is given to a person with one of the authorized devices recited above. In one embodiment instead of a doorbell a device is provided that translates mechanical movement or contact into an electrical signal. These devices include but are not limited to a rocker switch, body-heat sensitive switches, capacitive switch, pressure sensitive switches and the like.

In one embodiment the camera 10(*c*) is activated when a person is detected in proximity to an entrance to the dwelling. As a non-limiting example this can be achieved using a proximity sensor situated inside the doorbell; by pressure sensors on a dwelling floor; with the use of other proximity sensors with coverage in front of the a dwelling access such as a door; and the like.

Figure 35:
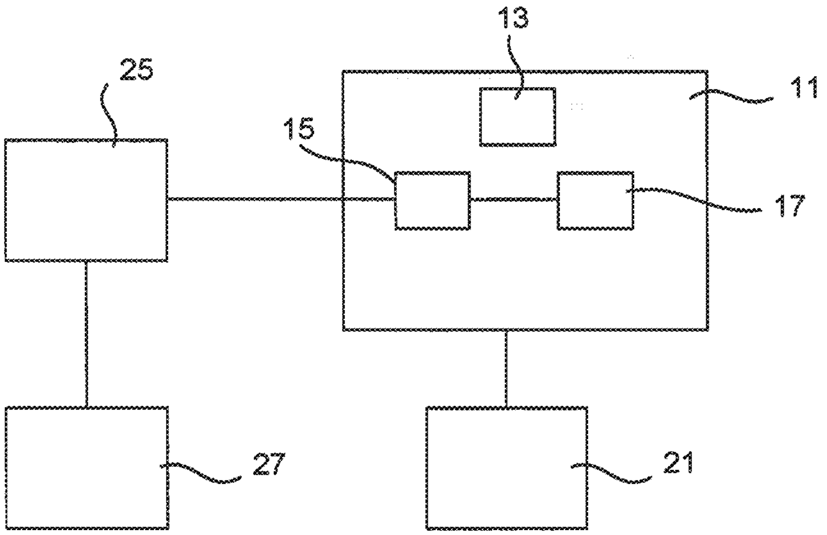
FIG. 35 illustrates one embodiment of a Bluetooth/WiFi bridge of the present invention.

In one embodiment of the present invention, illustrated in FIG. 35, a Bluetooth/WiFi bridge 11 is provided that includes, a computing device 13 in an interior or exterior of a dwelling 15 with an internet-facing radio 15, and a second radio 17 communicating with one or more Bluetooth LE devices 21. For purposes of the present invention Bluetooth LE devices 21 are Bluetooth LE devices 21, Bluetooth LE peripheral devices 21 and the like, hereafter collectively "Bluetooth LE devices 21. As non-limiting examples the Bluetooth LE devices can have power from 40 mW hours to 40 W hours. As non-limiting examples, Bluetooth devices 21 include but are not limited to: mobile devices, wearable devices, wearable devices supporting BLE, including but not limited to: Smart Wristwatches, smart bracelets, smart jewelry, smart tags, smart fobs, smart clothing, shoes, glasses, any type of wearable device, smart access control devices such as smart deadbolts, smart doorknobs, smart doorbells, wireless video cameras, wireless thermostats, automated irrigation control systems, smart light bulbs, and the like.

In one embodiment the computing device 13 is configured to connect Bluetooth LE devices 21 to the Network Systems.

In one embodiment the bridge 11 is coupled to the intelligent door lock system 10 via secure digital keys distributed by Cloud lock access services Lock Access Services.

In one embodiment the bridge 11 allows BLE devices in the dwelling to interact with the cloud lock access services and with other Internet-connected devices via the intermediary that is the cloud lock access services. It will be appreciated that the dwelling includes all structures besides homes.

In one embodiment the bridge determines signal strength between the bridge 11, and the Bluetooth LE device 21. In another embodiment the bridge 11 determines signal strength of between the bridge 11, the Bluetooth LE device 21 and the intelligent door lock system 10(*a*).

The retrieved signal strength processed . . . . It one embodiment, as described below, a triangulation algorithm is applied between the bridge 11, the Bluetooth LE device 21 and the intelligent door lock system.

In one embodiment the bridge 11 uses detection of known Bluetooth devices and peripheral devices, hereafter collectively Bluetooth devices 21, tied to specific individual people in the interior or at an exterior of the dwelling. The bridge 11 tracks signal strength over time to: (i) determine if known or unknown people are inside or outside the dwelling, (ii) if people are approaching the dwelling, entering the dwelling, exiting the dwelling, moving away from the building and the like. In one embodiment the bridge 11 with the detection of the presence of a Bluetooth device 21 relays lock operations of the intelligent door lock system (manual or via a mobile application), door 12 movements, door 12 knocks to allow making these determinations of presence and movement with an algorithm as set forth below.

In one embodiment the bridge 11 interacts with the cloud lock access services to gather and relay data. This data can be gathered and stored locally, at the back-end 68, and in a cloud lock access services based data layer. This is then used to determine the location and movement of people in and out the dwelling.

In one embodiment the bridge 11 discovers the intelligent door lock system 10 over a Bluetooth device 21 networking. In one embodiment this is achieved by the bridge discovering lock devices 22 and their available services by scanning the Bluetooth LE 21 network for connected devices, advertising their presence and their services for obtaining lock device 22 status (secured or unsecured), communicates lock device 22 activity, communicates door 12 activity (door 12 opening and closing, door 12 knocks, and the like) and operates the lock to lock and unlock the bolt 24 to secure or unsecure the lock device 22.

In one embodiment the bridge 11 provides communication to other Bluetooth devices 21 without the use of a mobile device. As non-limiting examples, the bridge 11 allows: WiFi-enabled devices in a dwelling to interact with Bluetooth devices 21 in the dwelling; WiFi-enabled devices in a dwelling to interact with the intelligent door lock system 10 over Bluetooth; allows a Bluetooth device 21 in a dwelling to interact with Internet-based services and API's using a dwelling's home WiFi network and Network System connection; allows people to operate an intelligent door lock system and other Bluetooth devices over a Network System from anywhere outside a dwelling; extend network coverage of Bluetooth devices in a dwelling in order to understand who is in the dwelling, who is away, who is coming and who is going when doors 12 and lock devices 22 are operated and the like.

In one embodiment the bridge 11 extends Network System coverage of Bluetooth devices 21 other than lock devices 22 to perform device-specific operations, including but not limited to: gathering information about the presence of the Bluetooth device 21, the operational status of the Bluetooth device 21, the operational history of the Bluetooth device 21 and performing Bluetooth device 21 specific operations including but not limited to: turning the Bluetooth device 21 off and on, changing the mode of operations of the Bluetooth device 21, changing the operational settings of the Bluetooth device 21 and scheduling these device operations based on ad hoc, daily, weekly, monthly or other schedules.

In one embodiment the intelligent door lock system 10 trusts the bridge 11 for commands (remote status) after an intelligent door lock system owner or designee is registered at the back-end of the intelligent door lock system using a cloud lock access services-based access system that grants the bridge 11 access to the intelligent door lock system 10.

In one embodiment the intelligent door lock system 10 owners or designee rants the bridge 11 access to the lock device 22 by using their digital credentials, which can be stored at the cloud lock access services or at the back-end 68, to pair a specific bridge 11 with a specific intelligent door lock system 10 grant specific rights. As non-limiting example, the specific rights include but are not limited to, gathering of status and operational history of the system 10, triggering lock device 22 operations in real-time, as well as applications for interfacing with the bridge 11 and a Bluetooth device 21.

In one embodiment the bridge 11 is used to determine if an intelligent door lock system 10 owners or designee with a non-internet connect device is at an interior or an exterior of a dwelling.

In one embodiment the bridge 11 is used to determine if the person is approaching or moving away from the dwelling. In one embodiment the bridge 11 measures the signal strength of the Bluetooth LE devices 21.

In one embodiment as a Bluetooth LE device 21, coupled to a person moves away from the bridge 11 the signal strength decreases, as more fully discuss hereafter. Similarly, as the signal strength increases this indicates that a person with the Bluetooth LE device is approaching the dwelling.

In one embodiment, each room of a dwelling with the intelligent door lock system has a bridge 11. In another embodiment, the major rooms of the dwelling each have a bridge 11.

In one embodiment the bridge 11 learns habits, movements, and the like of the intelligent door lock system 10 owners or designee.

In one embodiment a triangulation is provided between the bridge 11, the intelligent door lock system 10 and a Bluetooth LE device 21, as more fully explained hereafter.

In one embodiment the computing device 13 provides for coordination of information flow between the two radios 15 and 17. The computing device 13 is configured to enable the two radios, 15 and 17 to communicate and take incoming and outgoing information from one radio into a format that the other radio can transmit and receive. The internet facing radio 15 is configured to communicate through a router 25 to the Network Systems and the BLE LE devices 21 connect to Network Systems via one of the radios 15, 17 through the computing device 13 through the internet facing radio 15 through the router 25 to Network Systems, with the bridge 11 communicating with a data center 27. In one embodiment a router is not required when an alternative bridge is constructed to bridge between cellular and BTLE In one embodiment the internet facing radio is configured to communicate through the router 25 to Network Systems. The Bluetooth LE devices 21 connect to Network Systems, via the computing device 13, with the bridge 11 communicating with a data center 27.

The computing device 13 provides for coordination of information flow between the two radios 15 and 17. Because most radios speak in different frequencies or protocols, packet sizes, and the like, the computing device 13 enables the two radios 15 and 17 to communicate, takes incoming and outgoing information from one radio into the proper format that the other radio can transmit and receive. In one embodiment the computing device makes the first and second radios 16 and 18 the same thing.

In one embodiment a wall wart in the dwelling is configured to communicate with other Bluetooth devices, including but not limited to redundant or backup power supplies, redundant data communications connections, environmental controls (e.g., air conditioning, fire suppression) and various security devices, thermostats, audio systems, appliances, gates, outdoor electrical equipment and the like.

In one embodiment the internet facing radio 15 is configured to communicate through the router 25 to Network Systems and Bluetooth LE devices 21 connected to Network Systems via the computing device 13. The bridge 11 communicates with the data center 27.

In one embodiment the computing device 13 is a wall wart, and equivalent element, which is a power adapter that contains the plug for a wall outlet.

In one embodiment the radios 15 and 17 transmit radio waves for communication purposes.

In one embodiment the bridge 11 provides at least a partial probability analysis of where a person with a Bluetooth LE device 21 is located, as well as to the existence of an adverse condition including but not limited to entrance via a window or door to the dwelling.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. An intelligent door lock system, comprising:

one or more wireless bridges each including a computing device, an internet-facing radio, and a second radio, a first radio within communication range of the second radio of the wireless bridge, and a third internet-facing radio responsible for transmitting video;

one or more cameras coupled to the one or more wireless bridges;

one or more Bluetooth devices or Bluetooth peripheral devices, collectively, Bluetooth devices in communication with the one or more bridges;

the intelligent door lock system that includes a position sensor coupled to a drive shaft of a lock device, the position sensor sensing position of the drive shaft to assist in locking and unlocking a lock of the lock device, the position sensor configured to know its current position even if it has been moved since it has been turned off, the intelligent door lock system coupled to and in communication with the one or more bridges, the one or more cameras and the one or more Bluetooth devices; and a keypad in communication with the intelligent door lock system.

2. The system of claim 1, wherein the keypad is an accessory to the intelligent door lock system.

3. The system of claim 1, wherein the keypad is sold with the intelligent door lock system.

4. The system of claim 1, wherein the keypad is retrofitted to an existing intelligent door lock system after the intelligent door lock system has been installed.

5. The system of claim 1, wherein the keypad is at an exterior of a dwelling.

6. The system of claim 1, wherein the keypad includes: a battery, keypad, a Bluetooth chip and board.

7. The system of claim 6, wherein the keyboard includes one or more of: LED lighting and a proximity sensor.

8. The system of claim 7, wherein the keypad provides for entering a communication that is encrypted, in order to gain access to the intelligent door lock system to lock and unlock.

9. The system of claim 6, wherein the lock operations are either manual or via a mobile application.

10. The system of claim 1, wherein communication is via BLE low energy.

11. The system of claim 1, further comprising:

a motion detection device is selected from at least one of, infrared (passive and active sensors); optics (video and camera systems); radio frequency energy (radar, microwave and tomographic motion detection); sound (microphones and acoustic sensors); vibration (triboelectric, seismic, and inertia-switch sensors); and magnetism (magnetic sensors and magnetometers).

12. The system of claim 1, wherein the one or more bridges determines how far the person is from the dwelling.

13. The system of claim 1, wherein the one or more bridges tracks signal strength over time between the bridge and the Bluetooth device to determine if known or unknown people are at the exterior of the dwelling.

14. The system of claim 1, wherein the one or more bridges tracks signal strength over time between the bridge and the Bluetooth device when to determine if the person is approaching the dwelling.

15. The system of claim 1, wherein the one or more bridges tracks signal strength over time between the bridge and the Bluetooth device to determine if the person is entering the dwelling from the exterior.

16. The system of claim 1, wherein the one or more bridges tracks lock operations of the intelligent door lock system.

17. The system of claim 1, wherein the one or more bridges tracks door movements of the dwelling.

18. The system of claim 1, wherein the one or more bridges tracks door knocks at the dwelling.

19. The system of claim 1, wherein the one or more bridges interacts with a cloud lock access services to gather and relay data.

20. The system of claim 1, wherein the one or more bridges discovers the intelligent door lock system over Bluetooth device networking.

21. The system of claim 1, wherein the one or more bridges discovers lock devices of the intelligent door lock system by scanning a Bluetooth LE network for connected devices.

22. The system of claim 1, wherein the one or more bridges in operation obtains lock device status of the intelligent door lock system, wherein the status is one of a door being secured or unsecured.

23. The system of claim 1, wherein the one or more bridges in operation communicates lock device activity of the intelligent door lock system.

24. The system of claim 1, wherein the one or more bridges in operation communicates a dwelling door activity.

25. The system of claim 1, wherein the one or bridges are at an exterior of the dwelling.

26. The system of claim 1, wherein the one or more bridges uses detection of a Bluetooth device that is associated with a person to track signal strength between the bridge and the Bluetooth device to determine where the person is located at the exterior relative to the dwelling.

* * * * *